US011176757B2

(12) United States Patent
Whitney et al.

(10) Patent No.: US 11,176,757 B2
(45) Date of Patent: Nov. 16, 2021

(54) MISSION DRIVEN VIRTUAL CHARACTER FOR USER INTERACTION

(71) Applicant: Magic Leap, Inc., Plantation, FL (US)

(72) Inventors: Kristofer Ryan Whitney, Plantation, FL (US); Andrew Moran, Miami, FL (US); Danielle Marie Price, Plantation, FL (US); Jonathan Wells Mangagil, Plantation, FL (US); Minal Luxman Kalkute, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/060,896

(22) Filed: Oct. 1, 2020

(65) Prior Publication Data

US 2021/0104100 A1  Apr. 8, 2021

Related U.S. Application Data

(60) Provisional application No. 62/909,565, filed on Oct. 2, 2019, provisional application No. 62/913,061, filed on Oct. 9, 2019.

(51) Int. Cl.
*G06T 19/00* (2011.01)
*G02B 27/00* (2006.01)
*G06T 13/40* (2011.01)
*G06F 3/0481* (2013.01)

(52) U.S. Cl.
CPC ........ *G06T 19/006* (2013.01); *G02B 27/0093* (2013.01); *G06F 3/04815* (2013.01); *G06T 13/40* (2013.01)

(58) Field of Classification Search
None
See application file for complete search history.

(56) References Cited

U.S. PATENT DOCUMENTS

| 6,850,221 | B1 | 2/2005 | Tickle |
| 2006/0028436 | A1 | 2/2006 | Armstrong |
| 2007/0081123 | A1 | 4/2007 | Lewis |
| 2012/0127062 | A1 | 5/2012 | Bar-Zeev et al. |

(Continued)

OTHER PUBLICATIONS

Schmeil et al., "MARA—A Mobile Augmented Reality-Based Virtual Assistant", IEEE, 2007. (Year: 2007).*
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

(Continued)

*Primary Examiner* — Nicholas R Wilson
(74) *Attorney, Agent, or Firm* — Knobbe, Martens, Olson & Bear, LLP

(57) ABSTRACT

An augmented reality (AR) display device can display a virtual assistant character that interacts with the user of the AR device. The virtual assistant may be represented by a robot (or other) avatar that assists the user with contextual objects and suggestions depending on what virtual content the user is interacting with. Animated images may be displayed above the robot's head to display its intents to the user. For example, the robot can run up to a menu and suggest an action and show the animated images. The robot can materialize virtual objects that appear on its hands. The user can remove such an object from the robot's hands and place it in the environment. If the user does not interact with the object, the robot can dematerialize it. The robot can rotate its head to keep looking at the user and/or an object that the user has picked up.

20 Claims, 33 Drawing Sheets

(56) References Cited

U.S. PATENT DOCUMENTS

| | | |
|---|---|---|
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2019/0188895 A1 | 6/2019 | Miller, IV |

OTHER PUBLICATIONS

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C./paper/in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

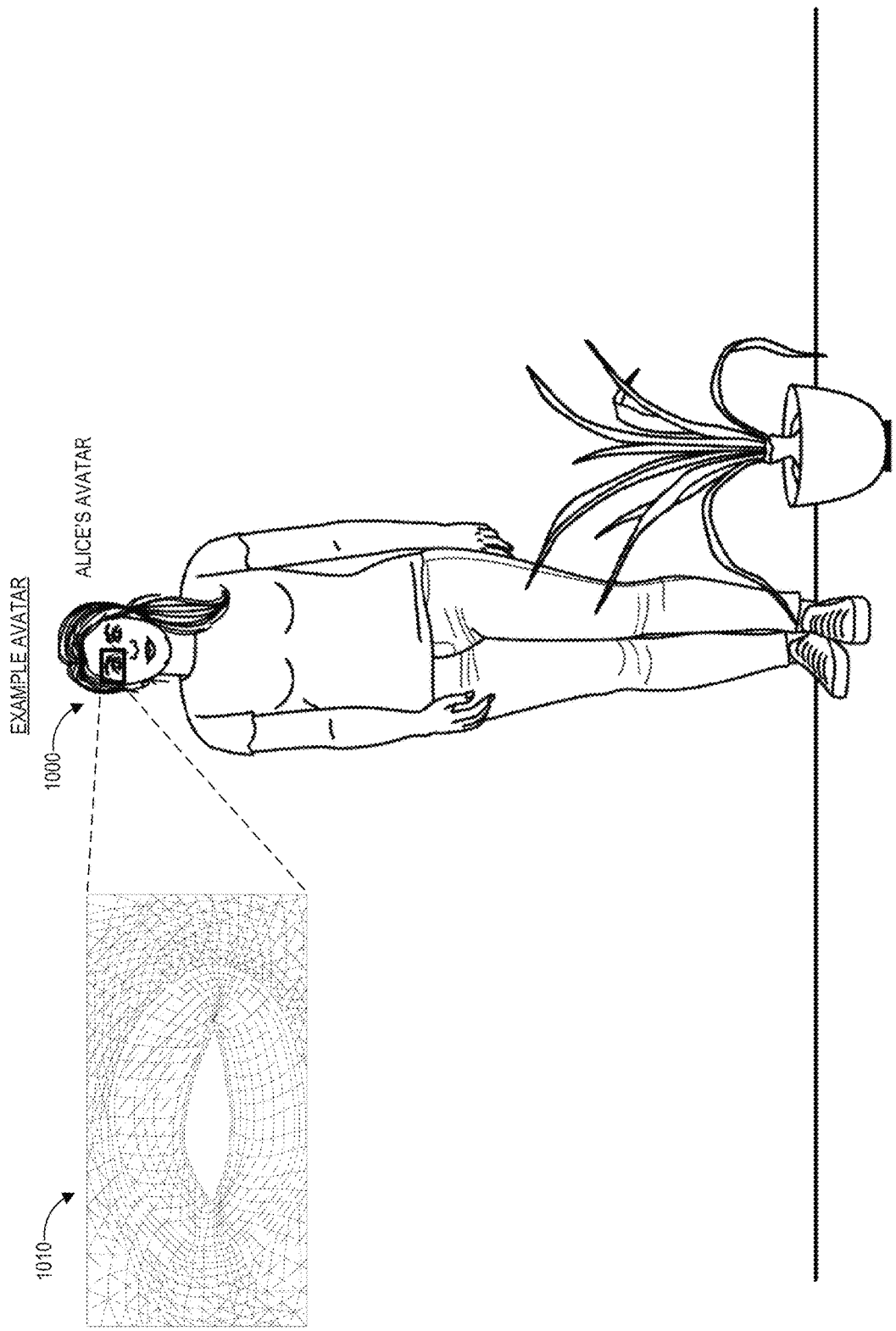

IDENTIFY AN OBJECT OF INTEREST IN A USER'S ENVIRONMENT
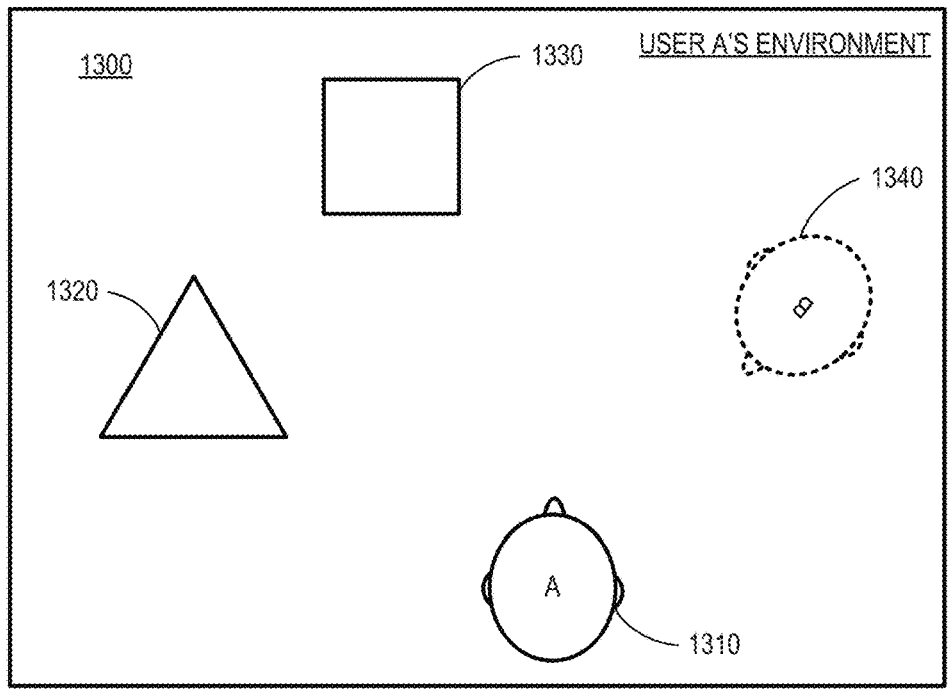
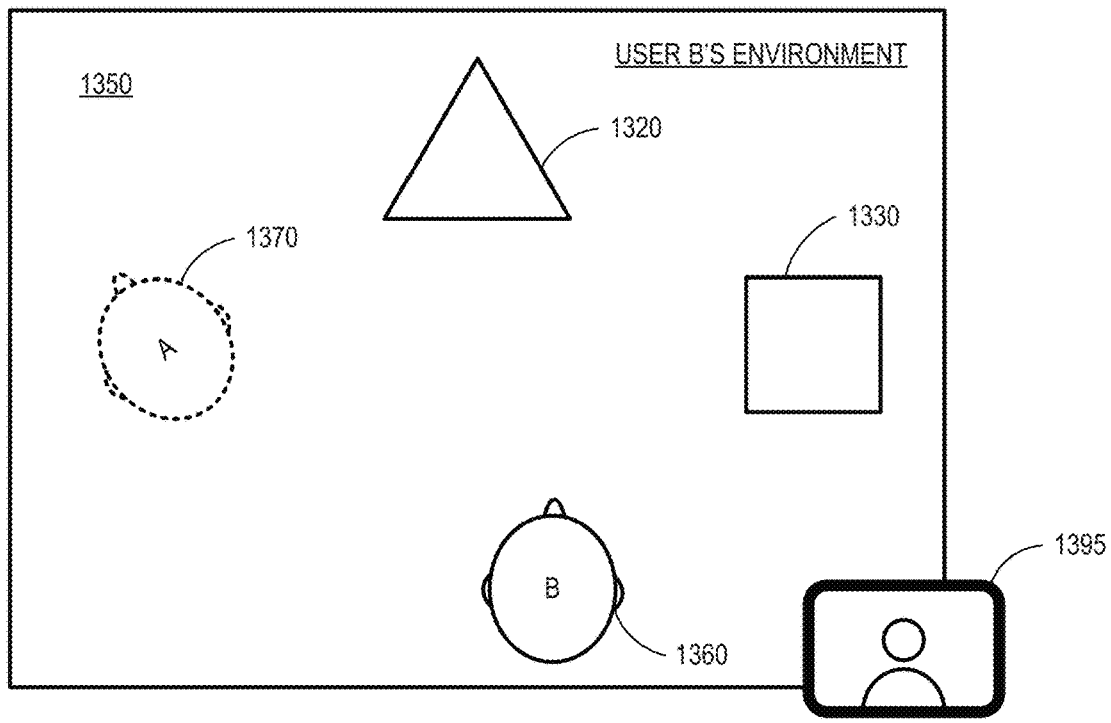
FIGURE 13A

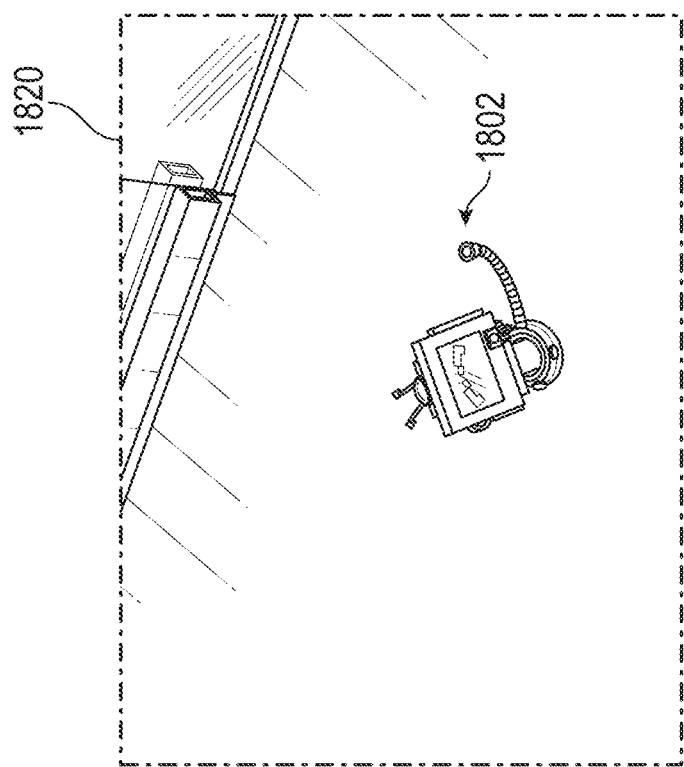
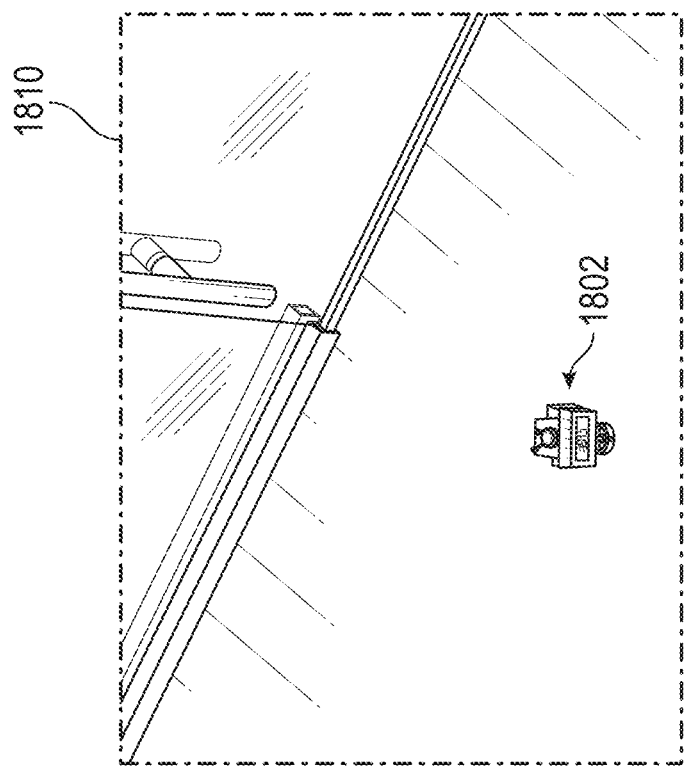
FIG. 18

MISSION DRIVEN VIRTUAL CHARACTER FOR USER INTERACTION

FIELD

The present disclosure relates to virtual reality and augmented reality, including mixed reality, imaging and visualization systems and more particularly to systems and methods for displaying and interacting with virtual content.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 10 illustrates an example of an avatar as perceived by a user of a wearable system.

FIG. 13A illustrates how virtual objects and avatars may be placed in the virtual environments.

FIG. 18 illustrates an example view of a mixed reality environment that includes a virtual assistant, specifically, Robot.

Figure 1:
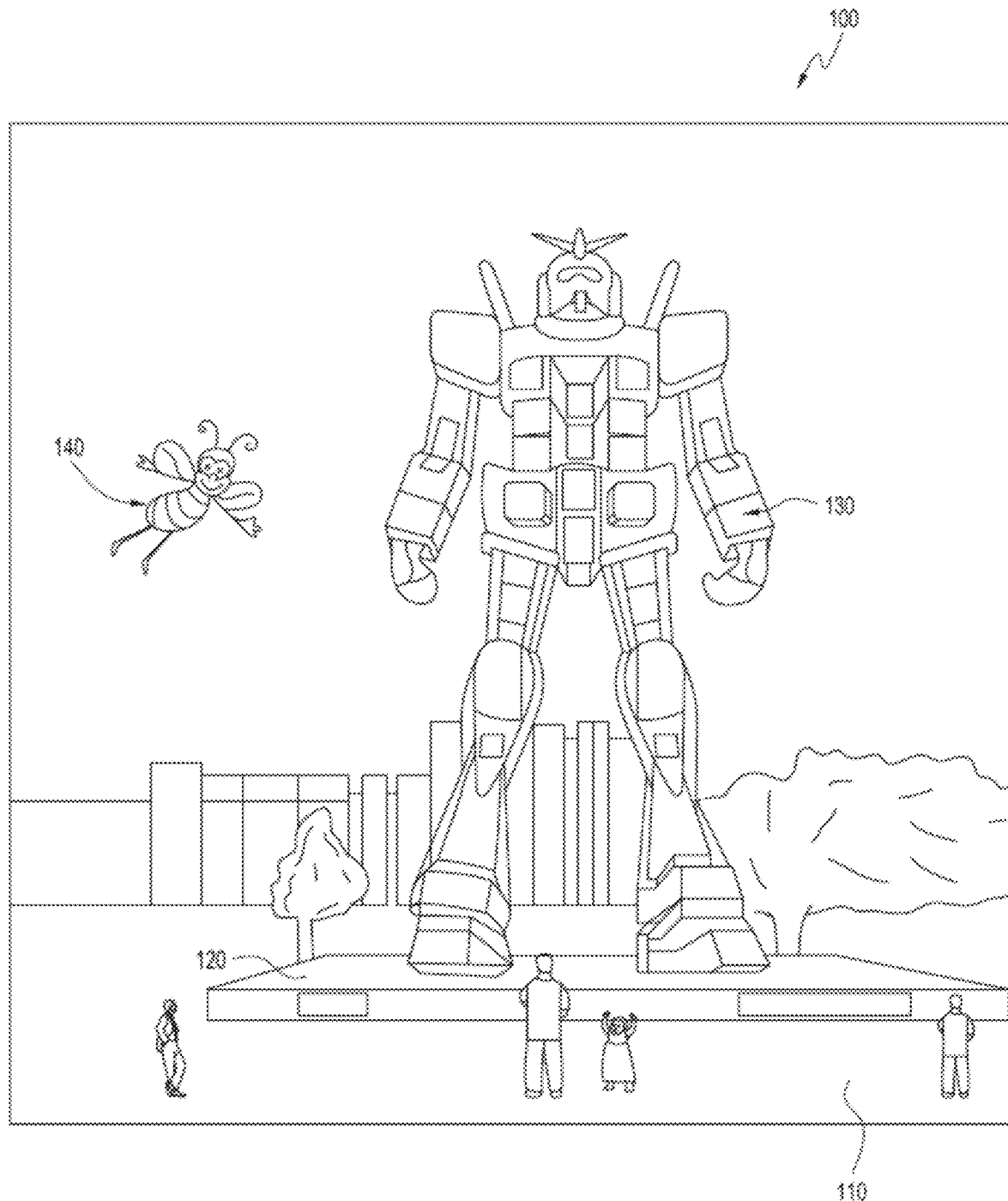
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example implementations described herein and are not intended to limit the scope of the disclosure.

DETAILED DESCRIPTION

Overview

A virtual avatar may be a virtual representation of a real or fictional person or creature or personified object in an AR/VR/MR environment. For example, a virtual avatar may represent a real person or may represent a non-user character, such as a virtual assistant that is configured to interface with users. For example, an AR display device can display a non-user character as a virtual robot avatar. The virtual robot may be a "virtual assistant" configured to assist the user with contextual objects and suggestions depending on what virtual content the user is interacting with. Animated images may be displayed above the robot's head to display its intents to the user. For example, the robot can run up to a menu and suggest an action and show the animated images. The robot can materialize virtual objects that appear on its hands. The user can remove such an object from the robot's hands and place it in the environment. If the user does not interact with the object, the robot may dematerialize it. The robot may be configured to rotate its head to keep looking at the user. Thus, a virtual assistant, such as a robot, may be configured to with certain human characteristics, even though it is a non-user character.

During a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive and interact with avatars of other students or the teacher in a virtual classroom. As another example, a user playing a game in an AR/VR/MR environment may view and interact with avatars of other players in the game.

In some implementations, multiple users may wish to view a common virtual object. For example, a virtual object that is used for educational purposes, such as a piece of art in a museum, automobile, biological specimen, chemical compound, etc. may be selected by a presenter (e.g., a teacher of a class of students) for analysis, viewing, and/or interaction by multiple participants (e.g., students). As discussed further below, implementations that provide different viewing modes for such groups allow a user, such as a presenter, to customize the viewing experience of multiple participants. Such shared content experiences may make use of spatial computing by leveraging cinema techniques so that the virtual object can feel realistic and perceptually present in the room. This presentation tool may include animation, visual effects, and sound effects of scenes that are associated with portions of a virtual object (e.g., markings that are carved into the body of a statue) in spatial computing. Advantageously, use of different viewing modes allows individual users to see different virtual content despite being in a shared viewing space or alternatively, to see the same virtual content in different locations within a shared space.

Implementations of the disclosed systems and methods may provide for improved avatars and a more realistic interaction between a user of the wearable system and avatars in the user's environment. Although the examples in this disclosure describe animating a human-shaped avatar, similar techniques can also be applied to animals, fictitious creatures, objects, etc.

Examples of 3D Display of a Wearable System

A wearable system (also referred to herein as an augmented reality (AR) system), such as the example discussed below with reference to FIG. 2, can be configured to present 2D or 3D images of virtual objects to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR environment 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a flying cartoon-like avatar character 140 that seems to be a personification of a bumble bee, even though these elements do not exist in the real world.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth planes or based on observing different image features on different depth planes being out of focus. As discussed elsewhere herein, such depth cues provide credible perceptions of depth.

Figure 2:
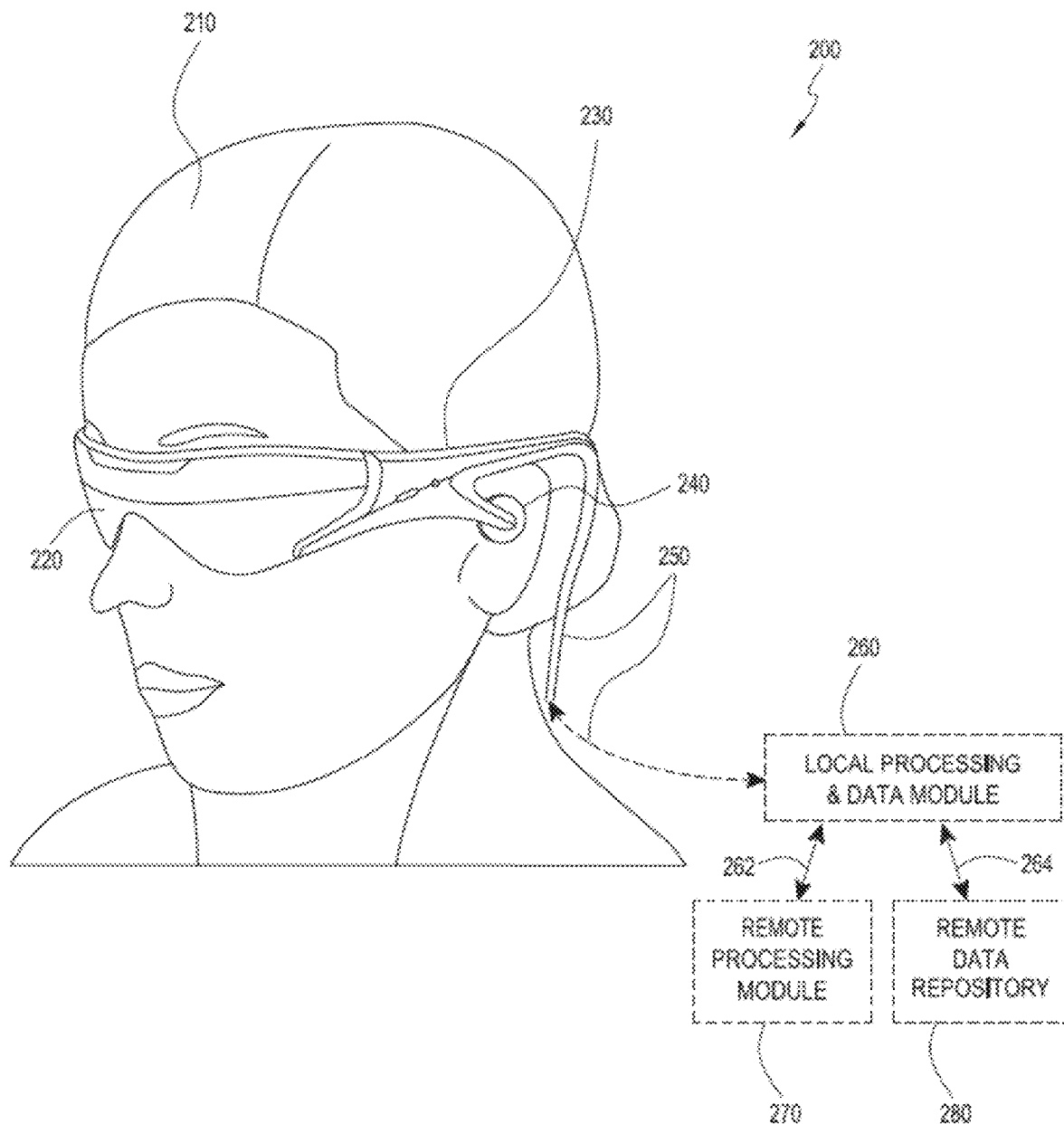
FIG. 2 schematically illustrates an example of a wearable system.

FIG. 2 illustrates an example of wearable system 200 which can be configured to provide an AR/VR/MR scene. The wearable system 200 can also be referred to as the AR system 200 or the wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some implementations, a speaker 240 is coupled to the frame 230 and positioned adjacent the ear canal of the user (in some implementations, another speaker, not shown, is positioned adjacent the other ear canal of the user to provide for stereo/shapeable sound control). The display 220 can include an audio sensor (e.g., a microphone) for detecting an audio stream from the environment and/or capture ambient sound. In some implementations, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 and/or 270, which may process image information acquired by the inward-facing imaging system to determine, e.g., the pupil diameters or orientations of the eyes, eye movements or eye pose of the user 210. The inward-facing imaging system 462 may include one or more cameras or other imaging devices. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and/or storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 270 and remote data repository 280 may be operatively coupled to each other.

In some implementations, the remote processing module 270 may comprise one or more processors configured to analyze and process data or image information. In some implementations, the remote data repository 280 may comprise a digital data storage facility, which may be available through the internet or other networking configuration in a "cloud" resource configuration. In some implementations, all data is stored and all computations (e.g., AR processes discussed herein) are performed in the local processing and data module, allowing fully autonomous use from a remote module. In other implementations, some or all of the computations of certain AR processes discussed herein are performed remotely, such as at a network-connected server.

Example Components of a Wearable System

Figure 3:
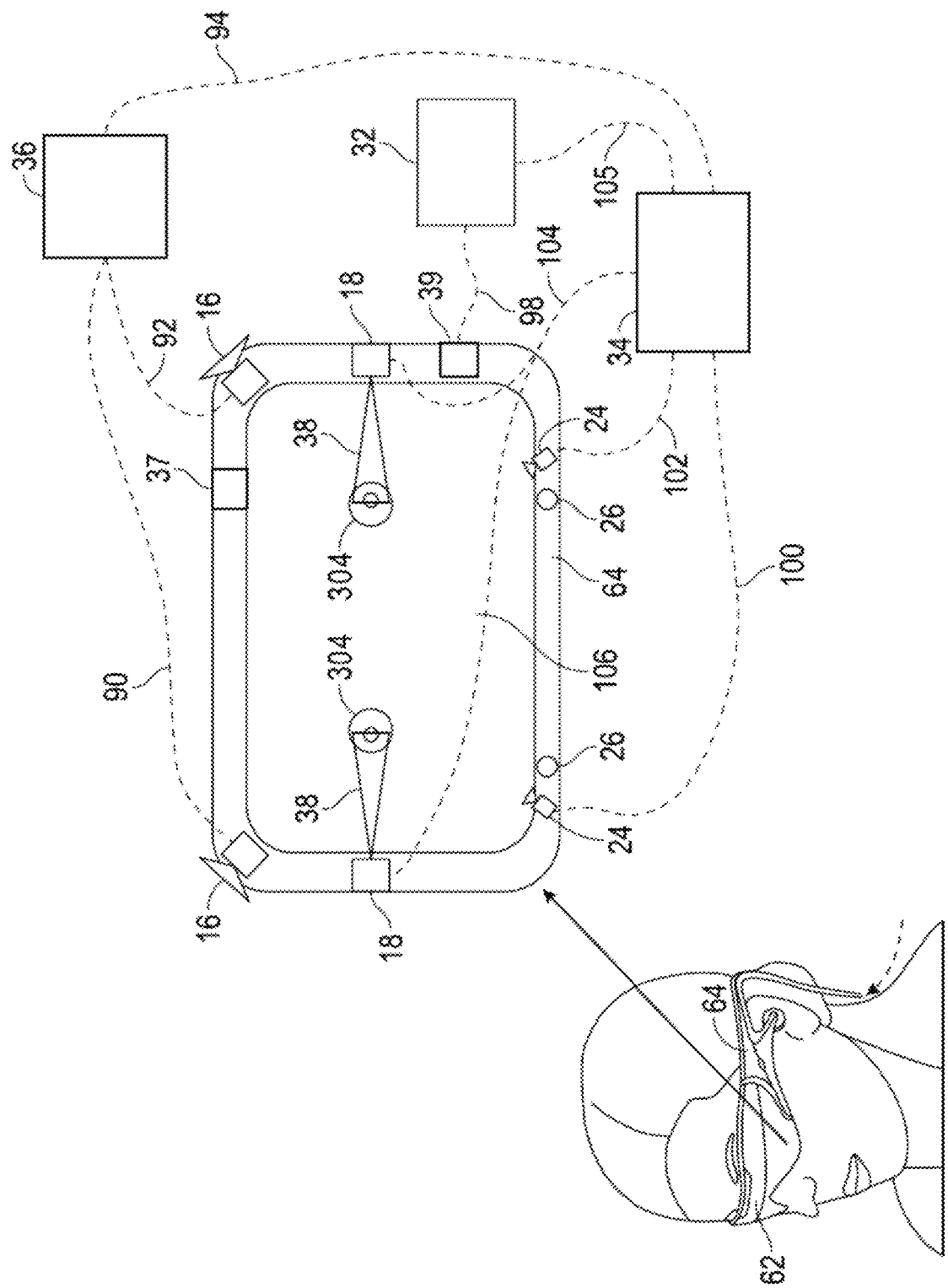
FIG. 3 schematically illustrates example components of a wearable system.

FIG. 3 schematically illustrates example components of a wearable system. FIG. 3 shows the wearable system 200, including the display 220 and the frame 230. A blown-up view 202 schematically illustrates various components of the wearable system 200. In certain implementations, one or more of the components illustrated in FIG. 3 can be part of the display 220. The various components alone or in combination can collect a variety of data (such as e.g., audio or visual data) associated with the user of the wearable system 200 or the user's environment. In other implementations, a wearable system may include additional or fewer components depending on the application for which the wearable system is used. Nevertheless, FIG. 3 provides a basic idea of some of the various components and types of data that may be collected, analyzed, and stored through the wearable system.

In the example of FIG. 3, the display 220 can comprise a display lens 226 that may be mounted to a user's head or a housing or the frame 230. The display lens 226 may comprise one or more transparent mirrors positioned by the frame 230 in front of the user's eyes 302, 304 and may be configured to bounce projected light 38 into the eyes 302, 304 and facilitate beam shaping, while also allowing for transmission of at least some light from the local environment. The wavefront of the projected light beam 38 may be bent or focused to coincide with a desired focal distance of the projected light. As illustrated, two wide-field-of-view machine vision cameras 16 (also referred to as world cameras) can be coupled to the frame 230 to image the environment around the user. These world cameras 16 can be dual capture visible light/non-visible (e.g., infrared) light cameras. The cameras 316 may be part of the outward-facing imaging system 464 shown in FIG. 4. Images acquired by the world cameras 16 can be processed by the pose processor 36. For example, the pose processor 36 can implement one or more object recognizers 708 (e.g., shown in FIG. 7) to identify a pose of a user or another person in the user's environment or to identify a physical object in the user's environment.

The pose processor 36 may include one or more processors, such as an ASIC (application specific integrated circuit), FPGA (field programmable gate array), or ARM processor (advanced reduced-instruction-set machine), which may be configured to calculate real or near-real time user head pose from wide field of view image information output from the world cameras 16. The head pose processor 36 can be a hardware processor and can be implemented as part of the local processing and data module 260 shown in FIG. 2.

With continued reference to FIG. 3, a pair of scanned-laser shaped-wavefront (e.g., for depth) light projection subsystem 18 with display mirrors and optics configured to project light 38 into the eyes 302, 304 are shown. The depicted view also shows two miniature infrared cameras 24 paired with infrared light (such as light emitting diodes "LED"s), which are configured to be able to track the eyes 302, 304 of the user to support rendering and user input. The cameras 24 may be part of the inward-facing imaging system 462 shown in FIG. 4.

The wearable system 200 can further feature a sensor assembly 39, which may comprise X, Y, and Z axis accelerometer capability and/or a magnetic compass and X, Y, and Z axis gyro capability, preferably providing data at a relatively high frequency, such as 200 Hz or more. The sensor assembly 39 may be part of the IMU described with reference to FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, and/or a depth sensing camera. In certain implementations, where the cameras 316 have depth sensing ability, the cameras 16 may also be considered as depth sensors 234.

In the example of FIG. 3, a sensor pose processor 32 is configured to execute digital and/or analog processing to derive pose from the gyro, compass, and/or accelerometer data from the sensor assembly 39. The sensor pose processor 32 may be part of the local processing and data module 260 shown in FIG. 2.

The wearable system 200 as shown in FIG. 3 can also include a position system such as, e.g., a GPS 37 (global positioning system) to assist with pose and positioning analyses. In addition, the GPS may further provide remotely-based (e.g., cloud-based) information about the user's environment. This information may be used for recognizing objects or information in the user's environment.

The wearable system may combine data acquired by the GPS 37 and a remote computing system (such as, e.g., the remote processing module 270, another user's ARD, etc.)

which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 16 (which may be part of the outward-facing imaging system 464 shown in FIG. 4). Based on the images acquired by the world cameras 16, the wearable system 200 can detect objects in the environment (e.g., by using one or more object recognizers 708 shown in FIG. 7). The wearable system can further use data acquired by the GPS 37 to interpret the detected objects, e.g., such as to determine that an object is associated with a character.

The wearable system 200 may also comprise a rendering engine 34 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some implementations, the rendering engine is part of the local processing and data module 260. The rendering engine 34 can be communicatively coupled (e.g., via wired or wireless links) to other components of the wearable system 200. For example, the rendering engine 34, can be coupled to the eye cameras 24 via communication link 274, and/or be coupled to a projecting subsystem 18 (which can project light into user's eyes 302, 304 via a scanned laser arrangement in a manner similar to a retinal scanning display) via the communication link 272. The rendering engine 34 can also be in communication with other processing units such as, e.g., the sensor pose processor 32 and the image pose processor 36 via links 105 and 94 respectively.

The cameras 24 (e.g., mini infrared cameras) may be utilized to track the eye pose to support rendering and user input. Some example eye poses may include where the user is looking or at what depth he or she is focusing (e.g., which may be estimated with eye vergence). The GPS 37, gyros, compass, and/or accelerometers may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some implementations may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 36, sensor pose processor 32, and rendering engine 34 may be positioned in a beltpack and configured to communicate with other components of the wearable system via wireless communication, such as ultra-wideband, Wi-Fi, Bluetooth, etc., or via wired communication. The depicted frame 230 preferably is head-mountable and wearable by the user. However, some components of the wearable system 200 may be worn on other portions of the user's body. For example, the speaker 240 may be inserted into, and/or positioned near, the ears of a user to provide sound to the user.

Regarding the projection of light 38 into the eyes 302, 304 of the user, in some implementations, the cameras 24 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

Spatially coherent light with a beam diameter of less than about 0.7 millimeters can typically be correctly resolved by the human eye regardless of where the eye focuses. Thus, to create an illusion of proper focal depth, the eye vergence may be tracked with the cameras 24, and the rendering engine 34 and projection subsystem 18 may be utilized to render all objects on or close to the horopter in focus, and all other objects at varying degrees of defocus (e.g., using intentionally-created blurring). In one implementation, the display 220 renders to the user at a frame rate of about 60 frames per second or greater. As described above, the cameras 24 may be utilized for eye tracking, and software may be configured to pick up not only vergence geometry but also focus location cues to serve as user inputs. Such a display system may be configured with brightness and contrast suitable for day or night use.

In some implementations, the display system has latency of less than about 20 milliseconds for visual object alignment, less than about 0.1 degree of angular alignment, and about 1 arc minute of resolution, which, without being limited by theory, is believed to be approximately the limit of the human eye. The display 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the wearable system to know where it is with respect to the real world).

In some implementations, the wearable system 200 is configured to display one or more images of virtual objects (also referred to as "virtual images" herein) based on the accommodation of the user's eyes. Unlike prior 3D display approaches that force the user to focus where the images are being projected, in some implementations, the wearable system is configured to automatically vary the focus of projected virtual content to allow for a more comfortable viewing of one or more images presented to the user. For example, if the user's eyes have a current focus of 1 meter, the image may be projected to coincide with the user's focus. If the user shifts focus to 3 meters, the image is projected to coincide with the new focus. Thus, rather than forcing the user to a predetermined focus, the wearable system 200 of some implementations allows the user's eye to a function in a more natural manner.

Such a wearable system 200 may eliminate or reduce the incidences of eye strain, headaches, and/or other physiological symptoms typically observed with respect to virtual reality devices. To achieve this, various implementations of the wearable system 200 are configured to project virtual images at varying focal distances, through one or more variable focus elements (VFEs). In one or more implementations, 3D perception may be achieved through a multi-plane focus system that projects images at fixed focal planes away from the user. Other implementations employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In some implementations, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some implementations, a spatial light modulator may project the images to the user through various optical components. For example, as described further below, the spatial light modulator may project the images onto one or more waveguides, which then transmit the images to the user.

Example Waveguide Stack Assembly

Figure 4:
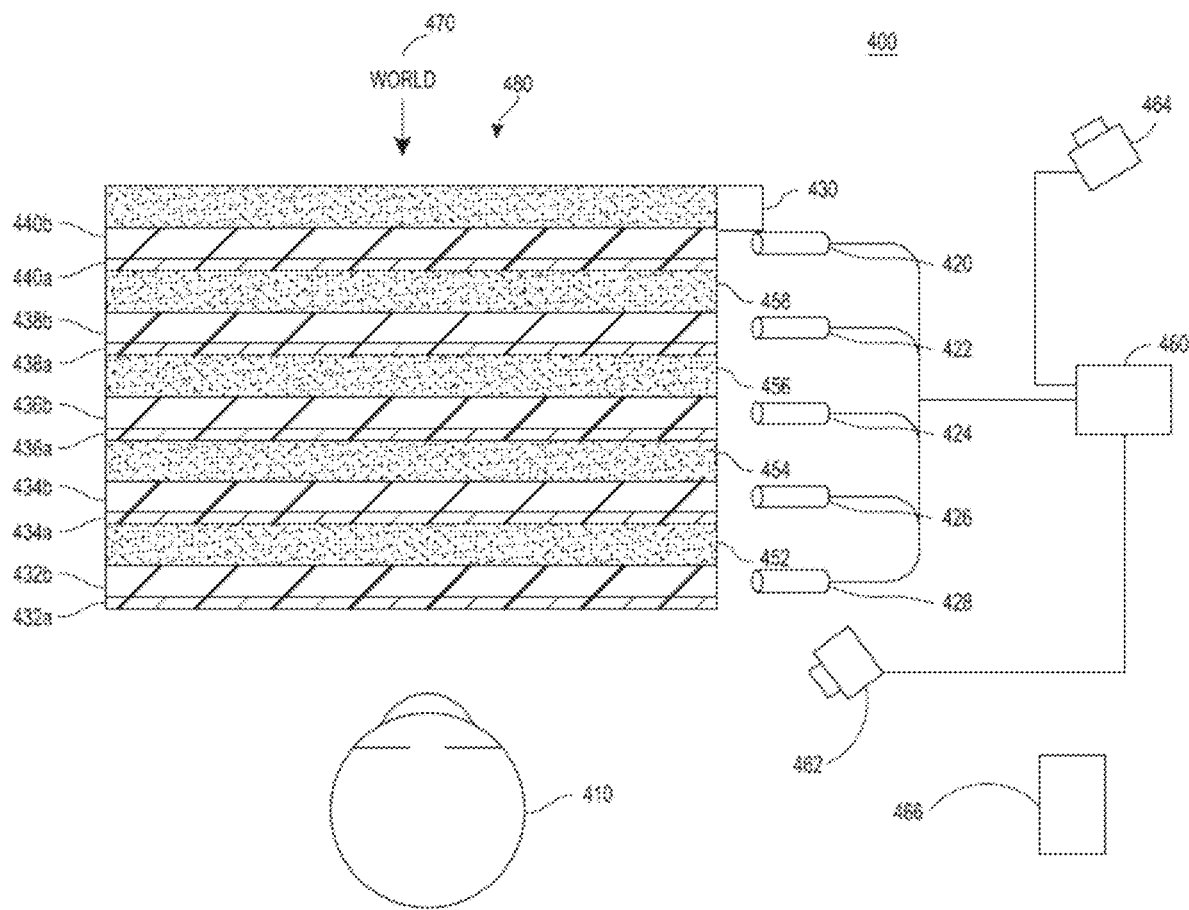
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432*b*, 434*b*, 436*b*, 438*b*, 440*b*. In some implementations, the wearable system 400 may correspond to wearable system 200 of FIG. 2, with FIG. 4 schematically showing some parts of the wearable system 200 in greater detail and not showing certain other components. For example, in some implementations, the waveguide assembly 480 may be integrated into the display 220 of FIG. 2.

With continued reference to FIG. 4, the waveguide assembly 480 may also include a plurality of features 458, 456, 454, 452 between the waveguides. In some implementations, the features 458, 456, 454, 452 may be lenses. In other implementations, the features 458, 456, 454, 452 may not be lenses. Rather, they may simply be spacers (e.g., cladding layers or structures for forming air gaps).

The waveguides 432*b*, 434*b*, 436*b*, 438*b*, 440*b* and/or the plurality of lenses 458, 456, 454, 452 may be configured to send image information to the eye with various levels of wavefront curvature or light ray divergence. Positions of the waveguides (e.g., from the eye 410) may be associated with different depth planes and may be configured to output image information corresponding to that depth plane. Image injection devices 420, 422, 424, 426, 428 may be utilized to inject image information into the waveguides 440*b*, 438*b*, 436*b*, 434*b*, 432*b*, each of which may be configured to distribute incoming light across the respective waveguide, for output toward the eye 410. In this example, light exits an output surface of the image injection devices 420, 422, 424, 426, 428 and is injected into a corresponding input edge of the waveguides 440*b*, 438*b*, 436*b*, 434*b*, 432*b*. In some implementations, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some implementations, the image injection devices 420, 422, 424, 426, 428 are discrete displays that each produce image information for injection into a corresponding waveguide 440*b*, 438*b*, 436*b*, 434*b*, 432*b*, respectively. In some implementations, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440*b*, 438*b*, 436*b*, 434*b*, 432*b*. In some implementations, the controller 460 may be a single integral device, or a distributed system connected by wired or wireless communication channels. The controller 460 may be part of the processing modules 260 or 270 (illustrated in FIG. 2) in some implementations.

The waveguides 440*b*, 438*b*, 436*b*, 434*b*, 432*b* may be configured to propagate light within each respective waveguide by total internal reflection (TIR). The waveguides 440*b*, 438*b*, 436*b*, 434*b*, 432*b* may be planar or have another shape (e.g., curved), with major top and bottom surfaces and edges extending between those major top and bottom surfaces. In the illustrated configuration, the waveguides 440*b*, 438*b*, 436*b*, 434*b*, 432*b* may each include light extracting optical elements 440*a*, 438*a*, 436*a*, 434*a*, 432*a* that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some implementations, the light extracting optical elements 440a, 438a, 436a, 434a, 432a may be disposed at the top or bottom major surfaces, or may be disposed directly in the volume of the waveguides 440b, 438b, 436b, 434b, 432b. In some implementations, the light extracting optical elements 440a, 438a, 436a, 434a, 432a may be formed in a layer of material that is attached to a transparent substrate to form the waveguides 440b, 438b, 436b, 434b, 432b. In some implementations, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to the example of FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative implementations, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some implementations, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some implementations, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some implementations, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some implementations, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some implementations, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an implementation of the local processing and data module 260) can be configured or programmed to cease providing image information to one of these waveguides. Advantageously, this may reduce the processing burden on the system, thereby increasing the responsiveness of the system. In implementations in which the DOEs for a waveguide are switchable between the on and off states, the DOEs may be switched to the off state when the waveguide does receive image information.

In some implementations, it may be desirable to have an exit beam meet the condition of having a diameter that is less than the diameter of the eye of a viewer. However, meeting this condition may be challenging in view of the variability in size of the viewer's pupils. In some implementations, this condition is met over a wide range of pupil sizes by varying the size of the exit beam in response to determinations of the size of the viewer's pupil. For example, as the pupil size decreases, the size of the exit beam may also decrease. In some implementations, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the FOV of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor, e.g., a microphone, to capture ambient sound. As described above, in some implementations, one or more other audio sensors can be positioned to provide stereo sound reception useful to the determination of location of a speech source. The audio sensor can comprise a directional microphone, as another example, which can also provide such useful directional information as to where the audio source is located. The wearable system 400 can use information from both the outward-facing imaging system 464 and the audio sensor in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 462 (e.g., a digital camera), which observes the movements of the user, such as the eye movements and the facial movements. The inward-facing imaging system 462 may be used to capture images of the eye 410 to determine the size and/or orientation of the pupil of the eye 304. The inward-facing imaging system 462 can be used to obtain images for use in determining the direction the user is looking (e.g., eye pose) or for biometric identification of the user (e.g., via iris identification). In some implementations, at least one camera may be utilized for each eye, to separately determine the pupil size or eye pose of each eye independently, thereby allowing the presentation of image information to each eye to be dynamically tailored to that eye. In some other implementations, the pupil diameter or orientation of only a single eye 410 (e.g., using only a single camera per pair of eyes) is determined and assumed to be similar for both eyes of the user. The images obtained by the inward-facing imaging system 462 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an implementation of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
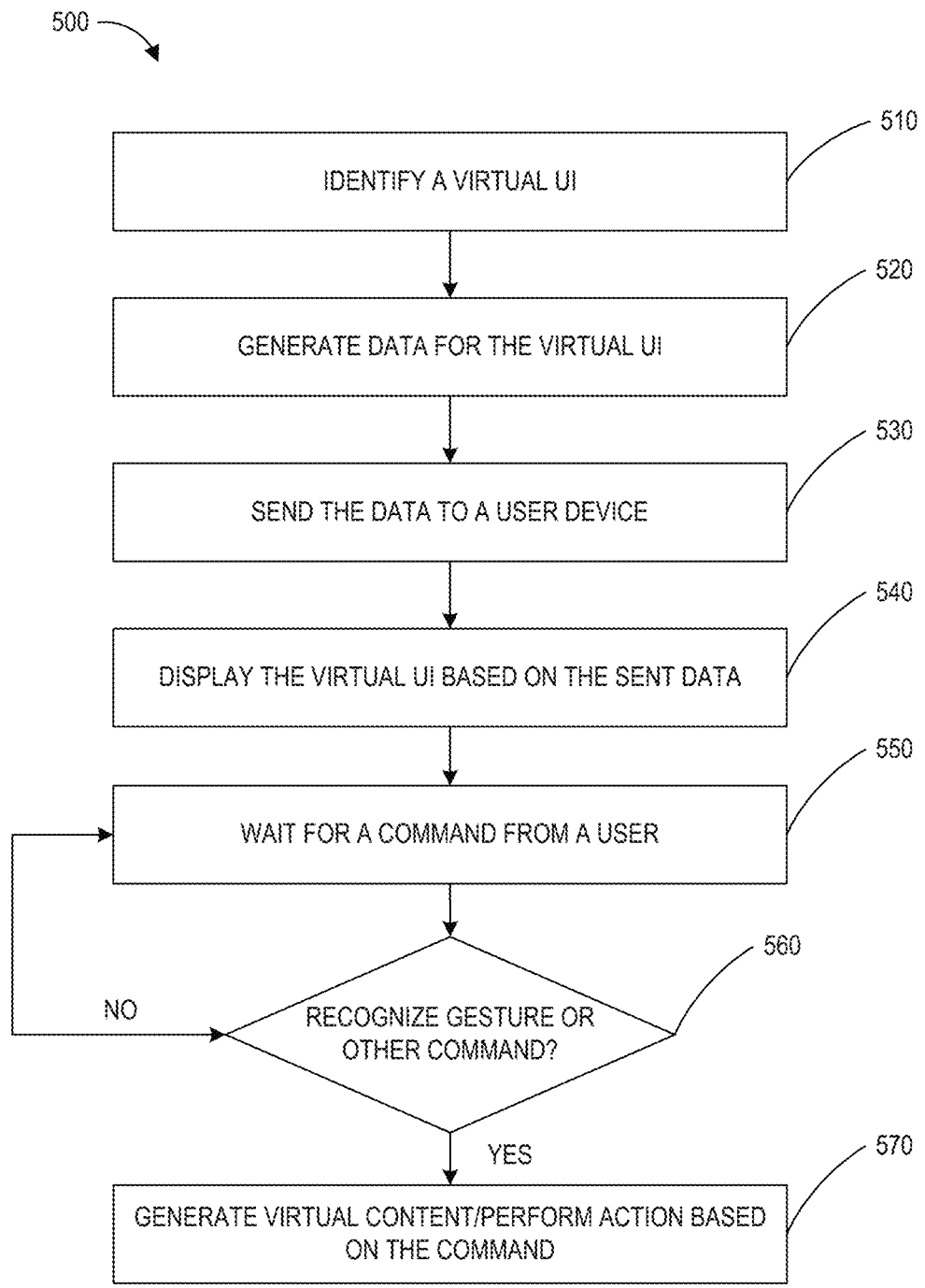
FIG. 5 is a flowchart illustrating an example process of interacting with a virtual user interface.

FIG. 5 is a process flow diagram of an example of a method 500 for interacting with a virtual user interface. The method 500 may be performed by the wearable system described herein. Implementations of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
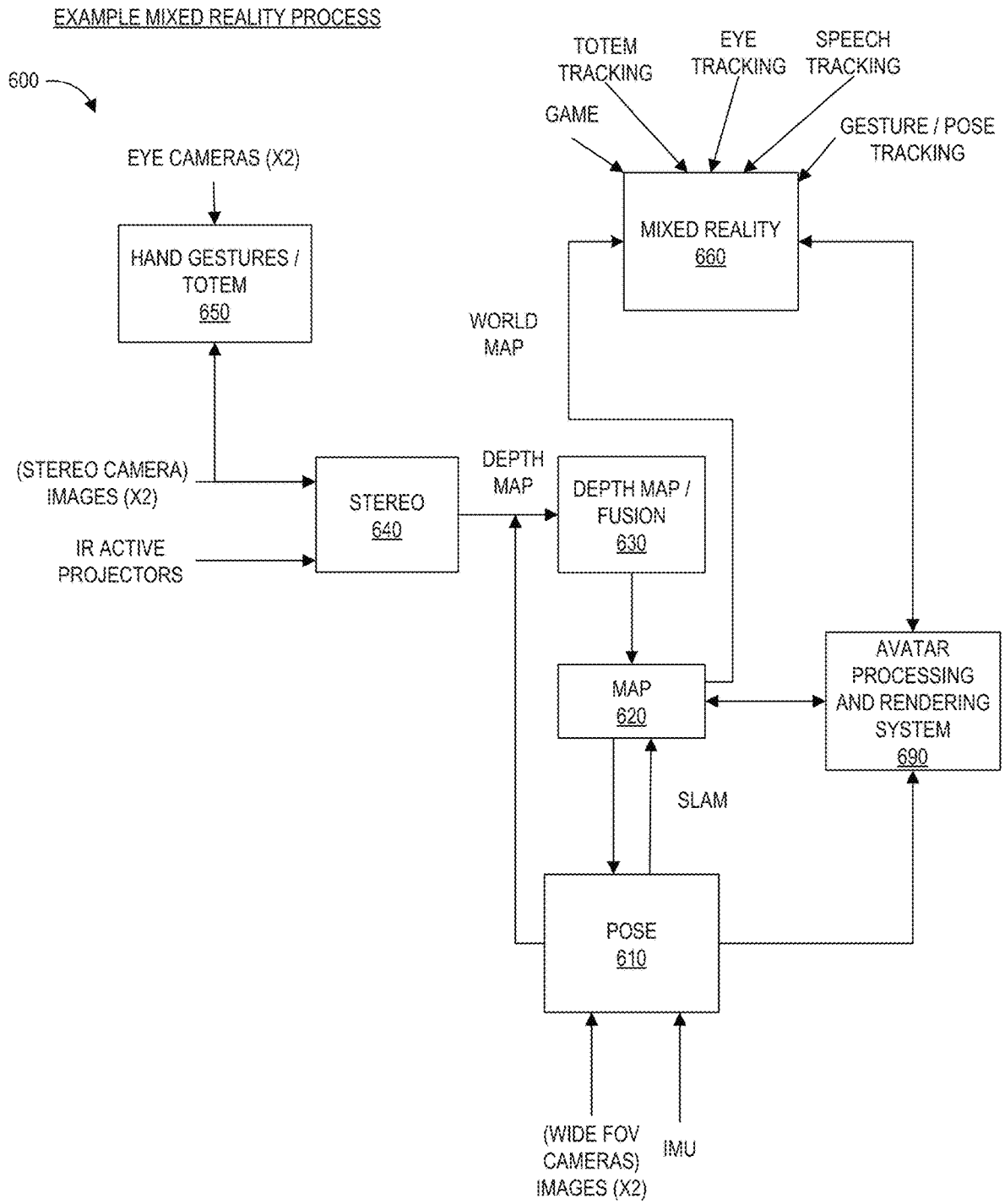
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one implementation, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the implementation depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one implementation, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one implementation, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 270 alone or in combination. In various implementations, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A and 9B.

Figure 6B:
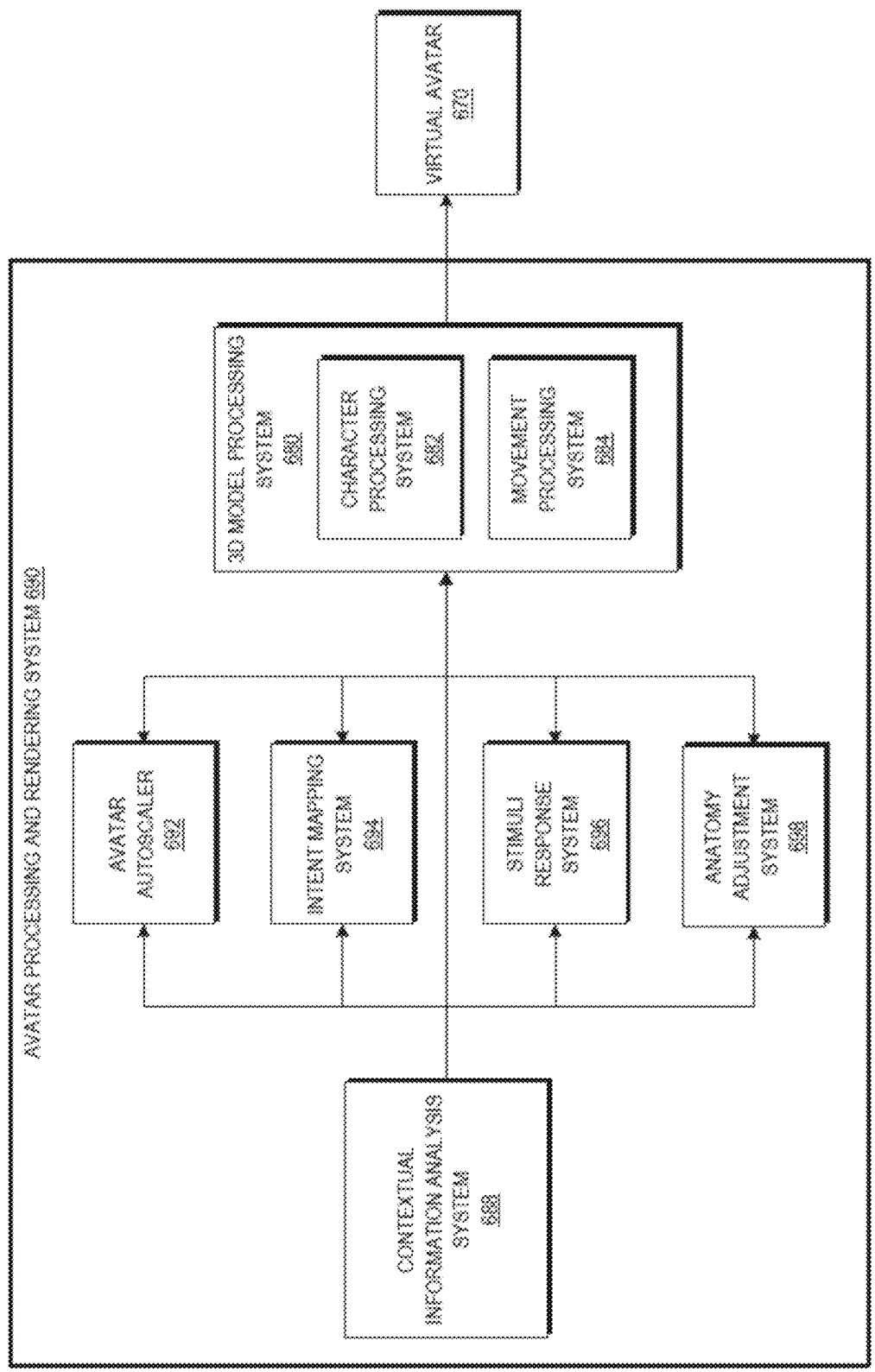
FIG. 6B is a block diagram illustrating example components of an avatar processing and rendering system.

FIG. 6B illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some implementations, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc.

Examples of Mapping a User's Environment

Figure 7:
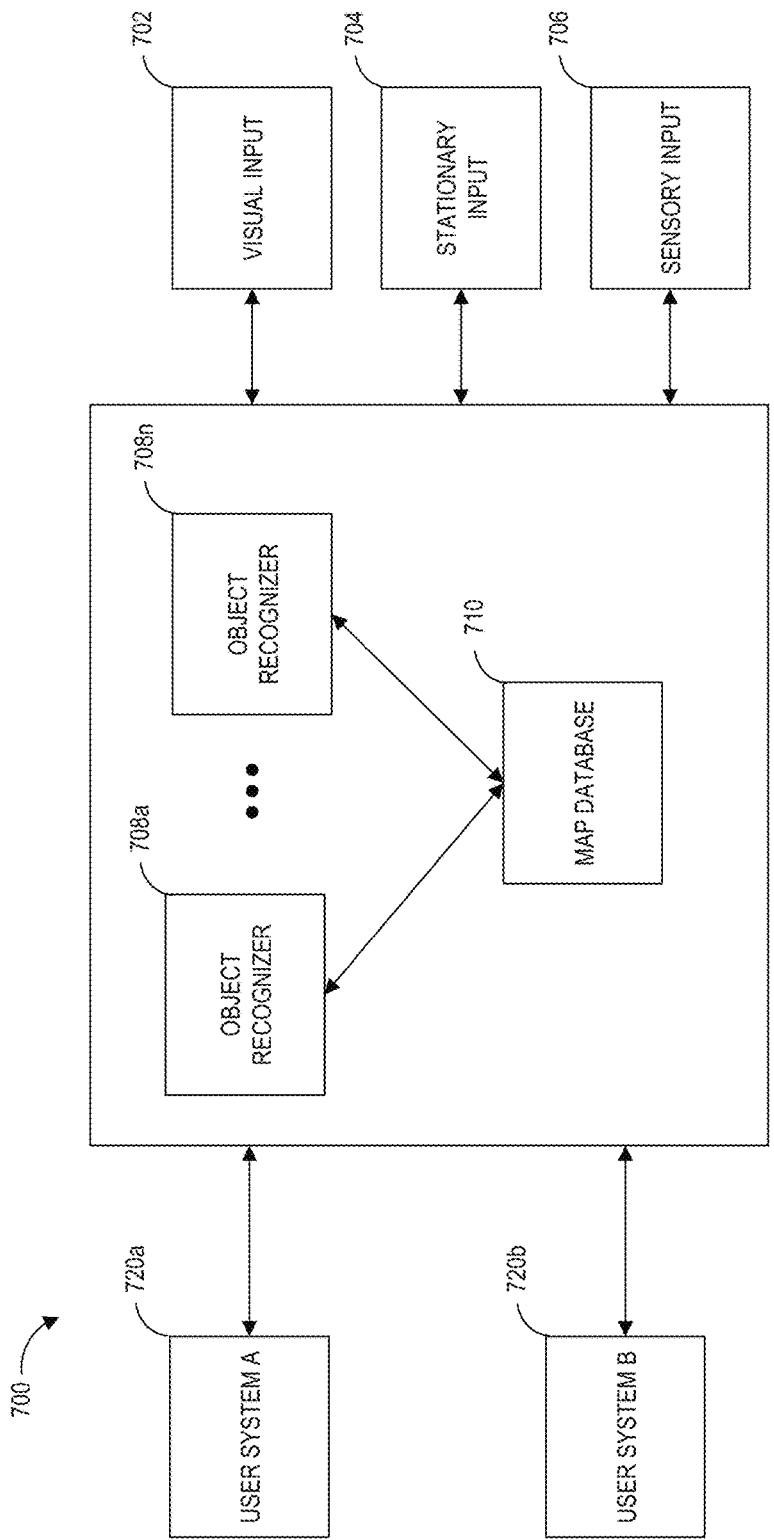
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some implementations, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some implementations, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
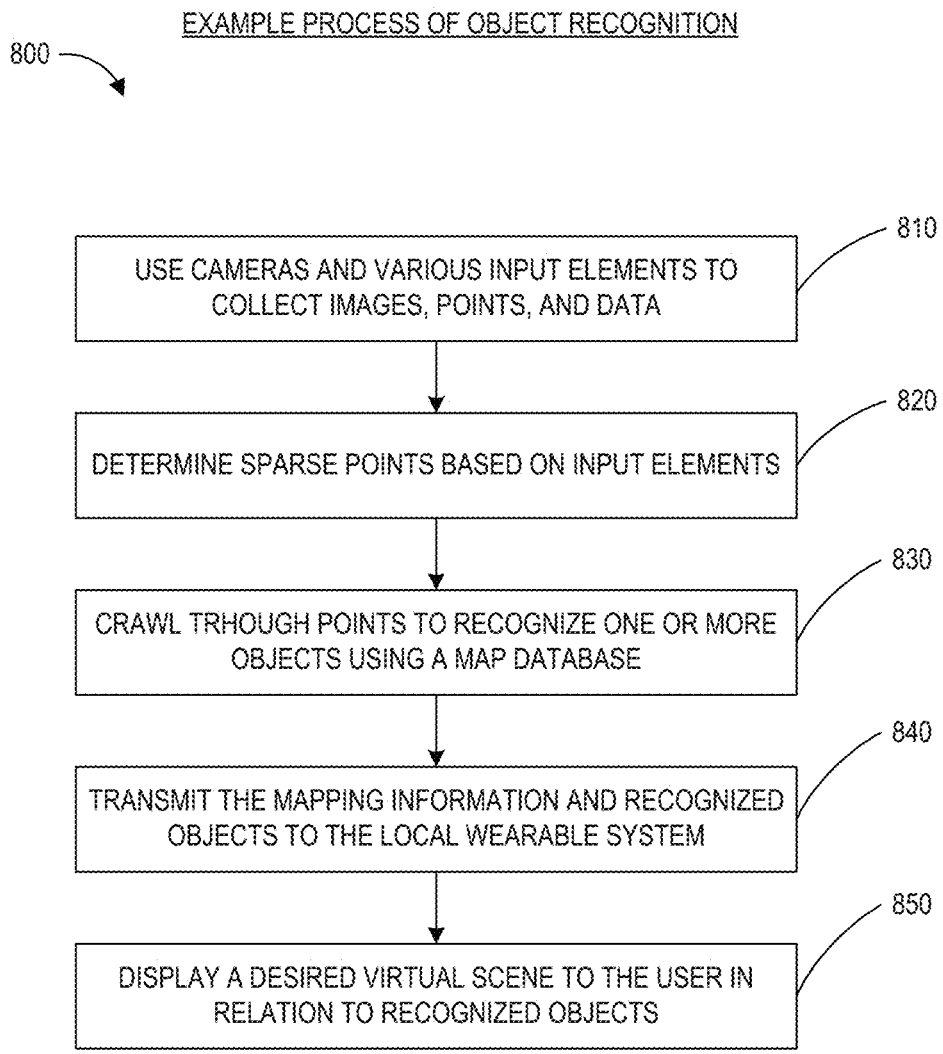
FIG. 8 is a flowchart illustrating an example process of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple Wearable Systems

Figure 9A:
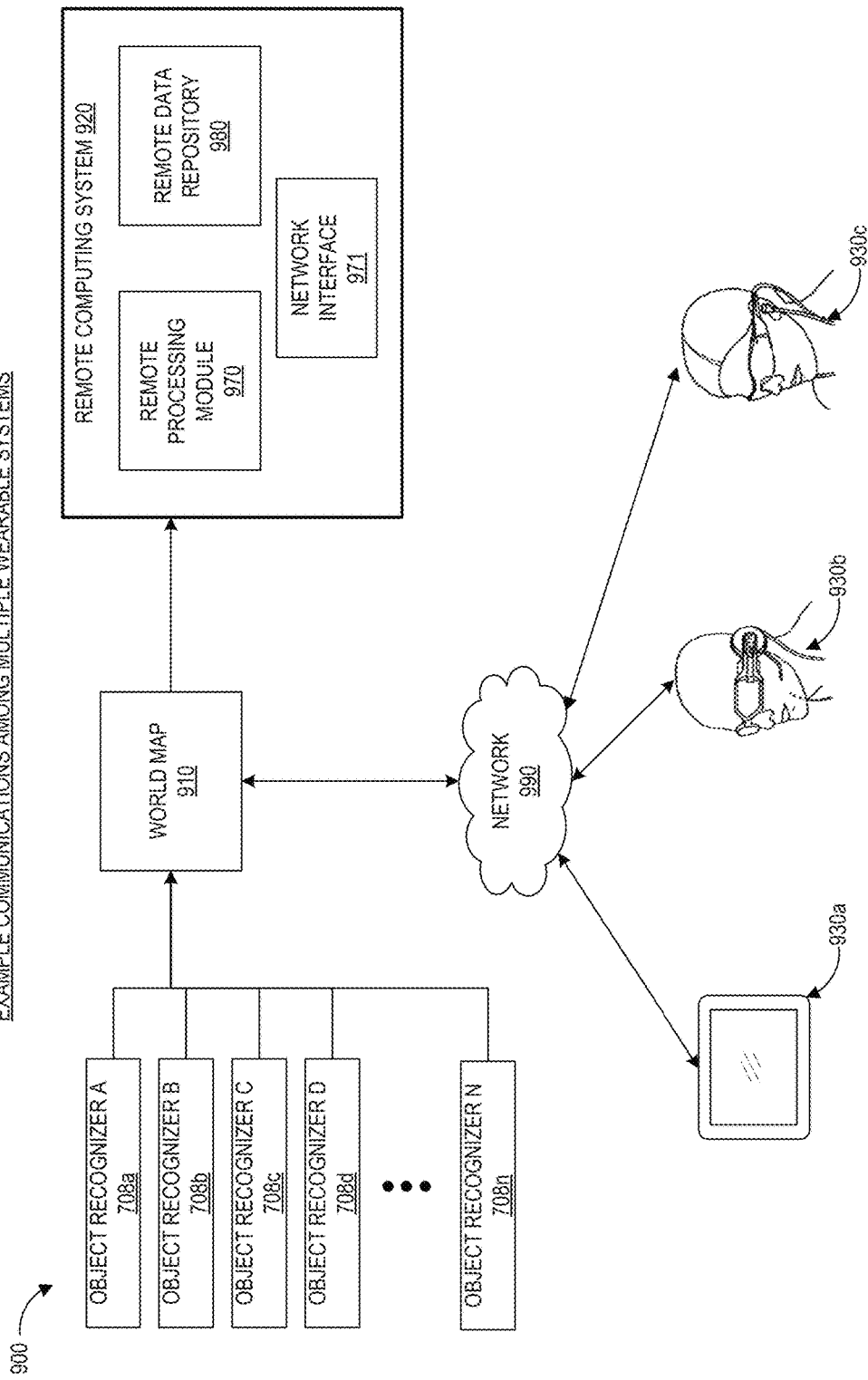
FIG. 9A schematically illustrates components of a system that coordinates interactions between multiple wearable systems.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an implementation of the remote data repository 280 shown in FIG. 2. The remote computing system 920 may also include a remote processing module 970. The remote processing module 970 may be an implementation of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an implementation of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 920 (FIG. 9A) can construct, update, and build a collection of images, points and other information using the information obtained from the user devices. For example, the user device may process raw information acquired and send the processed information to the remote computing system 920 for further processing. The user device may also send the raw information to the remote computing system 920 for processing. The user device may receive the processed information from the remote computing system 920 and provide final processing before projecting to the user. The user device may also process the information obtained and pass the processed information to other user devices. The user device may communicate with the remote data repository 980 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930a, 930b, 930c), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

Figure 9B:
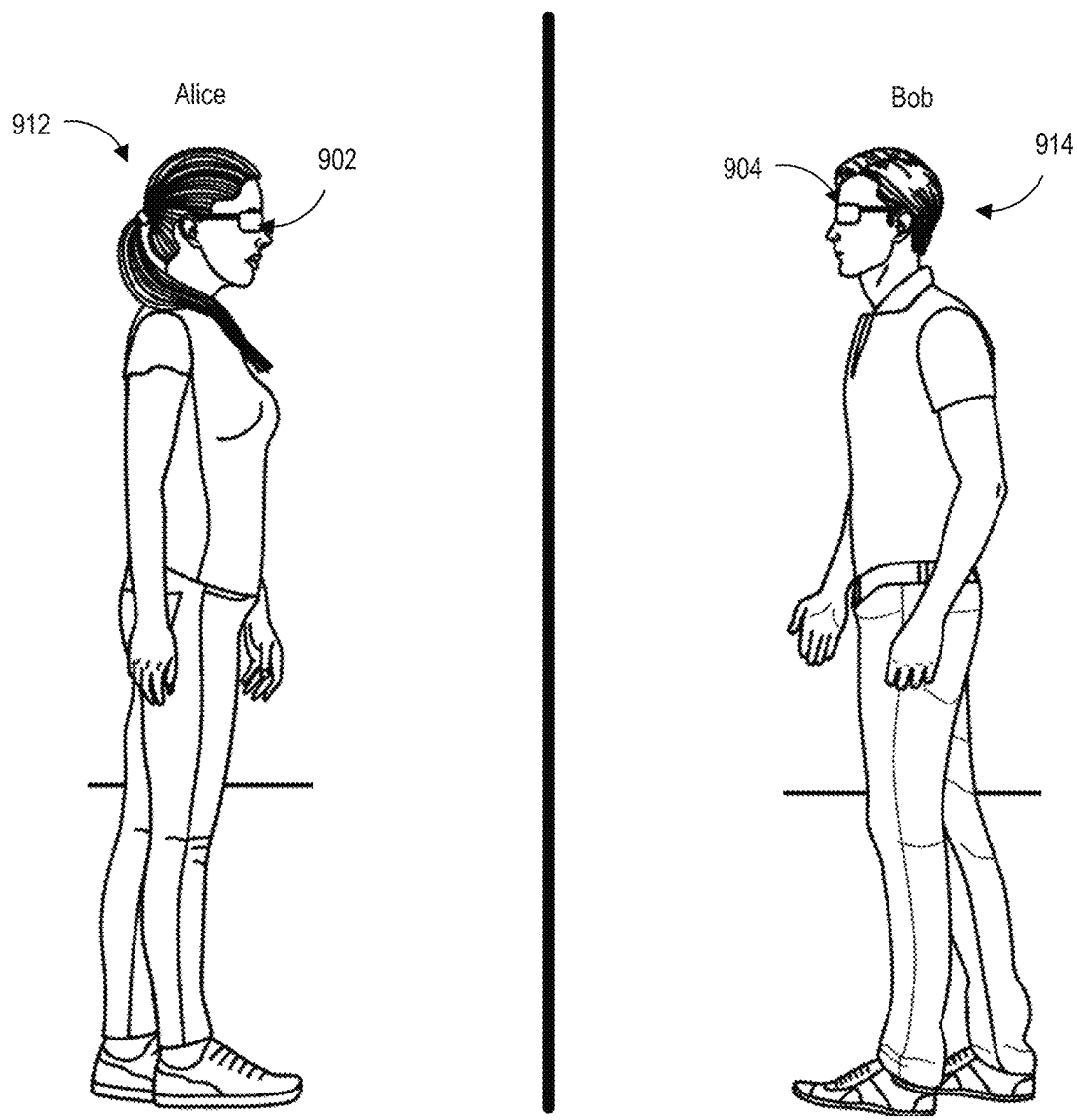
FIG. 9B illustrates an example telepresence session.

FIG. 9B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display 220 of the wearable system 200) for representing a virtual avatar of the other user in the telepresence session. The two users can conduct a telepresence session using the wearable device. Note that the vertical line in FIG. 9B separating the two users is intended to illustrate that Alice 912 and Bob 914 may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Examples of a Virtual Avatar

FIG. 10 illustrates an example of an avatar as perceived by a user of a wearable system. The example avatar 1000 shown in FIG. 10 can be an avatar of Alice 912 (shown in FIG. 9B) standing behind a physical plant in a room. An avatar can include various characteristics, such as for example, size, appearance (e.g., skin color, complexion, hair style, clothes, facial features, such as wrinkles, moles, blemishes, pimples, dimples, etc.), position, orientation, movement, pose, expression, etc. These characteristics may be based on the user associated with the avatar (e.g., the avatar 1000 of Alice may have some or all characteristics of the actual person Alice 912). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Examples of Rigging Systems for Virtual Characters

An animated virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics. In addition, the vertices of a polygon in a mesh may be collinear, in which case the polygon has zero area (referred to as a degenerate polygon).

In some implementations, a mesh is made up of three-vertex polygons (i.e., triangles or "tris" for short) or four-vertex polygons (i.e., quadrilaterals or "quads" for short). However, higher-order polygons can also be used in some meshes. Meshes are typically quad-based in direct content creation (DCC) applications (e.g., applications such as Maya (available from Autodesk, Inc.) or Houdini (available from Side Effects Software Inc.) which are primarily designed for creating and manipulating 3D computer graphics), whereas meshes are typically tri-based in real-time applications.

To animate a virtual character, its mesh can be deformed by moving some or all of its vertices to new positions in space at various instants in time. The deformations can represent both large-scale movements (e.g., movement of limbs) and fine movements (e.g., facial movements). These and other deformations can be based on real-world models (e.g., photogrammetric scans of real humans performing body movements, articulations, facial contortions, expressions, etc.), art-directed development (which may be based on real-world sampling), combinations of the same, or other techniques. In the early days of computer graphics, mesh deformations could be accomplished manually by independently setting new positions for the vertices, but given the size and complexity of modern meshes it is typically desirable to produce deformations using automated systems and processes. The control systems, processes, and techniques for producing these deformations are referred to as rigging, or simply "the rig." The example avatar processing and rendering system 690 of FIG. 6B includes a 3D model processing system 680 which can implement rigging.

The rigging for a virtual character can use skeletal systems to assist with mesh deformations. A skeletal system includes a collection of joints which correspond to points of articulation for the mesh. In the context of rigging, joints are sometimes also referred to as "bones" despite the difference between these terms when used in the anatomical sense. Joints in a skeletal system can move, or otherwise change, with respect to one another according to transforms which can be applied to the joints. The transforms can include translations or rotations in space, as well as other operations. The joints can be assigned hierarchical relationships (e.g., parent-child relationships) with respect to one another. These hierarchical relationships can allow one joint to inherit transforms or other characteristics from another joint. For example, a child joint in a skeletal system can inherit a transform assigned to its parent joint so as to cause the child joint to move together with the parent joint.

A skeletal system for a virtual character can be defined with joints at appropriate positions, and with appropriate local axes of rotation, degrees of freedom, etc., to allow for a desired set of mesh deformations to be carried out. Once a skeletal system has been defined for a virtual character, each joint can be assigned, in a process called "skinning," an amount of influence over the various vertices in the mesh. This can be done by assigning a weight value to each vertex for each joint in the skeletal system. When a transform is applied to any given joint, the vertices under its influence can be moved, or otherwise altered, automatically based on that joint transform by amounts which can be dependent upon their respective weight values.

A rig can include multiple skeletal systems. One type of skeletal system is a core skeleton (also referred to as a low-order skeleton) which can be used to control large-scale movements of the virtual character. In the case of a human avatar, for example, the core skeleton might resemble the anatomical skeleton of a human. Although the core skeleton for rigging purposes may not map exactly to an anatomically-correct skeleton, it may have a sub-set of joints in analogous locations with analogous orientations and movement properties.

As briefly mentioned above, a skeletal system of joints can be hierarchical with, for example, parent-child relationships among joints. When a transform (e.g., a change in position and/or orientation) is applied to a particular joint in the skeletal system, the same transform can be applied to all other lower-level joints within the same hierarchy. In the case of a rig for a human avatar, for example, the core skeleton may include separate joints for the avatar's shoulder, elbow, and wrist. Among these, the shoulder joint may be assigned to the highest level in the hierarchy, while the elbow joint can be assigned as a child of the shoulder joint, and the wrist joint can be assigned as a child of the elbow joint. Accordingly, when a particular translation and/or rotation transform is applied to the shoulder joint, the same transform can also be applied to the elbow joint and the wrist joint such that they are translated and/or rotated in the same way as the shoulder.

Despite the connotations of its name, a skeletal system in a rig need not necessarily represent an anatomical skeleton. In rigging, skeletal systems can represent a wide variety of hierarchies used to control deformations of the mesh. For example, hair can be represented as a series of joints in a hierarchical chain; skin motions due to an avatar's facial contortions (which may represent expressions such as smiling, frowning, laughing, speaking, blinking, etc.) can be represented by a series of facial joints controlled by a facial rig; muscle deformation can be modeled by joints; and motion of clothing can be represented by a grid of joints.

The rig for a virtual character can include multiple skeletal systems, some of which may drive the movement of others. A lower-order skeletal system is one which drives one or more higher-order skeletal systems. Conversely, higher-order skeletal systems are ones which are driven or controlled by a lower-order skeletal system. For example, whereas the movements of the core skeleton of a character might be controlled manually by an animator, the core skeleton can in turn drive or control the movements of a higher-order skeletal system. For example, higher-order helper joints—which may not have anatomical analogs in a physical skeleton—can be provided to improve the mesh deformations which result from movements of the core skeleton. The transforms applied to these and other joints in higher-order skeletal systems may be derived algorithmically from the transforms applied to the lower-order skeleton. Higher-order skeletons can represent, for example, muscles, skin, fat, clothing, hair, or any other skeletal system which does not require direct animation control.

As already discussed, transforms can be applied to joints in skeletal systems in order to carry out mesh deformations. In the context of rigging, transforms include functions which accept one or more given points in 3D space and produce an output of one or more new 3D points. For example, a transform can accept one or more 3D points which define a joint and can output one or more new 3D points which specify the transformed joint. Joint transforms can include, for example, a translation component, a rotation component, and a scale component.

A translation is a transform which moves a set of one or more specified points in the modeled 3D space by a specified amount with no change in the orientation or size of the set of points. A rotation is a transform which rotates a set of one or more specified points in the modeled 3D space about a specified axis by a specified amount (e.g., rotate every point in the mesh 45 degrees about the z-axis). An affine transform (or 6 degree of freedom (DOF) transform) is one which only includes translation(s) and rotation(s). Application of an affine transform can be thought of as moving a set of one or more points in space without changing its size, though the orientation can change.

Meanwhile, a scale transform is one which modifies one or more specified points in the modeled 3D space by scaling their respective coordinates by a specified value. This changes the size and/or shape of the transformed set of points. A uniform scale transform scales each coordinate by the same amount, whereas a non-uniform scale transform can scale the (x, y, z) coordinates of the specified points independently. A non-uniform scale transform can be used, for example, to provide squashing and stretching effects, such as those which may result from muscular action. Yet another type of transform is a shear transform. A shear transform is one which modifies a set of one or more specified points in the modeled 3D space by translating a coordinate of the points by different amounts based on the distance of that coordinate from an axis.

When a transform is applied to a joint to cause it to move, the vertices under the influence of that joint are also moved. This results in deformations of the mesh. As discussed above, the process of assigning weights to quantify the influence each joint has over each vertex is called skinning (or sometimes "weight painting" or "skin weighting"). The weights are typically values between 0 (meaning no influence) and 1 (meaning complete influence). Some vertices in the mesh may be influenced only by a single joint. In that case those vertices are assigned weight values of 1 for that joint, and their positions are changed based on transforms assigned to that specific joint but no others. Other vertices in the mesh may be influenced by multiple joints. In that case, separate weights are assigned to those vertices for all of the influencing joints, with the sum of the weights for each vertex equaling 1. The positions of these vertices are changed based on transforms assigned to all of their influencing joints.

Making weight assignments for all of the vertices in a mesh can be extremely labor intensive, especially as the number of joints increases. Balancing the weights to achieve desired mesh deformations in response to transforms applied to the joints can be quite difficult for even highly trained artists. In the case of real-time applications, the task can be complicated further by the fact that many real-time systems also enforce limits on the number of joints (generally 8 or fewer) which can be weighted to a specific vertex. Such limits are typically imposed for the sake of efficiency in the graphics processing unit (GPU).

The term skinning also refers to the process of actually deforming the mesh, using the assigned weights, based on transforms applied to the joints in a skeletal system. For example, a series of core skeleton joint transforms may be specified by an animator to produce a desired character movement (e.g., a running movement or a dance step). When transforms are applied to one or more of the joints, new positions are calculated for the vertices under the influence of the transformed joints. The new position for any given vertex is typically computed as a weighted average of all the joint transforms which influence that particular vertex. There are many algorithms used for computing this weighted average, but the most common, and the one used in most real-time applications due to its simplicity and ease of control, is linear blend skinning (LBS). In linear blend skinning, a new position for each vertex is calculated using each joint transform for which that vertex has a non-zero weight. Then, the new vertex coordinates resulting from each of these joint transforms are averaged in proportion to the respective weights assigned to that vertex for each of the joints. There are well known limitations to LBS in practice, and much of the work in making high-quality rigs is devoted to finding and overcoming these limitations. Many helper joint systems are designed specifically for this purpose.

In addition to skeletal systems, "blendshapes" can also be used in rigging to produce mesh deformations. A blendshape (sometimes also called a "morph target" or just a "shape") is a deformation applied to a set of vertices in the mesh where each vertex in the set is moved a specified amount in a specified direction based upon a weight. Each vertex in the set may have its own custom motion for a specific blendshape, and moving the vertices in the set simultaneously will generate the desired shape. The custom motion for each vertex in a blendshape can be specified by a "delta," which is a vector representing the amount and direction of XYZ motion applied to that vertex. Blendshapes can be used to produce, for example, facial deformations to move the eyes, lips, brows, nose, dimples, etc., just to name a few possibilities.

Blendshapes are useful for deforming the mesh in an art-directable way. They offer a great deal of control, as the exact shape can be sculpted or captured from a scan of a model. But the benefits of blendshapes come at the cost of having to store the deltas for all the vertices in the blendshape. For animated characters with fine meshes and many blendshapes, the amount of delta data can be significant.

Each blendshape can be applied to a specified degree by using blendshape weights. These weights typically range from 0 (where the blendshape is not applied at all) to 1 (where the blendshape is fully active). For example, a blendshape to move a character's eyes can be applied with a small weight to move the eyes a small amount, or it can be applied with a large weight to create a larger eye movement.

The rig may apply multiple blendshapes in combinations with one another to achieve a desired complex deformation. For example, to produce a smile, the rig may apply blendshapes for lip corner pull, raising the upper lip, and lowering the lower lip, as well as moving the eyes, brows, nose, and dimples. The desired shape from combining two or more blendshapes is known as a combination shape (or simply a "combo").

One problem that can result from applying two blendshapes in combination is that the blendshapes may operate on some of the same vertices. When both blendshapes are active, the result is called a double transform or "going off-model." The solution to this is typically a corrective blendshape. A corrective blendshape is a special blendshape which represents a desired deformation with respect to a currently applied deformation rather than representing a desired deformation with respect to the neutral. Corrective blendshapes (or just "correctives") can be applied based upon the weights of the blendshapes they are correcting. For example, the weight for the corrective blendshape can be made proportionate to the weights of the underlying blendshapes which trigger application of the corrective blendshape.

Corrective blendshapes can also be used to correct skinning anomalies or to improve the quality of a deformation. For example, a joint may represent the motion of a specific muscle, but as a single transform it cannot represent all the non-linear behaviors of the skin, fat, and muscle. Applying a corrective, or a series of correctives, as the muscle activates can result in more pleasing and convincing deformations.

Rigs are built in layers, with lower, simpler layers often driving higher-order layers. This applies to both skeletal systems and blendshape deformations. For example, as already mentioned, the rigging for an animated virtual character may include higher-order skeletal systems which are controlled by lower-order skeletal systems. There are many ways to control a higher-order skeleton or a blendshape based upon a lower-order skeleton, including constraints, logic systems, and pose-based deformation.

A constraint is typically a system where a particular object or joint transform controls one or more components of a transform applied to another joint or object. There are many different types of constraints. For example, aim constraints change the rotation of the target transform to point in specific directions or at specific objects. Parent constraints act as virtual parent-child relationships between pairs of transforms. Position constraints constrain a transform to specific points or a specific object. Orientation constraints constrain a transform to a specific rotation of an object.

Logic systems are systems of mathematical equations which produce some outputs given a set of inputs. These are specified, not learned. For example, a blendshape value might be defined as the product of two other blendshapes (this is an example of a corrective shape known as a combination or combo shape).

Pose-based deformations can also be used to control higher-order skeletal systems or blendshapes. The pose of a skeletal system is defined by the collection of transforms (e.g., rotation(s) and translation(s)) for all the joints in that skeletal system. Poses can also be defined for subsets of the joints in a skeletal system. For example, an arm pose could be defined by the transforms applied to the shoulder, elbow, and wrist joints. A pose space deformer (PSD) is a system used to determine a deformation output for a particular pose based on one or more "distances" between that pose and a defined pose. These distances can be metrics which characterize how different one of the poses is from the other. A PSD can include a pose interpolation node which, for example, accepts a set of joint rotations (defining a pose) as input parameters and in turn outputs normalized per-pose weights to drive a deformer, such as a blendshape. The pose interpolation node can be implemented in a variety of ways, including with radial basis functions (RBFs). RBFs can perform a machine-learned mathematical approximation of a function. RBFs can be trained using a set of inputs and their associated expected outputs. The training data could be, for example, multiple sets of joint transforms (which define particular poses) and the corresponding blendshapes to be applied in response to those poses. Once the function is learned, new inputs (e.g., poses) can be given and their expected outputs can be computed efficiently. RBFs are a subtype of artificial neural networks. RBFs can be used to drive higher-level components of a rig based upon the state of lower-level components. For example, the pose of a core skeleton can drive helper joints and correctives at higher levels.

These control systems can be chained together to perform complex behaviors. As an example, an eye rig could contain two "look around" values for horizontal and vertical rotation. These values can be passed through some logic to determine the exact rotation of an eye joint transform, which might in turn be used as an input to an RBF which controls blendshapes that change the shape of the eyelid to match the position of the eye. The activation values of these shapes might be used to drive other components of a facial expression using additional logic, and so on.

The goal of rigging systems is typically to provide a mechanism to produce pleasing, high-fidelity deformations based on simple, human-understandable control systems. In the case of real-time applications, the goal is typically to provide rigging systems which are simple enough to run in real-time on, for example, a VR/AR/MR wearable system 200, while making as few compromises to the final quality as possible. In some implementations, the 3D model processing system 680 executes a rigging system to animate an avatar in a mixed reality environment 100 in real-time to be interactive (with users of the VR/AR/MR system) and to provide appropriate, contextual avatar behavior (e.g., intent-based behavior) in the user's environment.

Figure 11:
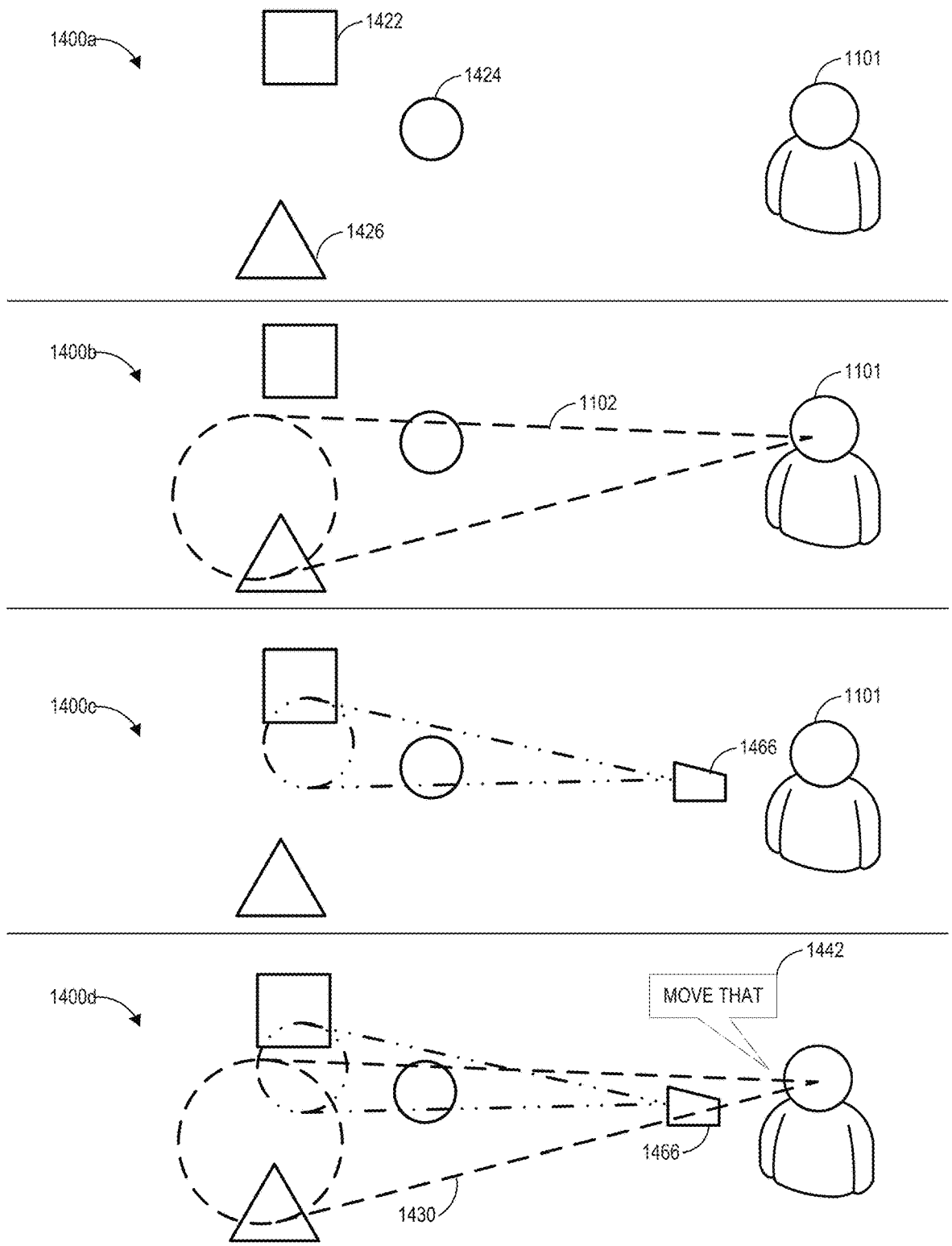
FIG. 11 illustrates examples of selecting a virtual object using a combination of user input modes.

FIG. 11 illustrates examples of selecting a virtual object using a combination of user input modes. In the scene 1400a, the wearable system can present a user 1101 with a plurality of virtual objects, represented by a square 1422, a circle 1424, and a triangle 1426. The user 1101 can interact with the virtual objects using head pose as illustrated in the scene 1400b. This is an example of a head pose input mode.

The head pose input mode may involve a cone cast to target or select virtual objects. For example, the wearable system can cast a cone 1102 from a user's head toward the virtual objects. The wearable system can detect whether one or more of the virtual objects fall within the volume of the cone to identify which object the user intends to select. In this example, the cone 1102 intersects with the circle 1424 and the triangle 1426. Therefore, the wearable system can determine that the user intends to select either the circle 1424 or the triangle 1426. However, because the cone 1102 intersects with both the circle 1424 and the triangle 1426, the wearable system may not be able to ascertain whether the target virtual object is the circle 1424 or the triangle 1426 based on the head pose input alone.

In the scene 1400c, the user 1101 can interact with the virtual objects by manually orienting a user input device 466, such as totem (e.g., a handheld remote control device). This is an example of a gesture input mode. In this scene, the wearable system can determine that either the circle 1424 or the square 1422 is the intended target because these two objects are in the direction at which the user input device 466 is pointing. In this example, the wearable system can determine the direction of the user input device 466 by detecting a position or orientation of the user input device 466 (e.g., via an IMU in the user input device 466), or by performing a cone cast originating from the user input device 466. Because both the circle 1424 and the square 1422 are candidates for the target virtual object, the wearable system cannot ascertain with a high confidence level which one of them is the object that the user actually wants to select based solely on the gesture input mode.

In the scene 1400d, the wearable system can use multi-modal user inputs to determine the target virtual object. For example, the wearable system can use both the results obtained from the cone cast (head pose input mode) and from the orientation of the user input device (gesture input mode) to identify the target virtual object. In this example, the circle 1424 is the candidate identified in both the result from the cone cast and the result obtained from the user input device. Therefore, the wearable system can determine with high confidence, using these two input modes, that the target virtual object is the circle 1424. As further illustrated in the scene 1400d, the user can give a voice command 1442 (illustrated as "Move that"), which is an example of a third input mode (namely, voice), to interact with the target virtual object. The wearable system can associate the word "that" with the target virtual object, the word "Move" with the command to be executed, and can accordingly move the circle 1424. However, the voice command 1442 by itself (without indications from the user input device 466 or the cone cast 143) may cause confusion to the wearable system, because the wearable system may not know which object is associated with the word "that".

Advantageously, in some implementations, by accepting multiple modes of input to identify and interact with a virtual object, the amount of precision required for each mode of input may be reduced. For example, the cone cast may not be able to pinpoint an object at a rendering plane that is far away because the diameter of the cone increases as the cone gets farther away from the user. As other examples, the user may need to hold the input device at a particular orientation to point toward a target object and speak with a particular phrase or pace to ensure the correct voice input. However, by combining the voice input and the results from the cone cast (either from a head pose or a gesture using the input device), the wearable system can still identify the target virtual object without requiring either input (e.g., the cone cast or the voice input) to be precise. For example, even though the cone cast selects multiple objects (e.g., as described with reference to scenes 1400*b*, 1400*c*), the voice input may help narrow down the selection (e.g., increase the confidence score for the selection). For example, the cone cast may capture 3 objects, among which the first object is to the user's right, the second object is to the user's left, and the third object is in the center of the user's FOV. The user can narrow the selection by saying "select the rightmost object". As another example, there may be two identically shaped objects in the user's FOV. In order for the user to select the correct object, the user may need to give more descriptions to the object via voice command. For example, rather than saying "select the square object", the user may need to say "select the square object that is red". However, with cone cast, the voice command may not have to be as precise. For example, the user can look at one of the square object and say "select the square object" or even "select the object". The wearable system can automatically select the square object that coincides with the user's gaze direction and will not select the square object that is not in the user's gaze direction.

In some implementations, the system may have a hierarchy of preferences for combinations of input modes. For example, a user tends to look in the direction his or her head is pointing; therefore, eye gaze and head pose may provide information that is similar to each other. A combination of head pose and eye gaze may be less preferred, because the combination does not provide much extra information as compared to the use of eye gaze alone or head pose alone. Accordingly, the system may use the hierarchy of modal input preferences to select modal inputs that provide contrasting information rather than generally duplicative information. In some implementations, the hierarchy is to use head pose and voice as the primary modal inputs, followed by eye gaze and gesture.

Accordingly, as described further herein, based on multimodal inputs, the system can calculate a confidence score for various objects in the user's environment that each such object is the target object. The system can select, as the target object, the particular object in the environment that has the highest confidence score.

Example Intent Estimation

Figure 12:
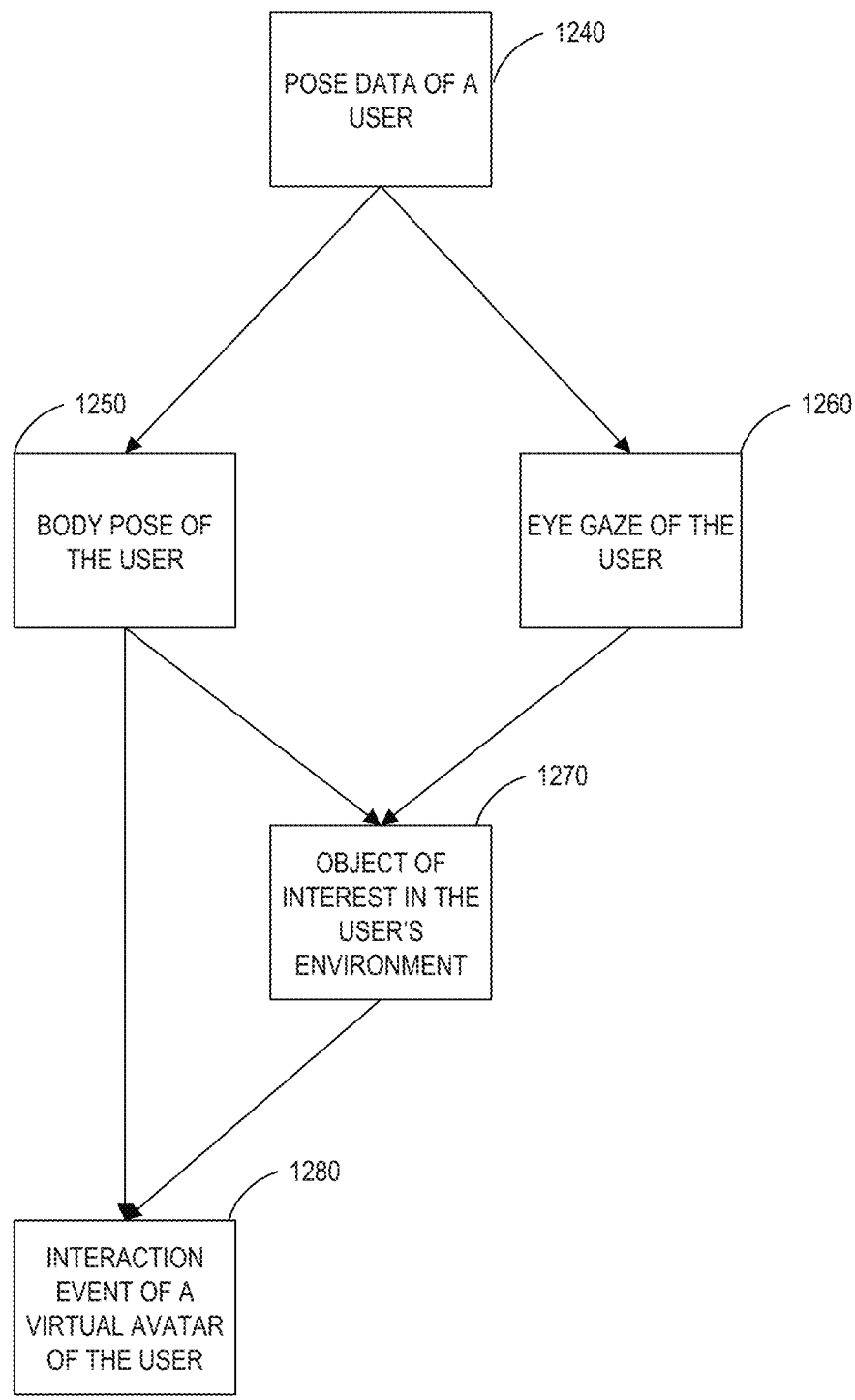
FIG. 12 shows a block diagram of an overview of intent-based virtual avatar rendering based on an object of interest.

FIG. 12 shows a block diagram of an overview of intent-based virtual avatar rendering based on an object of interest. Intent based rendering a virtual avatar can depend on a user's pose in a virtual environment. The block diagram may be implemented by the intent mapping system 694 described with reference to FIG. 6B. In some implementations, the user's pose may be determined by using a wearable system with an outward-facing system and/or an inward-facing imaging system (e.g., for eye gaze) or IMUs, similar to the wearable system shown in FIGS. 2-4, for example. The user's pose data may be further divided into components such as body pose and eye gaze in blocks 1250 and 1260 respectively. In block 1270, the user's body pose and eye gaze data may be used to identify objects of interest the user may interact with in the virtual environment. A virtual avatar of the user may then be rendered to reflect the user's interaction event with the identified object of interest in block 1280.

Figure 13B:
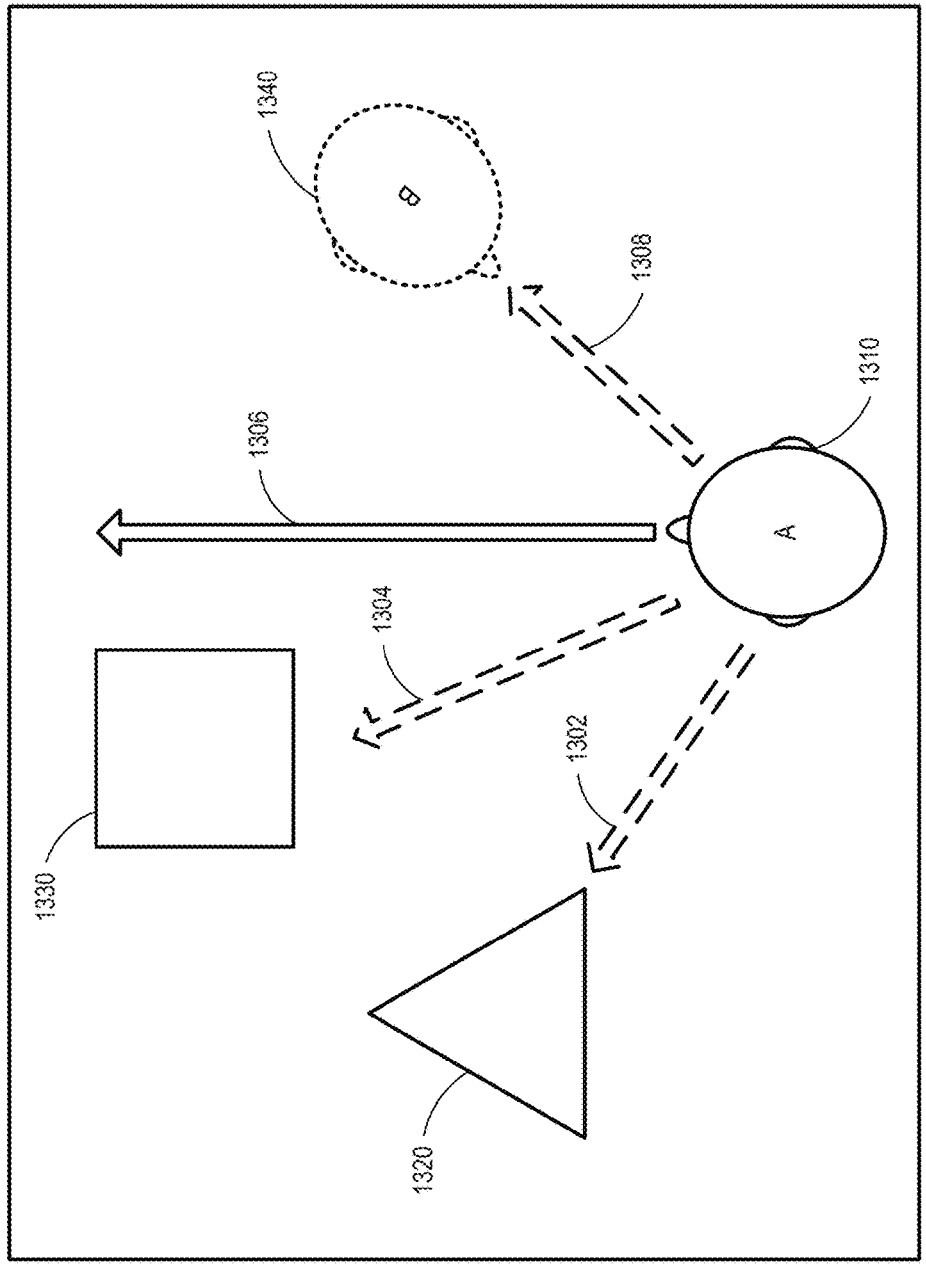
FIG. 13B illustrates an example of how an item of interest can be identified once virtual objects or virtual avatars are placed throughout a virtual environment.

Specific implementations of intent based rendering may rely on determining the user's focus point or item of interest. FIGS. 13A through 13D illustrate examples for determining an item of interest where the item of interest is shared between two users. FIG. 13A begins by illustrating how virtual objects and avatars may be placed in the virtual environments. User A 1310 and User B 1360 are placed in their own local virtual environments 1300 and 1350. User A 1310 may see a virtual triangle 1320, a virtual square 1330, and User 1360's remote avatar B 1340 in local virtual environment 1300. User B 1360 may also see virtual triangle 1320, virtual square 1330, and user A 1310's remote avatar A 1370 in local virtual environment 1350. However, the position and orientation of the virtual objects and remote avatars may be unique to each user. As an example, in FIG. 13A, the virtual triangle 1320 and virtual square 1330 appear to the left of user A 1310 in the local environment 1300. Meanwhile, the virtual square 1330 is to right of user B 1360 while the virtual triangle 1320 is in front of user B 1360 in local virtual environment 1350. Additionally, while remote avatar 1340 faces towards user 1310 in virtual environment 1300, user A's remote avatar 1370 faces away from user B 1360 in local virtual environment 1350.

FIG. 13B illustrates an example of how an item of interest can be identified once virtual objects or virtual avatars are placed throughout a virtual environment. Objects in the virtual environment can be marked as potential items of interest. In some implementations, a vector may project from the user towards each potential item of interest. In FIG. 13B, a virtual triangle 1320, a virtual square 1330, and a remote avatar 1340 may all be identified as potential items of interest. The virtual triangle 1320, virtual square 1330, and remote avatar 1340 may all be represented by a corresponding vector 1302, 1304, and 1308 respectively. Each corresponding vector may then be compared to the user's current sight line vector 1306, which projects directly from user 1310 towards the direction the user 1310 faces. Although the corresponding vectors 1302, 1304, and 1308 in FIG. 13B extend from user 1310 towards each corresponding virtual object, different vectors or methods may be used in other implementations. For example, the vector can point to an object's position in the virtual environment, which can be its local origin. Where that origin points in relation to a render model can vary depending on how the virtual object is defined in the render model. For some objects, the vector points towards the point closest to the user or the geometric center of the object. For a large object (e.g., one with a size greater than a threshold such as 3 ft., 6 ft., 8 ft., or more), it is possible to create sub-assemblies that are each tagged with their own local points of interest.

Figure 13C:
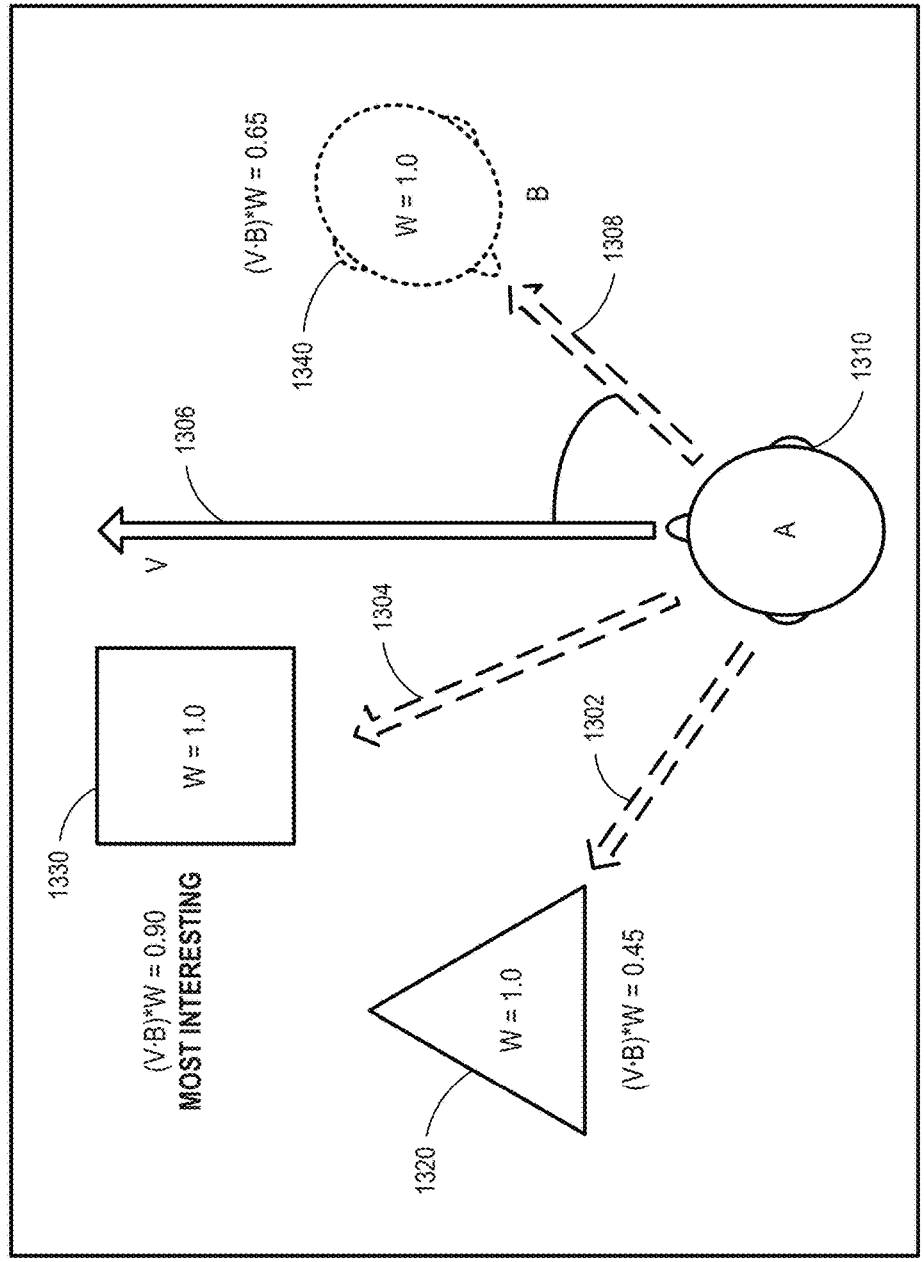
FIGS. 13C and 13D illustrate examples of determining an item of interest among a plurality of potential items of interest.
Figure 13D:
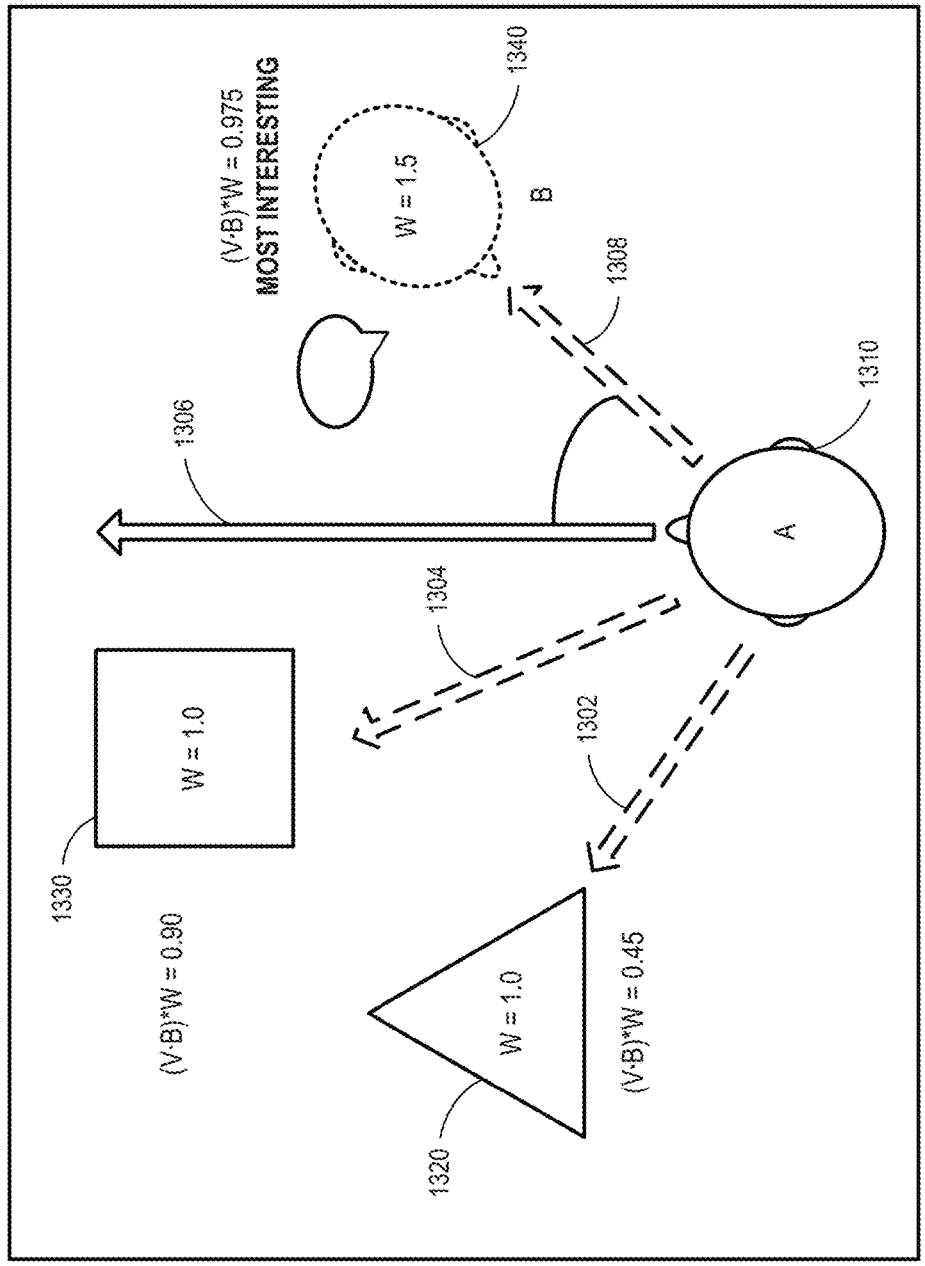

FIGS. 13C and 13D illustrate examples of determining an item of interest among a plurality of potential items of interest. An item of interest may be determined by calculating an interest value for all potential items of interest in the virtual scene, or some subset of the potential items of interest such as those within a predetermined distance from the user's avatar. The interest value of an object may be a number representing how strongly the user is focused on the object. In FIGS. 13C and 13D specifically, the interest value for a potential item of interest is calculated by computing a dot product between a vector representing the user's line of sight (V) and a vector representing the direction to the item of interest (referred to as vector B in FIG. 13C). The resulting scalar value can be multiplied by an interest weight W for the item of interest. Thus, in this example implementation, the interest value is a weighted dot product: interest value=(V·B)*W. The dot product is useful because the dot product is largest in positive magnitude when two vectors are parallel (zero angle between them), which indicates the two vectors are pointing in the same direction (the user is looking at the object). The dot product is zero when the two vectors are perpendicular to each other (ninety degree angle between them), which indicates the user is not looking toward the object. Thus, the dot product tends to select items of interest that are on or near the user's line of sight. For objects behind the user, the dot product is negative, therefore, the weighted dot product will tend to select items of interest that are in front of the user.

The interest weight W of an object may be a number representing how likely a user would want to focus on the object. A larger interest weight is indicative of greater interest in the object, and a smaller interest weight is indicative of less interest in the object. In FIG. 13C, the virtual triangle 1320, virtual square 1330, and remote avatar 1340 are potential items of interest. The interest value of virtual triangle 1320 may be calculated by computing the dot product between the user's sight line vector 1306 and the vector 1302. A similar calculation may be done for virtual square 1330 and remote avatar 1340. Because the interest weight of the potential items of interest in FIG. 13C are equal (W=1.0 in this example), the potential item of interest with the highest interest value is the one closest to the user's sight line vector 1306. Therefore, in the particular example shown in FIG. 13C, virtual square 1330 is the item of interest, because the virtual square's interest value (0.90) is larger than the interest value for the virtual triangle (0.45) or the remote avatar (0.65). In certain implementations, an object directly in the user's sight line vector may be the item of interest by default.

While the objects in the example shown in FIG. 13C have equal interest weights, other implementations may have objects with different interest weights. FIG. 13D illustrates an example of determining an item of interest where the potential items of interest may have different interest weights. The scene in FIG. 13D is the same as the scene in FIG. 13C except that remote avatar 1340 has a higher interest weight (W=1.5) than virtual triangle 1320 and virtual square 1330 (which each have W=1.0). An object with a higher interest weight may become the item of interest even if it is further away from the sight line vector 1306 than other objects. Also, for objects that are along a common direction from the user (so that their dot products are all roughly equal), the object with the largest interest weight will be selected as the item of interest. In FIG. 13D, the remote avatar 1340 has a higher interest weight and overall higher interest value (0.975), so it becomes the item of interest even though virtual square 1330 is closer to sight line vector 1306, but with a lower interest value (0.90).

The interest weight of a potential item of interest may dynamically increase or decrease in response to events in the virtual scene. For example, the interest weight of the remote avatar 1340 in FIG. 13D may increase when remote avatar 1340 is speaking and may decrease when the remote avatar 1340 stops speaking to reflect that the user is likely more interested in an avatar when it is currently speaking. In the case where several users or avatars are speaking at once, they may each be weighted equally, and the item of interest can be the user or avatar that is nearest the user's view vector.

Objects which are being manipulated by a user may get more weight. For example, if the user is playing a game of virtual chess and her avatar opponent picks up the user's queen, then the queen can be weighted higher and become more interesting, since the queen is currently of interest in the chess game. Likewise, objects being pointed at, but not directly manipulated by the user or an avatar, may get a higher weight. In an example of a virtual birdwatching experience, a user and an avatar may be looking at a particular virtual bird, e.g., a Red-legged Kittiwake, which is the current item of interest. If the avatar points at another virtual bird in the virtual environment, e.g., a Whooping Motmot, then the interest weight of the Whooping Motmot can be increased sufficiently (e.g., compared to the interest value of the Red-legged Kittiwake) so that the item of interest changes from the Red-legged Kittiwake to the Motmot. FIGS. 14A through 14F show examples of calculating interest values for each object in a virtual environment to determine the item of interest, assuming each object has equal interest weights. Although the specific example illustrated by FIGS. 26A through 26F uses dot product multiplication of vectors and equal interest weights, other implementations may use different methods (e.g., unequal interest weights for the different objects). Further, additional or fewer factors may be included in an interest value algorithm. For example, distance to the virtual objects may be a factor in calculating interest values, such that closer objects are biased towards being the object of interest versus further objects.

Figure 14A:
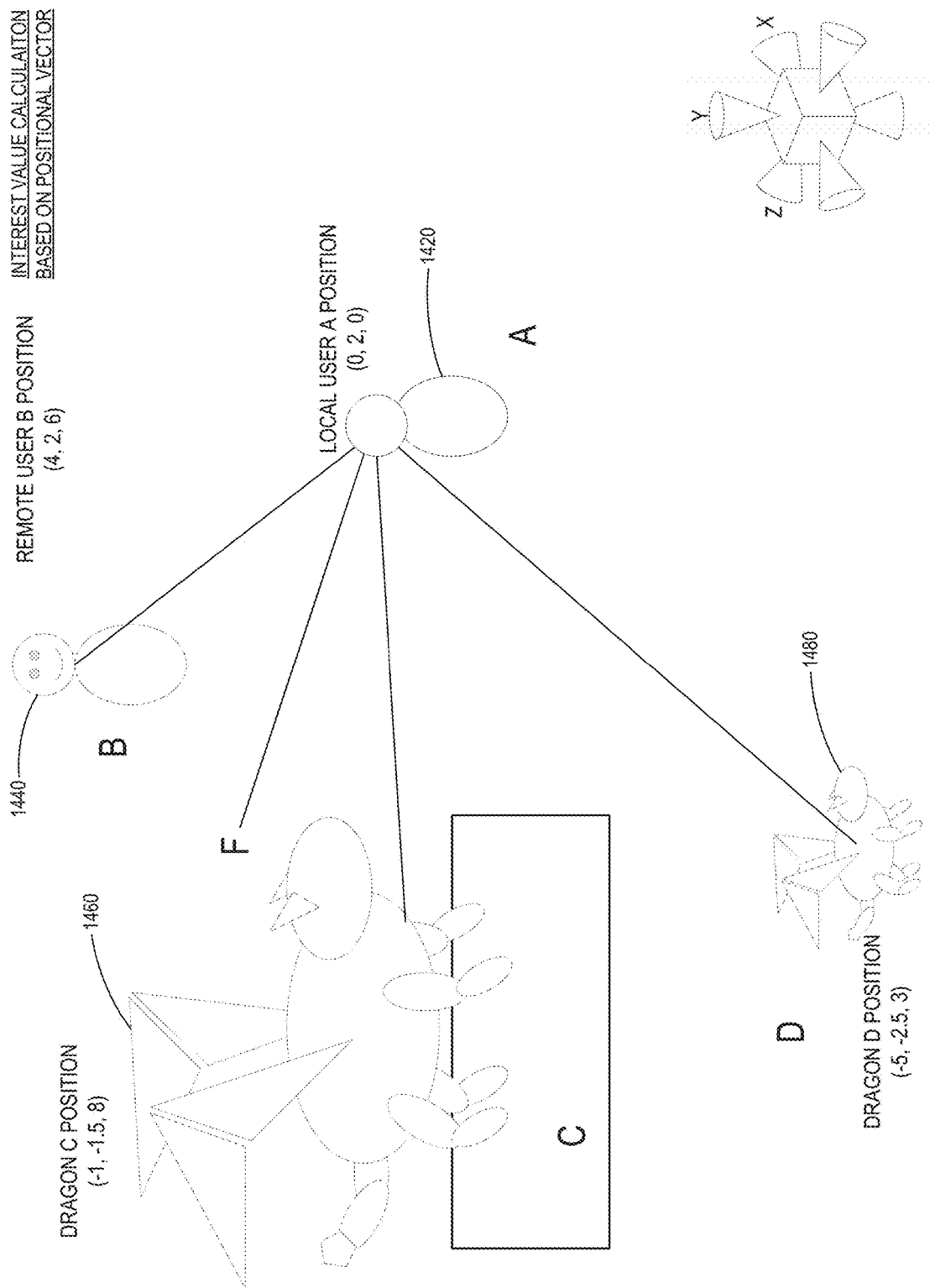
FIG. 14A presents the initial scene of the example.

FIG. 14A presents the initial scene of the example. In FIG. 14A, a local user 1420, a remote avatar 1440, a large dragon 1460, and a small dragon 1480 all occupy a unique position in three-dimensional space. The positions of the objects are represented by Cartesian coordinate values (x, y, z), although other coordinate systems can be used in other implementations. For example, the position of the local user is at (0, 2, 0), the position of the remote user B represented by the remote avatar 1440 is at (4, 2, 6), and so forth.

Figure 14B:
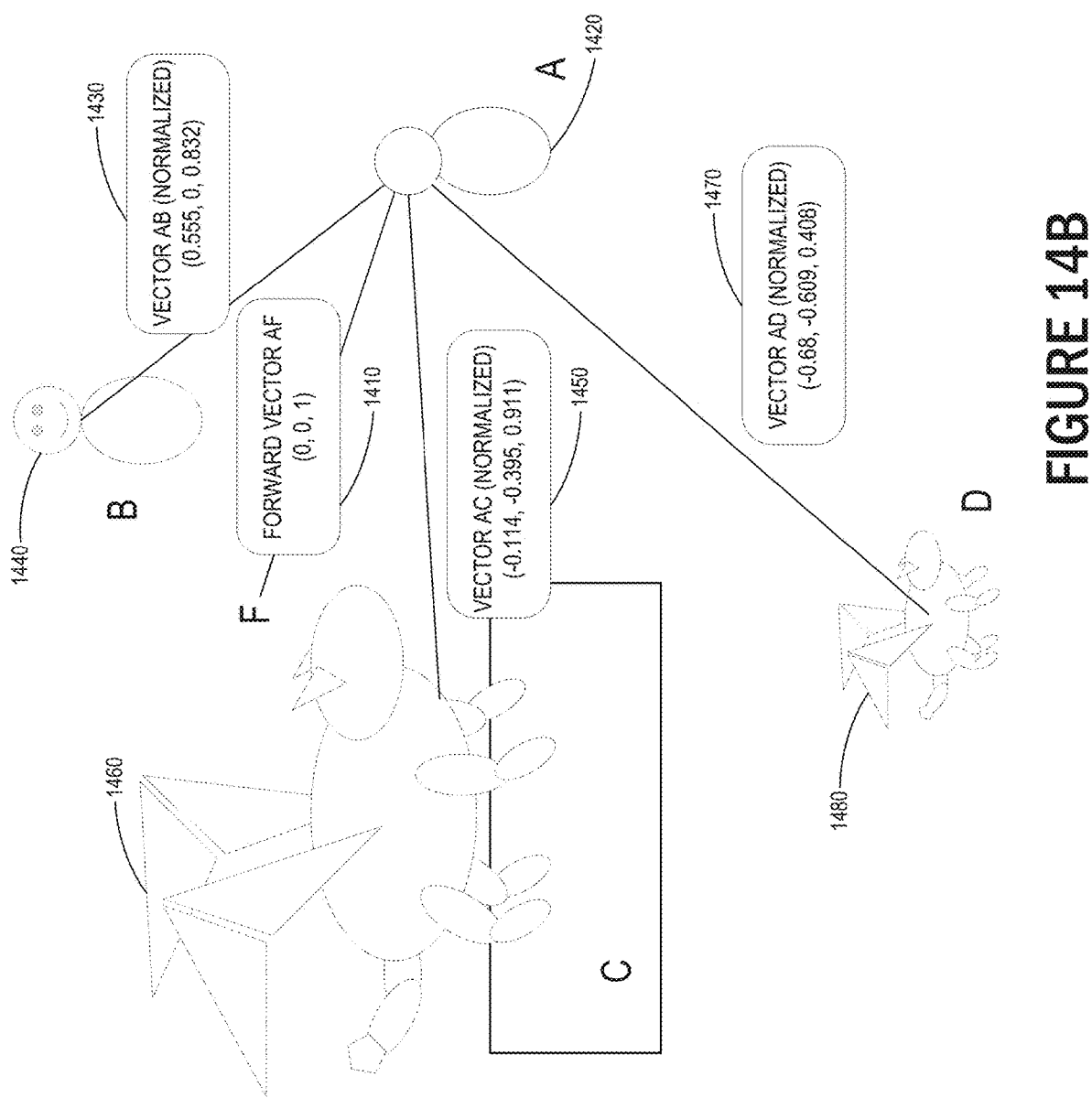
FIG. 14B replicates the scene presented in FIG. 14A, illustrating that each object from FIG. 14A can be associated with a vector extending out from the user to each object.

FIG. 14B replicates the scene presented in FIG. 14A. However, FIG. 14B also shows that each object from FIG. 14A can be associated with a vector extending out from the user to each object. For example, the vector from the user to the remote avatar 1440 is Vector AB and has Cartesian coordinate values (0.555, 0, 0.832). In this example, all of the vectors are normalized to have length 1.0 (e.g., they are unit vectors). A forward vector AF 1410 in FIG. 14B represents the user's line of sight. In this example, the forward vector AF has coordinates (0, 0, 1).

Figure 14C:
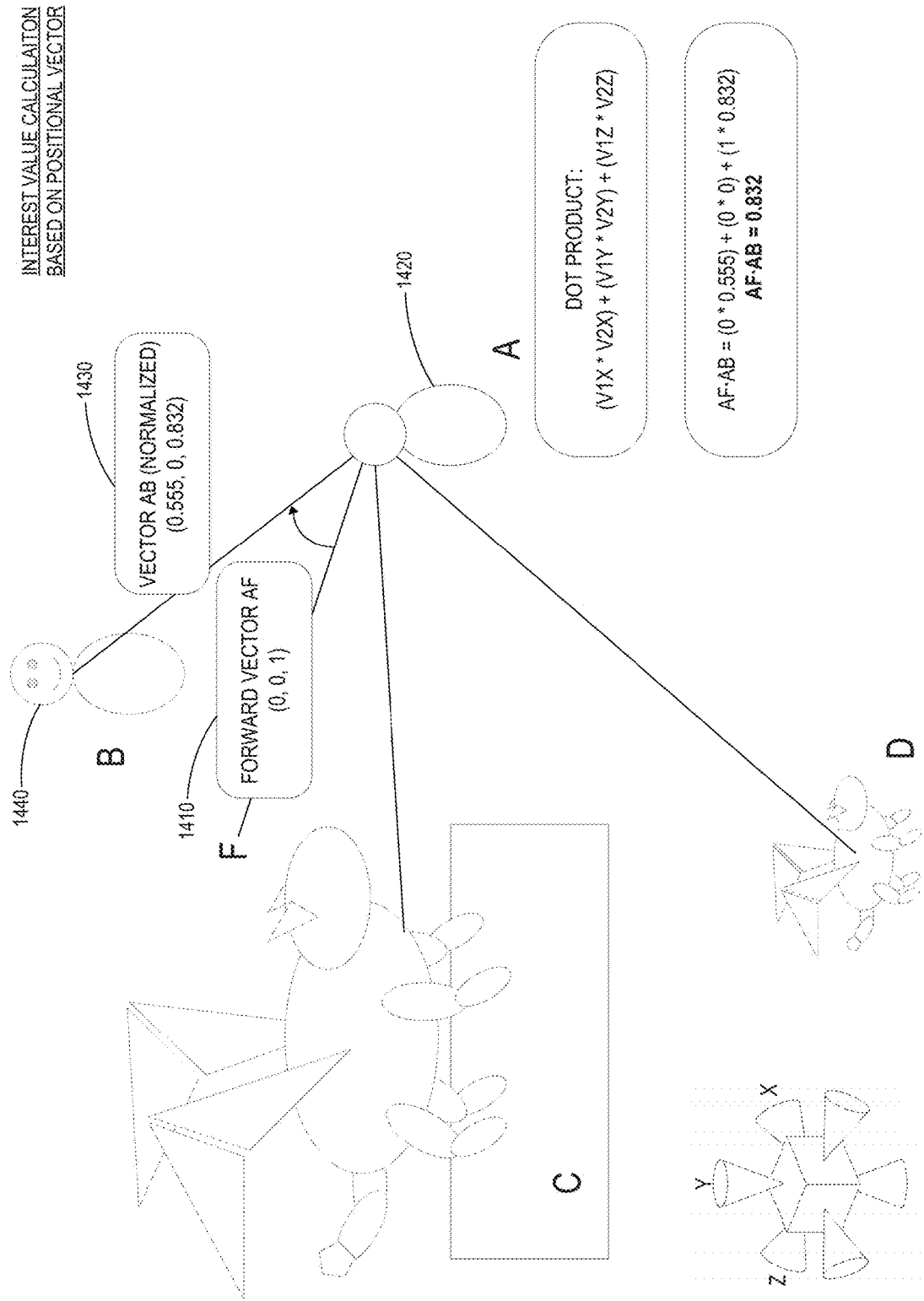
FIGS. 14C through 14E illustrate an example of calculating the interest value of the three objects in the virtual scene.
Figure 14D:
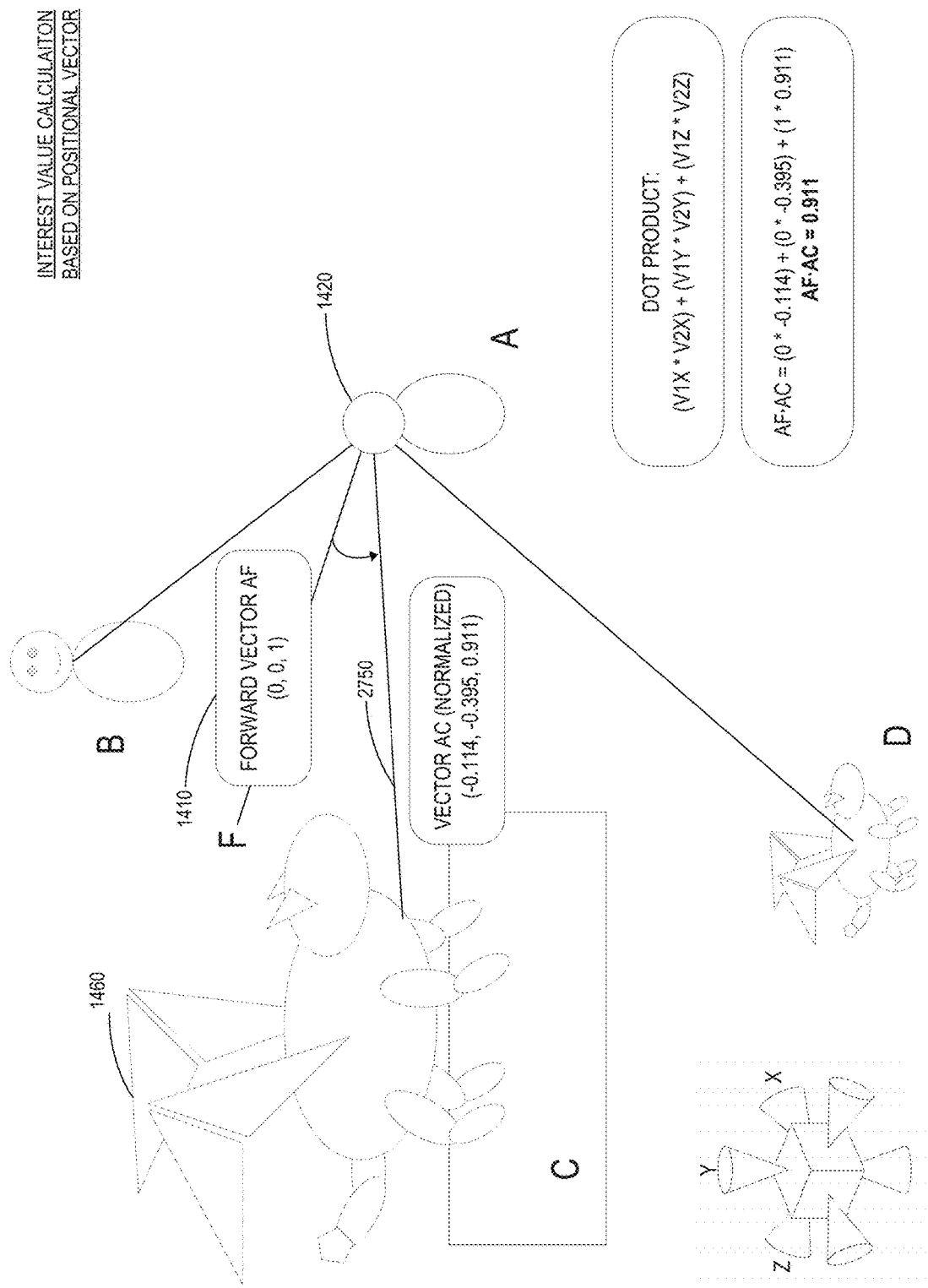
Figure 14E:
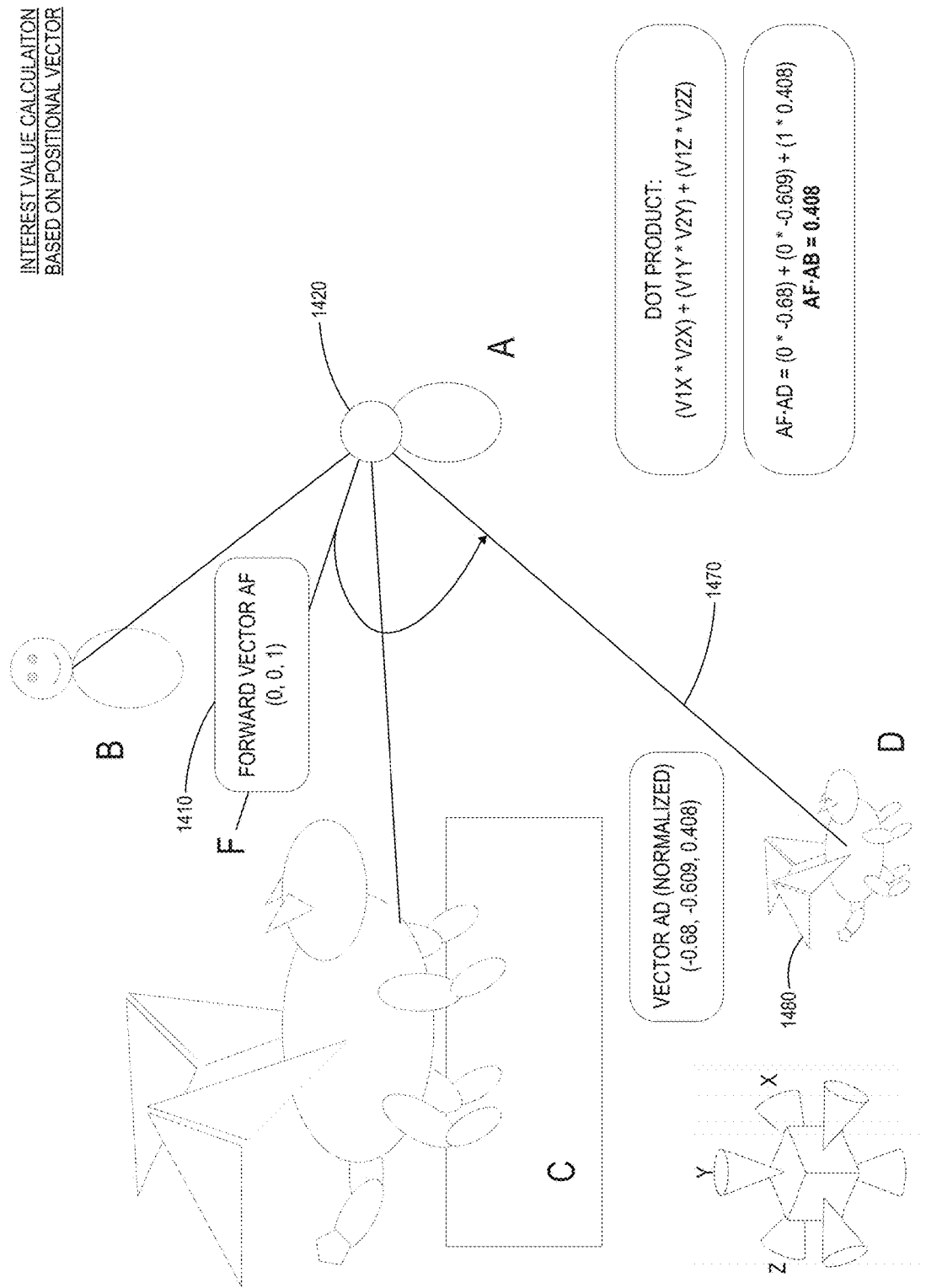

FIGS. 14C through 14E illustrate an example of calculating the interest value of the three objects in the virtual scene. The dot product of two vectors V1 and V2 having coordinate values, respectively, (V1x, V1y, V1z) and (V2x, V2y, V2z) is V1·V2=(V1x*V2x)+(V1y*V2y)+(V1z*V2z). FIG. 14C shows an example of calculating the interest value of the remote avatar 1440. In FIG. 14C, the interest value of remote avatar 1440 is the dot product of the forward vector AF 1410 and the vector AB 1430, which points from the user 1420 to the remote avatar 1440. Applying the dot product formula, the interest value of remote avatar 1440 relative to the user is AF·AB=(0*0.555)+(0*0)+(1*0.832)=0.832. If an interest weight W not equal to 1.0 were used for the remote avatar, this value of the dot product would be multiplied be W to arrive at the interest value.

Figure 14F:
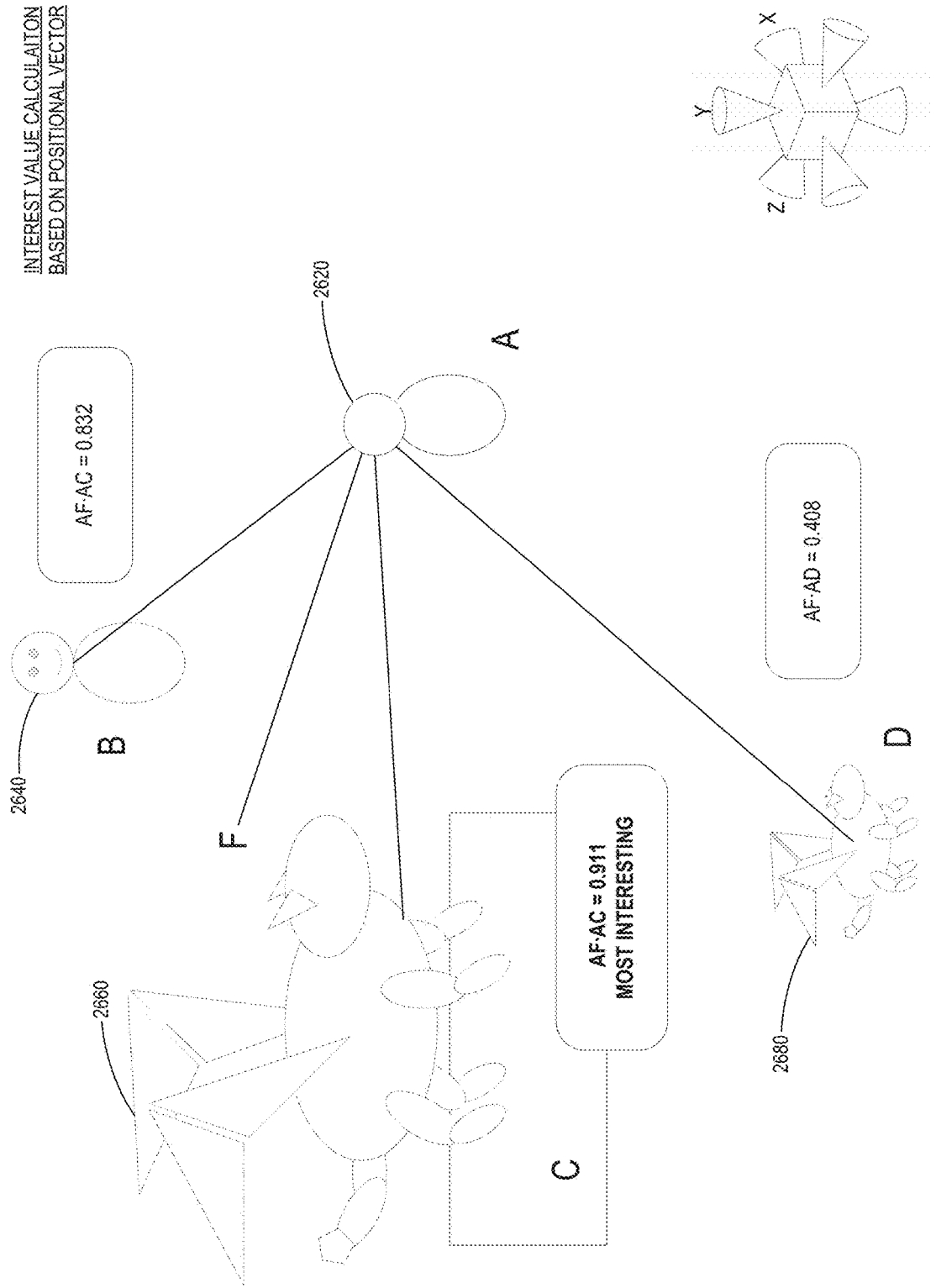
FIG. 14F shows an example of determining the item of interest by comparing the calculated interest values.

FIGS. 14D and 14E shows examples of calculating the interest values for the large dragon 1460 and small dragon 1480 using the same method as illustrated in FIG. 14C. As shown in FIG. 14D, the interest value of the large dragon 1460 is the dot product of forward vector AF 1410 and vector AC 1450, which equals 0.911. Similarly, as shown in FIG. 14E, the interest value of the small dragon 1480 is the dot product of forward vector AF 1410 and the vector AD 1470, which equals 0.408. FIG. 14F shows an example of determining the item of interest by comparing the interest values calculated in FIGS. 14C, 14D, and 14F. Because the large dragon 1460 has the highest interest value (0.911), it becomes the item of interest for the user 1420. Note that the large dragon 1460 is the object closest to the user's line of sight AF and is accordingly selected as the item of interest in this example (where the interest weights are all equal). As objects move in the virtual environment, their coordinate values change, and the corresponding dot products between the user's forward vector and the vectors to the objects change. Thus, different objects in the virtual environment can become the item of interest over time. As described above, dynamically varying interest weights can be used for each object, so that the item of interest may be an object that is farther from the user's line of sight than another object.

In some implementations, the interest weight W for an object can depend at least partly on the distance between the user and the object. For example, the interest weight may be larger if the distance to the object is smaller, thereby indicating that objects nearby the user will tend to be more interesting to the user. Interest values may also represent contextual factors in the environment. For example, in a virtual game, a dangerous game element (e.g., a large dragon) or a valuable item (e.g., a golden crown) may be assigned a higher interest value than a more neutral or passive game element (e.g., a rock or a non-threatening player), because the user will likely be more interested in fighting the dangerous game element or finding the valuable item than interacting with a neutral/passive game element.

Example Virtual Assistant

Figure 15:
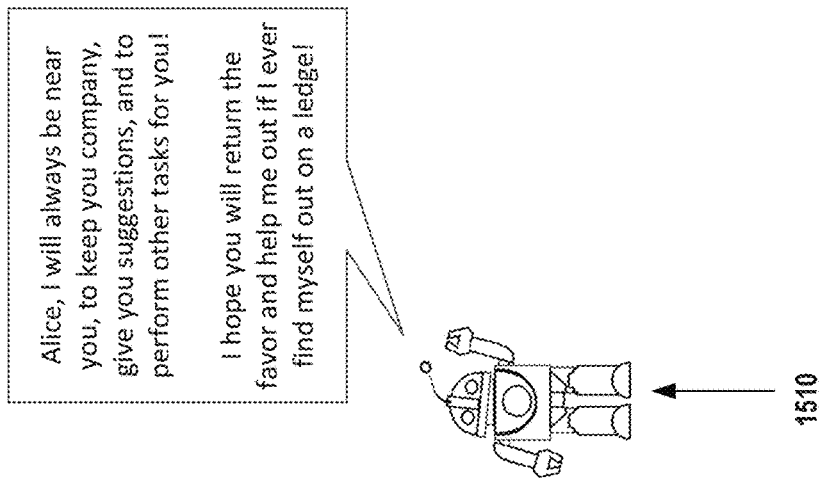
FIG. 15 illustrates a sample virtual scene that may be displayed on a wearable device when the user enables a virtual assistant.

FIG. 15 illustrates a sample virtual scene that may be displayed on a wearable device when the user enables a virtual assistant. In this example, the virtual assistant is represented by a robot 1510, but in other implementations any other representation may be used (e.g., a jellyfish, a monster, a paperclip, or any other cartoonish or anthropomorphic character). For purposes of discussion herein, a virtual assistant that is presented in the form of a robot avatar, and named Robot, is used. However, any other character may be used in place of Robot, and any references to a "robot" or Robot herein should be interpreted as references to any non-user character avatar that represents a virtual assistant. A virtual assistant includes a character avatar, e.g., Robot, and the logic (e.g., algorithms, rules, artificial intelligence, etc.) that determines behaviors of the virtual assistant. Depending on the embodiment, virtual assistants may take on different personalities and provide different assistance to users. In one implementation that is discussed herein, Robot is a sweet inquisitive character that walks around, checks out what the user is doing, and reacts accordingly. In some implementations, Robot (and/or other virtual assistants) may be programmed with behaviors (and/or develop behaviors, such as through AI updates as the virtual assistant interacts within virtual environments) causing it to aid, showcase, react to, and/or respond to the user in any imaginable manner.

Thus, in the example of FIG. 15, robot 1510 introduces itself as a "friend" that stays near the user and engages in interactions with the user (as well as other characters in the virtual environment), such as based on what the user is currently doing (or not doing). Personalities of virtual assistants may be developed to mirror certain human personality traits. For example, in some implementations, personality traits of a virtual assistant may be based on a personality assessment of one or more humans, such as humans with personalities that may be desirable for a virtual assistant. Through the use of actual personality assessment information of humans, personality traits may be quantified more accurately. Traits associated with a virtual assistant may include those related to wants, needs, fears, etc., such as traits that provide a virtual assistant with levels of creativeness, enthusiasm, energy, and fun-loving attitude. These traits may be weighted differently, such as based on a personality profile that is associated with a virtual assistant. The personalities of virtual assistants may be stored in and/or implemented using various rule sets, artificial intelligence, and the like.

In some implementations, animation of a virtual assistant is provided in a way that grounds the virtual assistant to the user's world, such as to create the appearance that the virtual assistant is really in the user's world, subject to physics of that world. For example, shadows may be used to show contact with the user's ground plane. In some situations, however, production of shadows under a character may be difficult. In some embodiments, other special-effects and/or audio may be used. For example, a special effect, such as a light-rail behind a virtual assistant as it locomotes across a surface may be added to show contact with the user's ground plane. Similarly, audio effects may be added to enhance the user's perception of a virtual assistant, such as a movement sound effect that is played when a virtual assistant rolls across the ground.

A virtual assistant may be animated in an immersive manner, e.g., there is no particular location where the virtual assistant is restricted to, but rather the virtual assistant is immersed into the virtual environment as more than just a performer that is separated from the audience. As discussed elsewhere herein, a virtual assistant's behaviors may be established and/or evolved (e.g., through AI induced behavioral changes) to perform actions that make the user feel appreciated for the actions they perform and to encourage the user to go deeper into the richness of the virtual experience. For example, if the user pulls out an object from the menu, the virtual assistant may track the object to see what the user does with it. If the user places a construction block in a virtual scene, the virtual assistant may materialize an object and communicate to the user that the user can snap these objects together to build something (e.g., a rocket ship). If the user then snaps these objects together, behavior rules of the virtual assistant may initiate a celebration, such as jumping up and down. Advantageously, these immersive behaviors engage with what the user is interacting with and what the user is doing, showing the user what else they can do, and providing reactions to what the user chooses to do. The behavioral rules may cause the virtual assistant to respond to not just big or major actions performed by the user, but also those that may be small, but meaningful, to the user.

In some implementations, Robot may not always stay near the user, but instead may stay within a particular area. For example, the user could walk four miles away and the robot could be configured to stay in the room they left it. In some implementations, when Robot is within a detectable range of an event of interested (e.g., based on artificial intelligence analysis of the user's interactions with the virtual environment), Robot may be configured to move toward the target of interest (depending on what it needs to do with said target).

Figure 16:
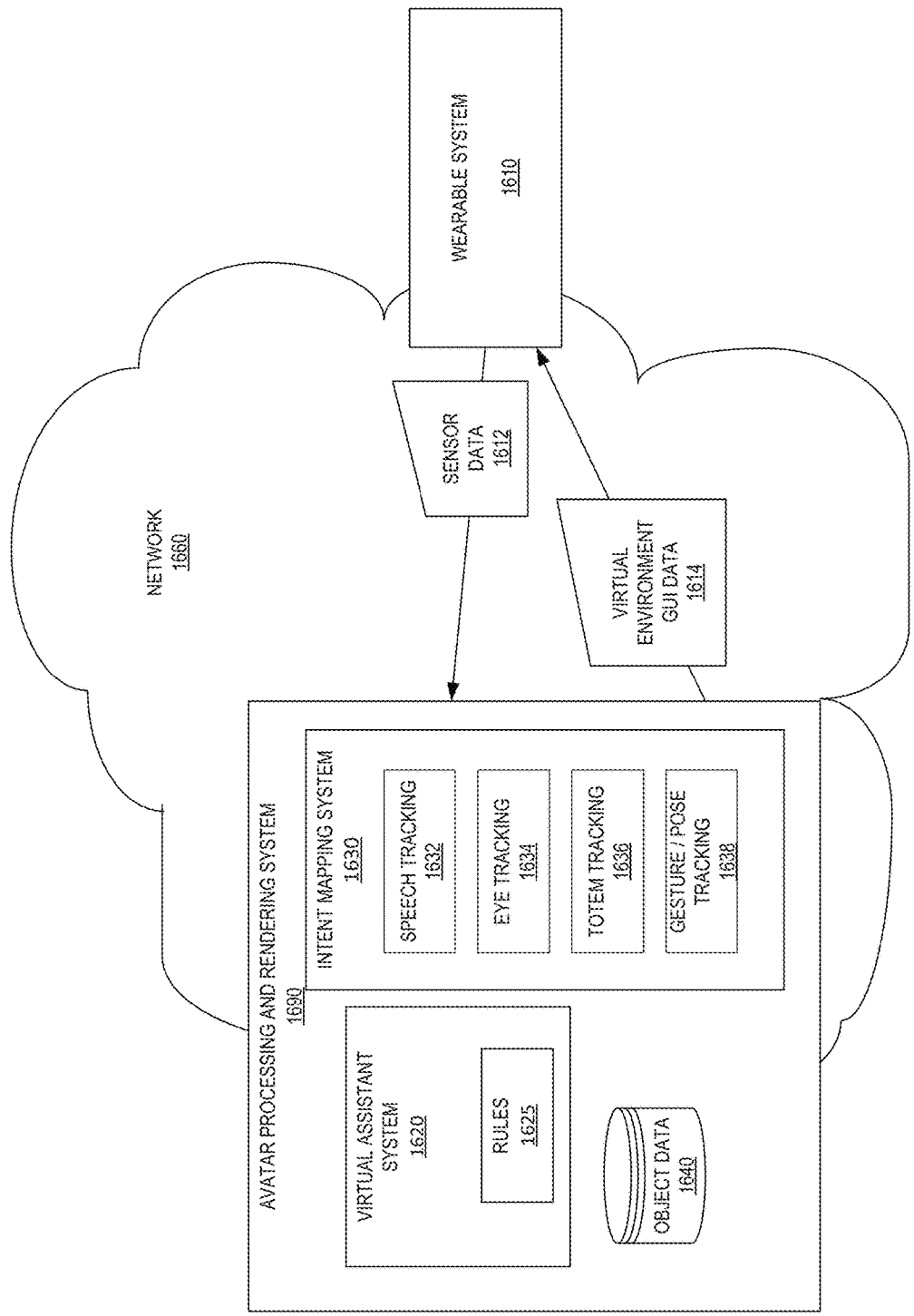
FIG. 16 is a block diagram of an avatar processing and rendering system in communication with a wearable system that has activated a virtual assistant functionality.

FIG. 16 is a block diagram of an avatar processing and rendering system 1690 (which may be implemented in place of the system 690 discussed above) in communication with a wearable system 1610 that has activated a virtual assistant functionality (e.g., which may be enabled by default in some implementations). In this example, the wearable system 1610 provides various sensor data 1612 to the system 1690 and receives virtual environment GUI data 1614 from the system 1690. The GUI data 1614 is usable by the wearable system 1610 to generate and update a virtual environment that is displayed to a user of the wearable system 1610, such as to include interactions with a virtual assistant.

In the example of FIG. 16, the system 1690 includes a virtual assistant system 1620 configured to execute rules for operation of the virtual assistant, such as based on the sensor data 1612, output from the intent mapping system 1630, information about objects in a virtual scene (or objects that could be in a virtual scene) such as may be obtained from object data 1640, and/or other information that may be useful in determining movements, interactions, and the like, of the virtual assistant.

The virtual assistant is considered a non-user character because it operates based on its own logic, rather than directly based on inputs from a user. In the example of FIG. 16 and other examples discussed herein, the virtual assistant system 1620 operates based on rules 1625, where rules generally describe rules, criteria, algorithms, models, scripts, code, processes, etc., that may be used to evaluate inputs and determine how the virtual assistant reacts. Discussion of rules herein does not limit the scope of implementation of virtual assistant logic, but only provides an example implementation using rules. Other implementations may also be realized using many types of software coding, including implementations that use artificial intelligence, machine learning, neural network, and/or other software that dynamically updates the "rules" as the virtual assistant interacts with users, characters, virtual objects, and the like in virtual environments. Thus, rules that cause a virtual assistant to perform a particular action in response to a particular input from the wearable device may change over time as the rules logic (e.g., artificial intelligence that updates the rules) learns from its experiences.

The object data 1640 may include information regarding objects that are currently in a virtual scene displayed to a user, such as properties, positions, etc. of the virtual objects. As the user and/or the virtual assistant interact with objects, the object 1640 may be updated to indicate changes in properties of the objects. In some implementations the object data 1640 may include information regarding other non-user characters that may be included in a virtual environment. For example, characteristics, rules, and/or other data regarding an astronaut character may be stored in the object data 1640.

The intent mapping system 1630 is configured to process various inputs from the wearable system 1610, such as the sensor data 1612 that is provided to the system 1690 in real-time as the wearable system 1610 interacts with a user. The intent mapping system 1630 may access and process information including speech tracking 1632, eye tracking 1634, totem tracking 1636, gesture/pose tracking 1638, and/or any other information from the wearable system 1610 (or elsewhere) that may be useful in determining actions and/or intent of the user (as well as other attributes of the virtual environment). These example sensor inputs are discussed further above with reference to FIG. 6A, for example.

As noted above, the various inputs may be used to determine an intent of the user, such as to determine how the user is currently interacting with virtual objects in a virtual environment and/or what the user wishes to do next within the virtual environment. The intent mapping system 1630 may also calculate interest values for multiple objects within a virtual environment (e.g., as discussed with reference to FIGS. 13 and 14), which may be considered in determining which virtual object the user intends to interact with. As discussed further below, this intent information may be used by the virtual assistant system 1620 to determine how the virtual assistant should interact with the user. For example, the intent of the user may dictate which virtual object the virtual assistant recommends the user selects.

In the example of FIG. 16, the system 1690 provides the wearable system 1610 with virtual environment GUI data 1614, which allows real-time updates to the immersed AR/VR/MR experience of the user of the wearable system 1610 that includes real-time interactions with the virtual assistant. In some implementations, the communications of the sensor data 1612 and the virtual environment GUI data 1614 occur over a network 1660, which may include the Internet, such as to interact with the system 1690 that is remotely located, such as in the cloud. In some embodiments, the network 1660 may include a local area network, or the system 1690 may be local to the wearable system 1610. In any of these implementations, communications between the avatar processing and rendering system 1690 and the wearable system 1610 are advantageously in substantially real-time, such that reactions, movements, suggestions, etc. of the virtual assistant are relevant to the current and/or predicted actions of the user.

Figure 20A:
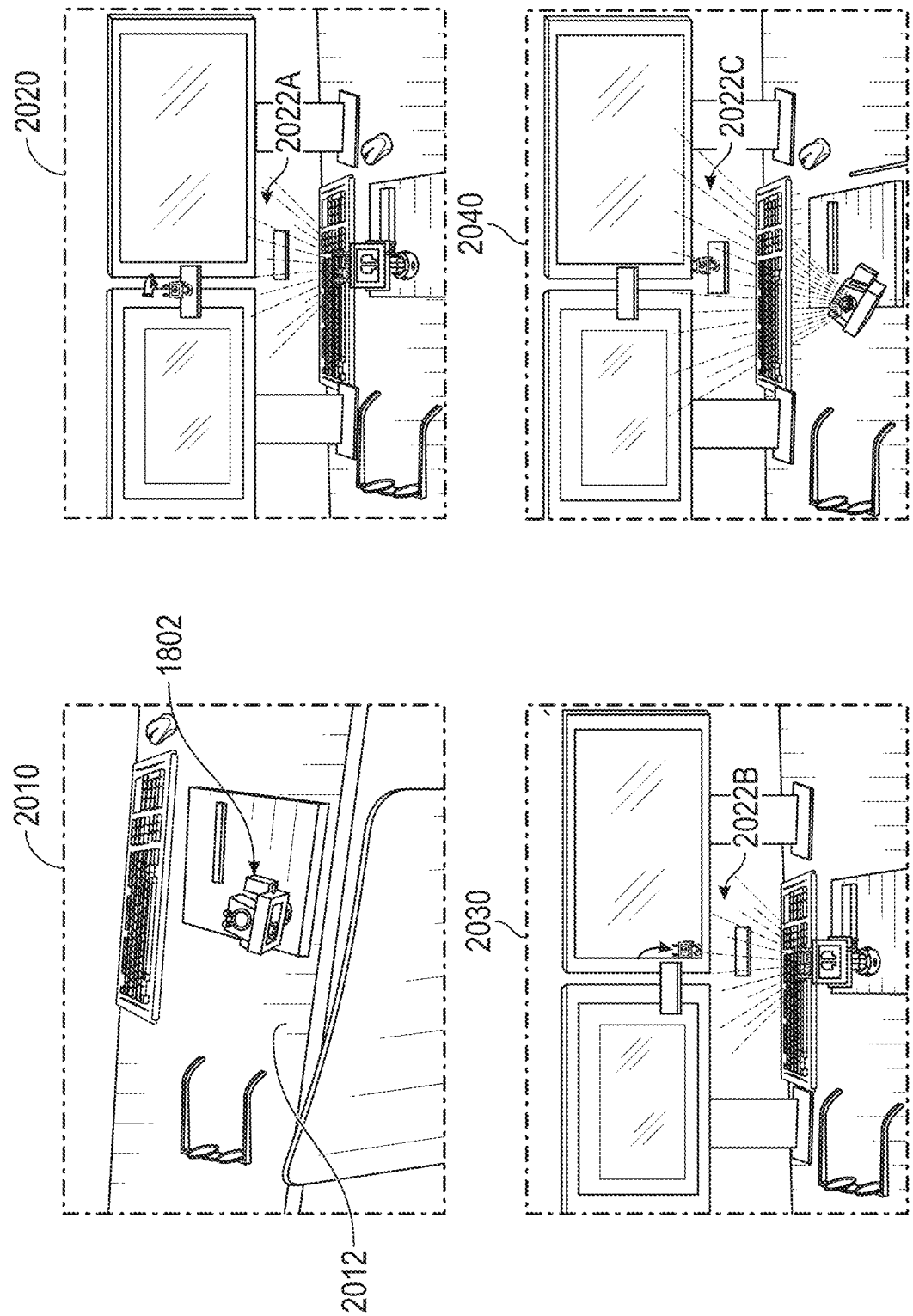
FIGS. 20A and 20B illustrate several frames of an example mixed reality environment where a virtual assistant request help from a user to be moved down from a ledge.

Animation and visual effects associated with virtual assistants may be implemented using subsystems that break down overall visuals into a series of actions or steps. For example, this is representative in the robot's holograms, materialization, and joint overrides (e.g. as shown in FIG. 20A). Holograms may be data driven and make use of storing textures (e.g., within ScriptableObjects), analogous to traditional inventory systems. Materialization may spawn a temporary object for the user to interact with. Through creation of scalable systems a zero-gravity "temporary" state of an existing object may be created without much impact on other objects in different states. In some implementations, object driven animation overrides redirect joints of the virtual assistant to face the direction of interest, e.g., allows Robot to visually track the user or what the user is holding.

In some implementations, materialization of an object by a virtual assistant is only initiated after checking whether a selected area is valid for materialization of the object. Otherwise, the object could be materialized in the middle of another character or object. One or more checks may be performed prior to object materialization. For example, a first check may be performed when the virtual assistant arrives next to the object it's interested in. If the area is clear for the object to be materialized, it will be authorized to go ahead and do so, but if the area is obstructed, the virtual assistant will play an inspect animation instead. This may provide the appearance that the virtual assistant had intended to just go up and inspect the object the entire time, hiding the fact that it just failed trying to perform a "user request" task. Another example check may be performed when a materialization shot is fired (e.g., an area is selected for materialization of an object). If the shot hits something in the scene (e.g., because something moved into the line of fire), the virtual assistant plays a disappointed animation and cancels out of the task since it's shot was blocked. This provides the appearance that the virtual assistant recognizes what is happening and can proactively adjust its behaviors, rather than continuing to wait for the user to perform the action it was requesting.

Example Virtual Assistant Interactivity

The virtual assistant, such as "Robot," may be configured to perform various movements, functions, interaction, etc., which may be responsive to the virtual environment (e.g., movements of the user, predicted intent of the user, characteristics of virtual objects within the virtual environment, etc.) and/or may be periodically or randomly initiated (e.g., a virtual assistant may periodically perform a maintenance routine, regardless of what is occurring within the virtual environment).

Figure 17A:
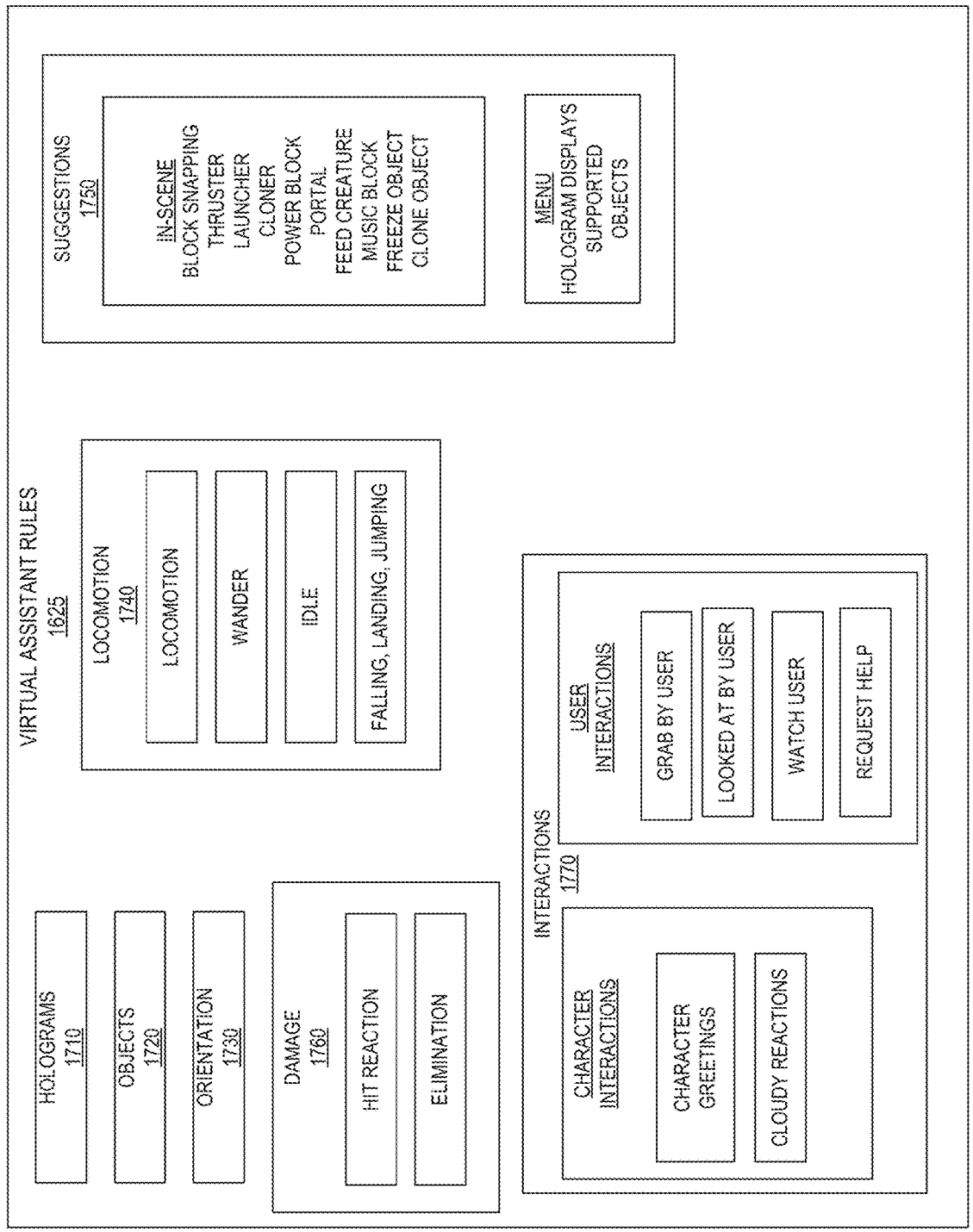
FIG. 17A illustrates examples of rules that may be implemented in a virtual assistant implementation.

The rules identified in FIG. 17 are examples of rules that may be implemented in a virtual assistant implementation. In other implementations, additional or fewer rules may be used, and/or the rules may be based on different criteria and/or cause different behaviors of the virtual assistant. Additionally, rules may be interrelated. For example, a first rule may rely upon the outcome of another rule (or rules). Similarly, a first rule may be triggered based on a particular outcome of another rule. As noted above, discussion of "rules" herein should be interpreted to cover any other type of software and/or hardware programmable logic, such as decision trees, algorithms, models, criteria, scripts, code, processes, flowcharts, pseudocode, etc., that may be used to evaluate inputs and determine how the virtual assistant reacts.

Hologram rules 1710 may include criteria for display of holograms (or other 2D or 3D image(s)) in a virtual environment. In some implementations, the impression of a hologram may be provided through use of a stack of waveguides to display two 2D stereoscopic images. In other implementations, other hardware and/or software may be used to generate the effect of a hologram. While the term "hologram" generally refers to a three-dimensional image, any implementations discussed herein with a hologram should also be interpreted to include similar implementations where the hologram is replaced by other virtual image(s), such as the stereoscopic 2D images noted above, that are positioned to communicate information to the user.

In general, holograms generated by a virtual assistant may be two—three frame animated images that are displayed above the virtual assistant's head to indicate its desires and/or intent to the user and/or other characters. The holograms may be projected from an emitter located on the top of the virtual assistant's head (or other location associated with the virtual assistant), and may be triggered independent of the animation that is currently playing.

Object rules 1720 may include criteria for creation, display, movement, manipulation, and/or removal of objects within a virtual environment. In some implementations, the objects rules 1720 indicate that the virtual assistant has the ability to materialize objects via a virtual energy beam from its hands, such that the object will float in place in front of the virtual assistant. In some implementations, object materialization is performed in conjunction with holograms (e.g., the object materialization rules 1720 work in conjunction with the hologram rules 1710). For example, if an object is removed from the virtual assistant's possession it may stay in the scene permanently, otherwise the virtual assistant may dematerialize the object when it determines that the object has been ignored by the user. Intent estimations of the user, such as is discussed above, may be used to determine how much attention, if any, the user is giving to an object that is materialized by the virtual assistant and, thus, may be an input to object rules related to dematerialization of the object.

Orientation rules 1730 may include criteria and instructions for how a virtual assistant rotates its head and/or body, such as in relation to the user and/or other objects in a virtual environment. In some implementations, the virtual assistant has the ability to rotate its head to face toward a desired target. A head rotation may include some body rotation also, or may include only rotation of a head portion of the virtual assistant. In some implementations, head rotation is limited to a predetermined range in the X and Y axes. Such implementations may, for example, create a more anthropomorphic realism of the head movements of the virtual assistant.

Locomotion rules 1740 may include criteria and movement instructions that initiate various movements of the virtual assistant, such as into, through, and out of a virtual scene. In some implementations, the virtual assistant moves smoothly with an "omni-wheel," which may be configured to allow movement in any direction. In other embodiments, a virtual assistant may be associated with other movement vehicles, such as feet, roller-skates, a jet pack, a wagon, an automobile, a flying vehicle, and/or any other movement device.

In some implementations, the virtual assistant uses pathfinding on graphs generated by navigational meshes at runtime to navigate along the contours of the mesh. Example navigational meshes and methods of use of navigational meshes are included in copending PCT Application No. PCT/US2019/026392, filed Apr. 8, 2019, titled "Avatar Animation Using Markov Decision Process Policies," which is hereby incorporated by reference in its entirety and for all purposes.

Figure 17B:
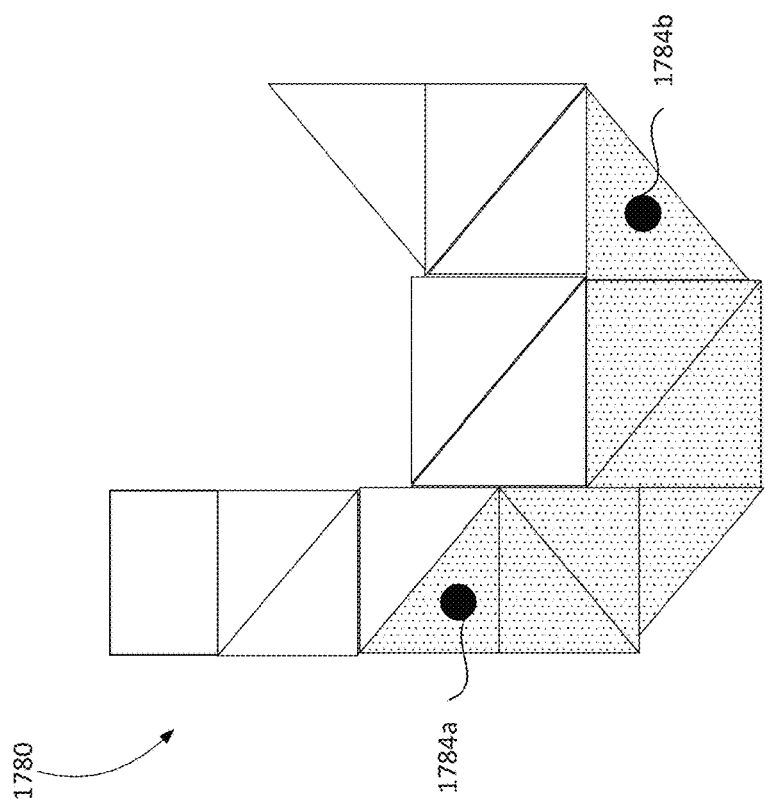
FIG. 17B illustrates one example of a navigational mesh including traversable areas in an environment.

FIG. 17B illustrates one example of a navigational mesh (a "navmesh") 1780 showing traversable areas in an environment. The traversable areas can be mapped out by a game designer or in AR/MR by the wearable system using the object recognizers 708 described with reference to FIG. 7, for example. The navmesh can comprise polygons (e.g., triangles and squares in this example). The sequence of polygons that include a starting position 1784a and a final position 1784b (sometimes referred to as the destination or goal) is the corridor and is shown via cross-hatch in FIG. 17B. The corridor can be identified using navigation path techniques such as the A* or Dijkstra methods. The animation engine can move the avatar along the corridor from the starting position 1784a to the final position 1784b by steering the avatar towards the next visible corner (e.g., vertex of a polygon) of the corridor. The pathfinding technique generally does not need to have information about how the avatar moves (e.g., walks, crawls, hops, slithers, etc.) to determine the corridor in the navmesh.

A motion graph can be used to animate the avatar along the path in the corridor. The motion graph provides a selection of the animation clips to move the avatar from an initial state (e.g., initial position and initial pose) to a destination state (e.g., destination position and destination pose).

As a physics based agent, the virtual assistant may utilize customized parameters, such as max velocity and acceleration, to undergo smooth movement with desired ease ins/outs. Desired stopping distance can also be incorporated for slowdowns when approaching targets.

In some implementations, a virtual assistant may be associated with locomotion abilities (and/or restrictions) that are different than those of other virtual assistants. For example, a first virtual assistant may move in a virtual environment by flying, while another virtual assistant moves only through walking or running. Similarly, virtual assistants may be associated with locomotion traits such as coordination, acceleration, posture, etc. that help personalize each virtual assistant.

In one example implementation, the locomotion rules 1740 may allow the virtual assistant to get slightly ahead of itself while accelerating, and in response, cause it to tilt backward before leaning forward into the direction the virtual assistant is moving in. This balancing effect may provide a more realistic movement of the virtual assistant. Similarly, the locomotion rules 1740 may cause the virtual assistant to smoothly veer in a new direction while moving forward, but does not typically lean/move from side to side (except perhaps as part of title animations of the virtual assistant). The locomotion rules 1740 may indicate various speeds for the virtual assistant, such as a normal and fast speed that may be similar to other non-character object movements within a scene. For example, a normal and fast speed of Robot may be similar to a walk and running speeds of a Tyrannosaurus Rex virtual assistant or other non-player character.

In the example of FIG. 17, the locomotion rules 1740 include a few categories of rules, specifically: locomotion, wanderer, idle, and falling, landing, and jumping. These categories of locomotion rules are provided as examples only, and are not limiting of the locomotion mechanisms available to other virtual assistants.

In this example, the wander locomotion rules allow the virtual assistant to choose a random (or semi-random) reachable location, move to it, and then choose another, such as after a predetermined period of time has passed and/or the user has performed a particular movement or action. In one implementation, when the destination is reached, the wander rules may include criteria to decide whether a further wander is performed (e.g., to another destination) or whether the virtual assistant should remain idle (e.g., see below) or perform some other action.

In this example, the idle locomotion rules allow the virtual assistant to remain idle for a predetermined period of time and/or until some other input or rule dictates a move from idleness. In some implementations, when the virtual assistant reaches its intended destination (see above), the idle locomotion rules initiate execution of one—two random idle break animations (e.g., yawning, scratching head, fidgeting, stretching, etc.) before determining whether to take another idle break, to wander to another location, or to perform some other action dictated by one or more other rules.

In this example, the falling, landing, jumping locomotion rules allow the virtual assistant to perform special actions that are influenced by virtual physics parameters, such as a virtual gravity effect. For example, if the virtual assistant falls off of a horizontal platform, the virtual assistant may react based on a distance it is falling. For example, a short distance may cause a fairly insubstantial reaction while a large distance may cause a more dramatic reaction of the virtual assistant. If the virtual assistant experiences a hard landing from a fall, it may be animated to show it falling over and then picking itself back up (and/or similar animations depending on the particular virtual assistant). This virtual damage to the virtual assistant may motivate the user to help the virtual assistant when a fall is possible (see, e.g., request help user interactions below).

In the example of FIG. 17, damage rules 1760 are used to monitor and update a health or damage characteristic of the virtual assistant that may be impacted by various activities of the virtual assistant, such as falling, even to a point where the virtual assistant dies.

A hit reaction rule may include criteria indicating that when a particular level of damage is inflicted on the virtual assistant, its animation will be interrupted with a hit reaction animation. This hit reaction animation may indicate to the user that the virtual assistant has been damaged and an amount of damage (e.g. either an exact numerical amount of damage or some more general damage indicator, such as a change in color). The hit reaction rules may further indicate that, once the hit reaction animation is complete, the virtual assistant proceeds with the activity that was interrupted, or executes a wandering routine. In some implementations, the locomotion animation of the virtual assistant may be impacted based on a health level. For example, Robot may let out gray smoke when its health level is below a certain threshold.

An elimination (or "death") rule may indicate when a virtual assistant has received too much damage to continue operation within the virtual environment. For example, an elimination rule may initiate a death particle effect at the location of the virtual assistant when a health level reaches a predetermined minimum value, such as zero. In some embodiments, the virtual assistant may be re-spawned based on a request from the user and/or automatically immediately or after a predetermined period of time.

In the example of FIG. 17, interactions rules 1770 may include various criteria and options dictating how a virtual assistant interacts with both characters (e.g., other non-user avatars) and users of the wearable system.

The example character interactions in the implementation of FIG. 17 include character interactions and cloudy reactions. Character greetings include rules for how the virtual assistant interacts with other non-user characters, such as Rex, Knights, Astronaut, and/or other Robots, which may vary from character to character (or depending on the interaction environment).

A character greeting may include a greeting animation and a responsive greeting animation (e.g., that may be provided if the other character provides an initial greeting first). In some implementations, character greetings may be customized for particular characters. For example, the virtual assistant may have a custom handshake that it performs with Rex that is different from a custom handshake that it performs with Astronaut.

The cloudy reactions rules react to weather provided by a Cloudy character and/or other weather simulating module of the system. For example, Cloudy can target the virtual assistant with its weather, such as lightning, rain, rainbows, etc. and the cloudy reactions rules indicate an appropriate action for the virtual assistant based at least on the received weather.

The user interactions rules include criteria and responsive actions that may be taken by the virtual assistant in conjunction with actions performed by the user of the wearable device.

A grab by user interaction rule may provide restrictions and parameters for a user grabbing the virtual assistant. For example, the virtual assistant may only be grabbed in particular types of virtual scenes. The rules may indicate an updated animation of the virtual object when in a grab mode, such as to pause or change locomotion animations of the virtual object, returning to a default locomotion animation when the virtual assistant is released from the user's grasp.

The looked at by user rules may indicate how the virtual assistant reacts when the user has looked at the virtual object for a predetermined time. As with the other rules, intent of the user may be calculated and used as an input to determine output of the rules. For example, an intent value of the virtual assistant may be calculated in real time to indicate a confidence level that the user is focusing attention on the virtual assistant. In such an environment, a looked at by user timer may only activate when the intent value is higher than the intent values associated with other virtual objects in the scene. Thus, if the user is focusing on an object that is near the virtual assistant, for example, the looked at by user timer may not activate. In some implementations, once the looked at by user timer has reached a threshold, e.g., three, five, or 10 seconds, the virtual assistant will animate to indicate recognition of the gaze of the user and turn toward the user to greet them, perhaps with a wave or similar animation. In some implementations, and perhaps based on the current context of the virtual scene, when the user has looked at the virtual assistant for a predetermined time period, a help window may be shown, such as to provide the users with information on actions that may be performed.

The watch user rules may allow the virtual assistant to monitor movements and interactions of the user with other virtual objects and predict intent of the user. Thus, this predicted intent may be used to provide recommendations to the user (discussed further below with reference to suggestions rules 1750). In some implementations, the watch user rules detect when the user has picked up an object and may initiate animation of the virtual assistant to show an increased interest in what the user is doing with the object. Additionally, the rules may indicate that the virtual assistant follows the object as the user moves the object. The virtual assistant may rotate and/or move its body and/or head to face the object and to allow it to continue looking at the object. In some implementations, the rules indicate that when an object that has been interacted with by the user is no longer interacted with by the user, the virtual assistant moves closer to the virtual object and inspects it, which may cause further movements and/or suggestions from the virtual assistant.

A request help interaction may include criteria for when the virtual assistant requests assistance from the user. One of the fastest ways to have two people build a strong bond is to put them in a situation where they depend on one another for safety (e.g., one's life depends on the other) or to have a common goal. In such situations, it doesn't matter if they come from different backgrounds, or speak different languages, the common goal allows them to build some type of relationship. In a virtual world, the virtual assistant and the user are in no real danger, but the virtual assistant may be configured so that it can get hurt in certain situations, and may need help from the user to minimize damage.

For example, if the virtual assistant would like to move from a desk surface to a floor surface, such as to inspect an object that the user has placed on the floor, the virtual assistant may move towards a ledge of the desk and then animate to request help from the user. For example, the virtual assistant may animate a handwaving motion and ask for the user to move the virtual assistant to the floor either with graphical depictions of the request and/or an audible request. The user may see this request for help and have enough empathy to come to the aid of the virtual assistant. If the user does respond to the virtual assistant's request for help, the virtual assistant has successfully elicited an emotional response from the user that has led to an action that can actually create or strengthen a relationship between the virtual assistant and the human user.

The request help rules may further indicate how the virtual assistant should react to interactions from the user responsive to the help request, such as with a unique animation showing gratitude when a user performs a requested action. For example, a rule may indicate that if the virtual assistant's request for help is ignored by the user (e.g., for a predetermined amount of time, such as three seconds), the virtual assistant will jump off of the ledge itself, which may then invoke the damage rules 1760, and perhaps even the death rule. Alternatively, if the virtual assistant is not able to move to a requested location by jumping (e.g. the virtual assistant wants to move from the floor up onto a desk), the request help rules may cause the virtual assistant to return to wandering and to make a subsequent request later (e.g., on a periodic basis included in the request help rule). In some implementations, if the virtual assistant is picked up in response to a request for help, but is placed on the same or a non-requested surface, the virtual assistant will animate to show that it is confused or disappointed, and potentially indicating that the user didn't do exactly what it had hoped for. The virtual assistant may then make the request again and/or perform a wandering routine and then make the request at some future time. In one implementation, if the virtual assistant is placed on a desired platform, it will perform a celebratory/thankful reaction indicating that the user did what the virtual assistant desired.

In the example of FIG. 17, suggestions rules 1750 include criteria indicating when the virtual assistant should provide suggestions. In this example, the suggestions include in-scene suggestions, which are generally suggestions related to objects that are currently in the virtual scene, as well as menu suggestions, which are suggestions that may not directly relate to objects currently in the virtual scene.

The in-scene suggestions may determine when the virtual assistant is near, e.g., within a virtual field of view of, an item of interest to the virtual assistant. The virtual assistant may then provide a suggestion regarding the virtual object, such as to encourage the user to perform a particular action. Suggestions may be provided via a contextual animated holographic display and/or via other video and/or audible outputs. A virtual object that is the subject of a suggestion may be highlighted in a visual manner, such as by a laser of the virtual assistant targeting the virtual object. In some implementations, the rules indicate that a happy animation is performed by the virtual assistant when the user follows the suggestion and/or a disappointed or sad animation is performed when the user does not follow the suggestion. Advantageously, such suggestions may educate the user on actions that can be taken, such as to show the user in an interactive and fun manner what can be done with various objects. Several example in-scene suggestions are shown in FIG. 17 and described briefly below:

Block snapping: the virtual assistant wants the user to snap something to the block it has chosen, and materializes a block for the user to use.

Thruster: the virtual assistant wants the user to activate the thruster it has chosen, and materializes a metal block for the user to use.

Launcher: The virtual assistant wants the user to place an object into the launcher it has chosen, and materializes an explosive block for the user to use.

Cloner: The virtual assistant wants the user to place an object into the cloner it has chosen, and materializes dice for the user to use.

Power Block: The virtual assistant wants the user to activate an object with the power block it has chosen, and materializes a fan for the user to use.

Portal: The virtual assistant wants the user to put an object into the portal it has chosen, and materializes a metal ball for the user to use.

Feed Creature: The virtual assistant wants the user to feed another character (e.g., a particular T-Rex that the virtual assistant has chosen), and materializes some food (e.g., cheese) for the user to use. The other character may be configured to eat this on its own (e.g., perhaps as an easter egg).

Music Block: The virtual assistant wants the user to cause the music block it has chosen to make a sound, and materializes a bouncy ball for the user to use.

Freeze Object: The virtual assistant wants the user to freeze another character that it has chosen (e.g., a Blue Knight).

Clone Object: The virtual assistant wants the user to clone another character it has chosen (e.g., a Red Knight).

FIG. 17 further illustrates several menu suggestions, which are provided herein as examples of suggestions that may be provided in certain implementations, and which are not intended to be limiting to interactions possible in other implementations. In some implementations, the menu suggestion rules include criteria that analyze the amount of objects of interest in a virtual scene and, if that amount is below a certain threshold, will initiate a menu suggestion, such as to suggest an object to be pulled from the menu. Similar to the in-scene suggestions, the menu suggestions may be provided in the form of a contextual animated holographic display and/or in any other visual and/or audible output to the user. In response to the user adding a new object responsive to a menu suggestion, the in-scene suggestion rules may be triggered to consider the newly added object. In some implementations, the virtual assistant performs animations responsive to how the user responds to the menu suggestions, such as a happy or sad animation depending on whether the user followed or didn't follow the virtual assistant's suggestion. Because users may sometimes encounter choice paralysis in a mixed reality environment, the virtual assistant may advantageously be configured to, every once in a while, run up to the menu and suggest an action and/or walk up to the menu and will create a hologram with a suggestion.

The menu suggestion rules may include characteristics of a holographic display to be used for particular suggestions. The supported objects may vary depending on various criteria included in the menu suggestion rules, such as to allow interactions with (and/or restrict interactions with) one or more of block snapping, thruster, launcher, cloner, power block, portal, creature feeding, music blocks, and/or other virtual objects.

In some implementations, the virtual assistant will make sounds to indicate its "mood." For example, if the virtual assistant is waiting by an object that it has suggested an interaction with, it may make a small impatient noise to encourage the user to look at him.

FIG. 18 illustrates an example view of a mixed reality environment that includes a virtual assistant, specifically, Robot. In the example of FIG. 18, virtual assistant interaction rules are executed to cause the Robot to wave to the user. In particular, in scene 1810 the virtual assistant 1802 is seen in a static/idle position. However, based on application of a user interaction rule, such as a looked at by user rule, the virtual assistant 1802 is animated to wave at the user in frame 1820. For example, the rule may indicate that after a user has looked at the virtual assistant for a predetermined period of time (e.g., an intent value associated with the virtual assistant has been higher than intent values for other virtual objects for the predetermined period of time), the virtual assistant executes a wave animation. As noted elsewhere, in other implementations the virtual assistant may take on different forms and/or the rules and/or animations performed by the virtual assistant may vary.

In some implementations, the virtual assistant is programmed with actions that attempt to get the user's attention when the virtual assistant is out of view of the user. In the world of VR/AR/MR, the user control's where they are looking in the virtual world. Thus, a virtual assistant may be positioned out of a user's field of view and be unable to get the attention of the user with an animated motion. Thus, the virtual assistant may include, as part of its "user requests" rules, audio cues that attempt to get the user's attention and cause the user to bring the virtual assistant into the user's field of view. Additionally, these rules may indicate that even when the virtual assistant is within the field of view of the user, the virtual assistant waits for the user to look directly at the virtual assistant before performing the rest of its "user request." These attention-related rules reduce issues associated with the user finding the virtual assistant too late, such as to only catch the end of a "user request," and not having enough time to perform the request before the virtual assistant gets bored (e.g., if the user's attention, for example through a detected gaze vector, is not directed towards the robot within a threshold period of time, the robot may change to the next priority animation) and wanders off.

Figure 19A:
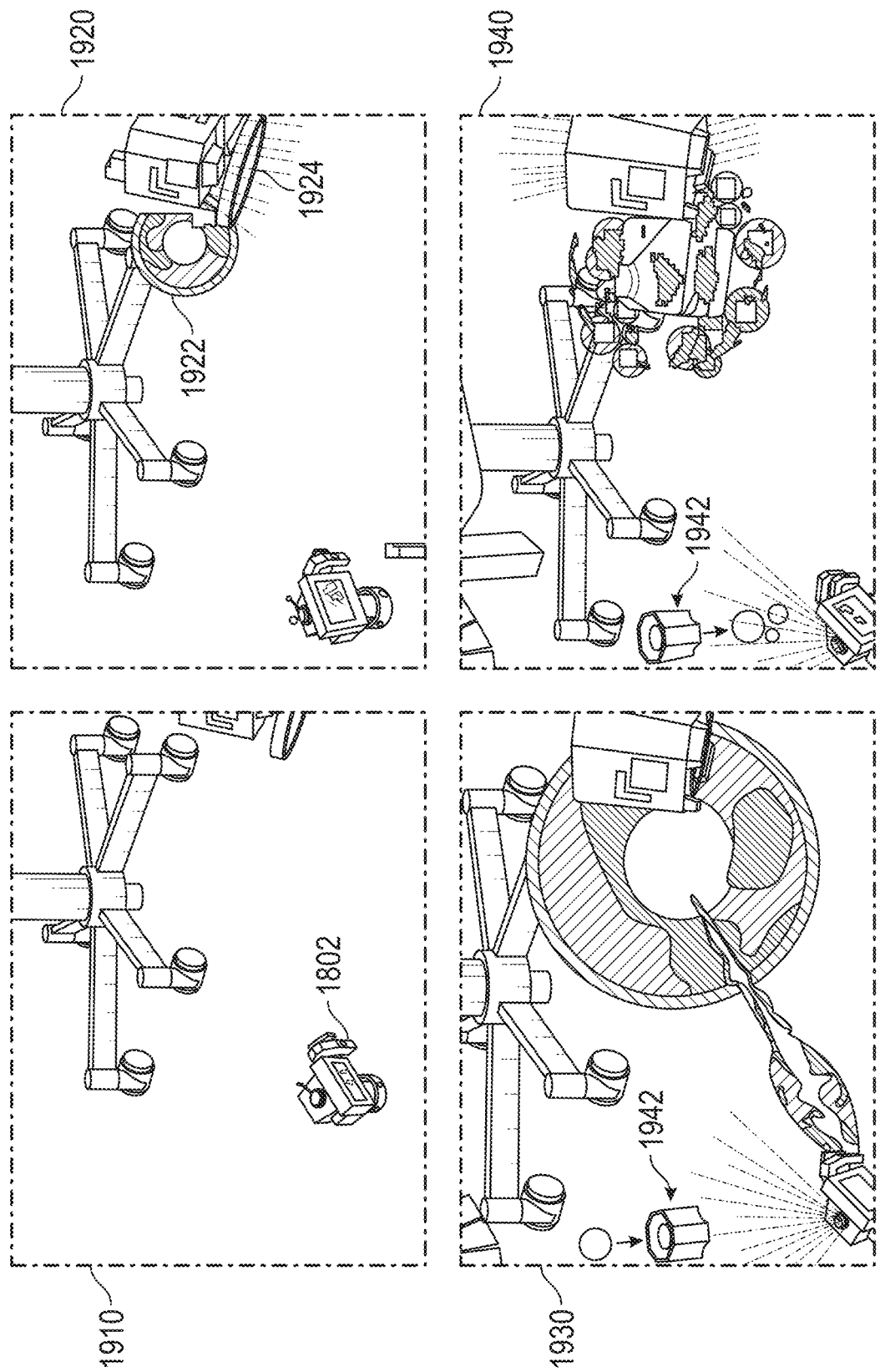
FIGS. 19A and 19B illustrate several frames that illustrate examples of a mixed reality environment wherein a virtual assistant provides a suggestion to the user.
Figure 19B:
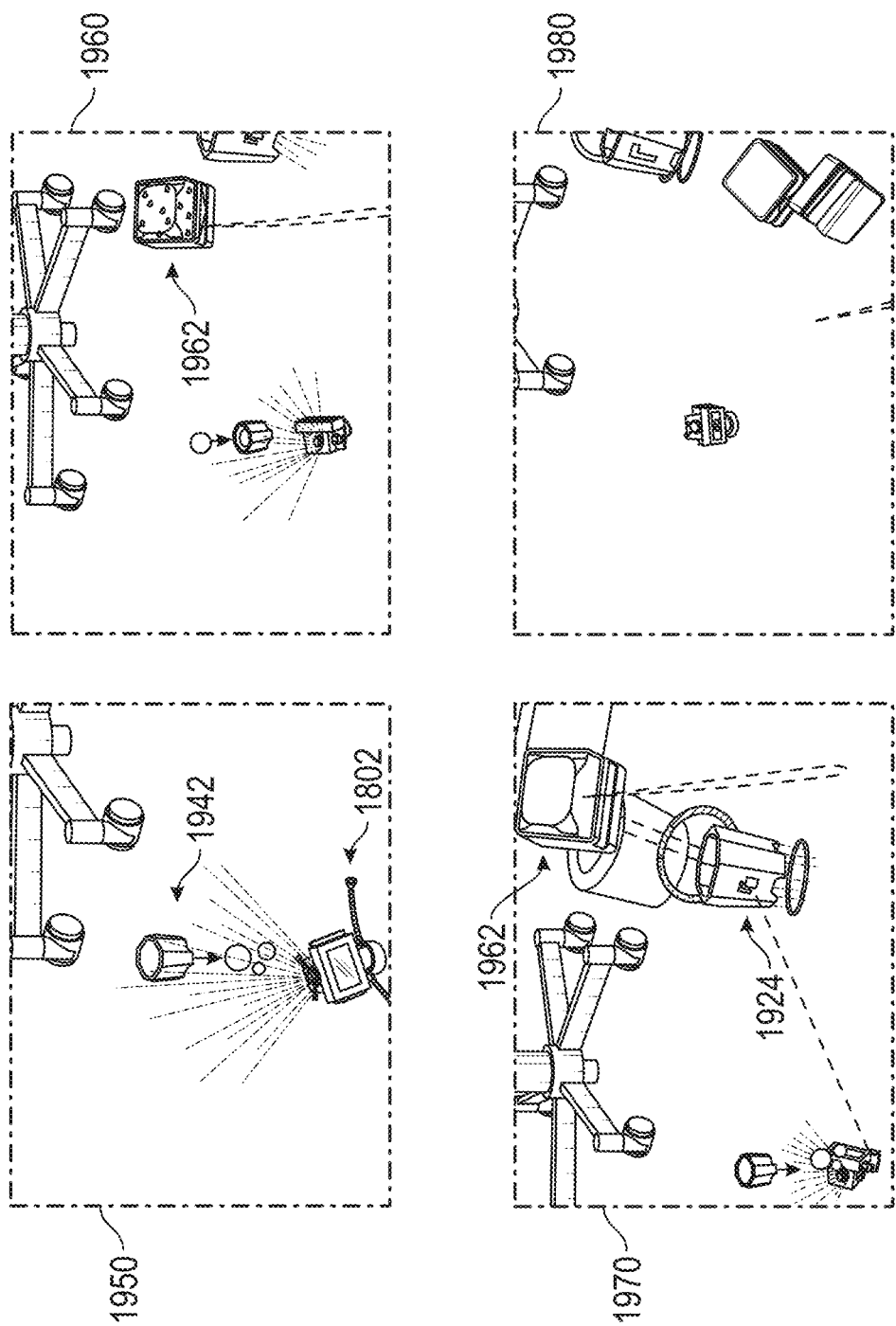

FIGS. 19A and 19B includes several frames 1910-1970 of a virtual environment wherein a virtual assistant providing a suggestion to the user. In this particular example, the virtual assistant 1802 receives instructions from an avatar processing and rendering system 1690, such as based on application of virtual assistant rules. As shown in frame 1910, the virtual assistant 1802 is standing on a surface (e.g., a floor in the real-world environment of the user) and characteristics of the virtual environment are being processed by the virtual assistant rules. In this example, a user interaction rule has triggered the virtual assistant 1802 to provide a suggestion to the user via a hologram. Thus, virtual assistant 1802 in frame 1910 is shown with a hologram projector. Next, at frame 1920, the virtual assistant 1802 begins projecting a hologram 1922 near a cloner object 1924. At frame 1930, the hologram animation continues and at frame 1940 an object (e.g., a cheeseburger in this example) eventually materializes. The virtual assistant 1802 also begins to display holographic suggestion details 1942, which in this example is an animation showing placement of an object (a sphere) into a cloning block, as shown in frames 1930 and 1940. In frame 1950, the virtual assistant 1802 animates the suggested action for the user. At frame 1960, the user has selected the cheeseburger object 1962 and begins moving the cheeseburger object 1962 towards the cloner object 1924 in frame 1970. As shown in frame 1980, the cloner object 1924 has performed a cloning action, creating multiple cheeseburger objects from the cheeseburger object 1962 that the user placed in the cloner object 1924 responsive to suggestion of virtual assistant 1802. In some implementations, the suggestion rules would cause the virtual assistant 1802 to perform an animation and/or sound indicating whether the virtual assistant is pleased, or unhappy, with how the user performed the suggestion.

Figure 20B:
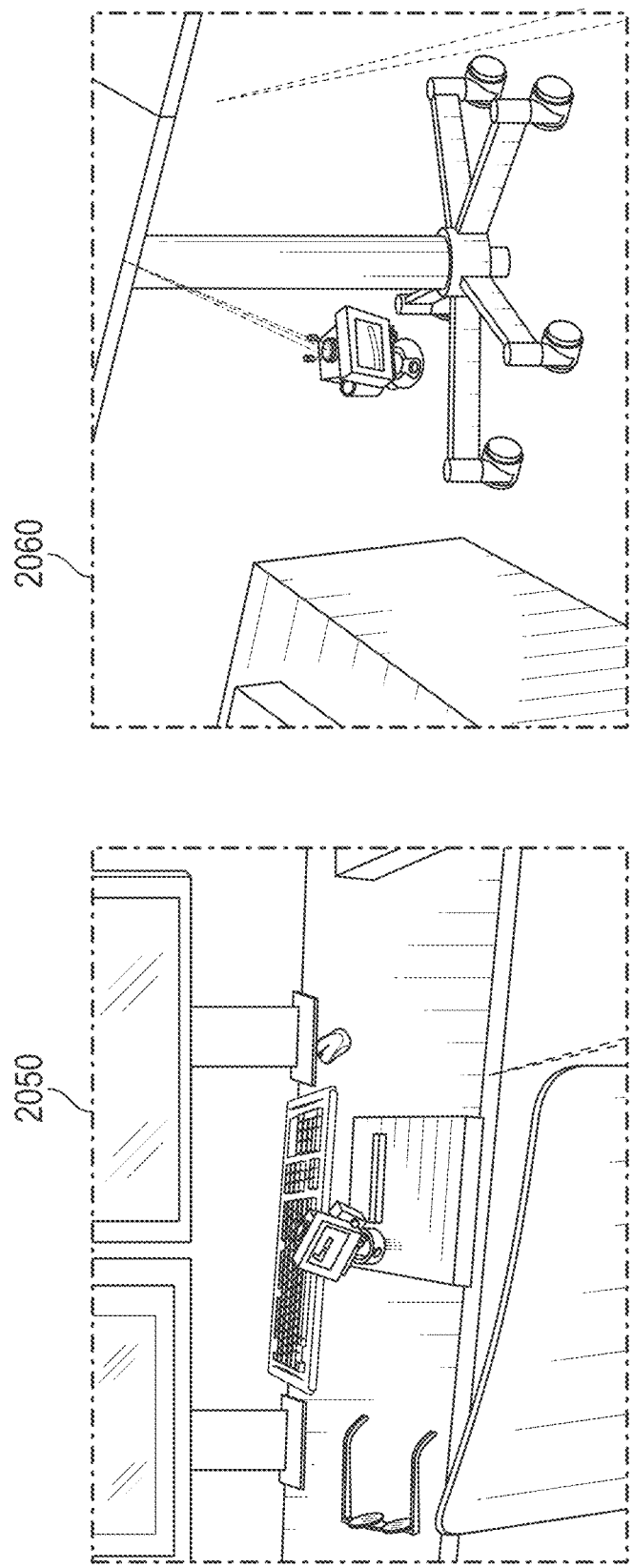

FIGS. 20A and 20B illustrate several frames 2010-2060 of an example mixed reality environment where a virtual assistant requests help from a user to be moved down from a ledge. In this example, at frame 2010, the virtual assistant 1802 is positioned on a desk surface near a ledge 2012, which the virtual assistant 1802 looks over with trepidation. The virtual assistant 1802 may desire to move to a lower surface, such as the floor, to interact with an object there and/or to provide a suggestion to the user regarding an object there, for example. Because the virtual assistant 1802 does not wish to receive damage from a fall, which possibly could result in death of the virtual assistant, a suggestion rule triggers and the virtual assistant requests help from the user. Frames 2020, 2030, 2040 illustrate an example holographic suggestion provided by the virtual assistant 1802 to indicate that the virtual assistant wishes for the user to move the virtual assistant down to a lower surface. In this example, the holographic suggestion includes an animation showing a request for the user to pick up the virtual assistant (holograph 2022A), to lower the virtual assistant (holograph 2022B), and to place the virtual assistant on a lower horizontal surface (holograph 2022C). Depending on the particular help suggestion rules associated with the virtual assistant, the animation may be repeated multiple times. Similarly, the virtual assistant may be configured to take action on its own if the user does not interact with the virtual assistant within a predetermined time, or may be configured to wait and request assistance at a later time. In the example of FIG. 20, at frames 2050 and 2060, the virtual assistant is shown jumping from the ledge to the lower horizontal surface, after the request for help rule determined that the user had not provided the help and the virtual assistant decides to jump on its own. The virtual assistant may take on damage and/or die as a result of the landing, and may be animated to illustrate such damage upon its landing.

Multiple Virtual Assistants and Cool Down

In some implementations, multiple virtual assistants may be included in a virtual environment. Additionally, other non-user characters may be included in a virtual environment and may interact with the one or more virtual assistants. In some implementations, multiple virtual assistants will all operate on the same or similar rules, such that each of multiple virtual assistants will watch and move at the same time. In other implementations, virtual assistants may have customized rules and/or rules may be modified over time for particular virtual assistant based on artificial intelligence or neural network learning that implements some variations in behaviors, even if the virtual assistants each began with common behavioral rules.

In some implementations, rules for interactions may take into account the presence of other characters. A cool down period may be implemented to potentially reduce concurrent movements of multiple virtual assistants. For example, a cool down rule may dictate that when the virtual assistant is looking at an object it will ignore all other objects until it is done looking at the object, plus some cool down time period, such as one second, three seconds, or five seconds, for example, before the virtual assistant wanders or looks at another object that the user is then interacting with. Cool downs may be performed after each suggestion is provided to the user and/or after each category of suggestions. If cool downs are limited to categories of suggestions, there would not be a cool down between consecutive suggestions of a same type (e.g., between consecutive clone suggestions) to make sure it doesn't request the same thing multiple times in a row. In some embodiments, there may be a cool down between consecutive suggestions of the same type (e.g., where each suggestion type may be associated with multiple individual suggestions) in order to provide a greater variety of suggestions to the user.

In one implementation, a "user request" AI task has a cooldown range to limit how often it fires, which may be in the range of 20-40 seconds, for example. Each possible request (and/or category of request) may also have its own cooldown as well. In this example, if the virtual assistant requested the user to snap some blocks together 15 seconds ago, the next request will be something different because "snapping some blocks together" will currently be on cooldown, while other request categories might not be.

In some implementations, the number of concurrent suggestions in a scene is limited, such as to 2 or 3 concurrent suggestions from all of the virtual assistants in a scene. Thus, in this example, if 10 Robots are in a scene, the user isn't overwhelmed with ten concurrent suggestions, but only to the limited 2 or 3 suggestions indicated in the virtual assistant rules. For example, a "bot manager" script may be used to track how many virtual assistants are currently requesting something from the user. Before a virtual assistant can request something from the user, the virtual assistant may check with the bot manager to see if it was allowed to make a request at that time. If not, it would execute the next highest priority AI task.

In some implementations, virtual assistants that reach their targets (e.g., the object associated with a suggestion) first are allowed to provide their suggestion until the maximum number of concurrent suggestions is reached, while the other virtual assistants wander around or watch the interactions of the user. The virtual assistants that have their mission interrupted (because the maximum number of missions by other virtual assistants is reached) may end their mission and be assigned a new mission (the same or a different mission than before) once the number of ongoing missions is reduced (e.g., by a mission being completed).

Missions

In some implementations, each virtual assistant may be associated with a mission, which is generally one or more tasks (or objectives) that are configured to achieve a particular goal. For example, the mission of a virtual assistant may be to have the user interact with a particular object, such as an object that the user has not previously interacted with. Thus, a virtual assistant may have a mission to suggest a user interaction with a particular object, such as an action block that is in the scene. Accordingly, when the virtual assistant's cool down timer is free, the virtual assistant may notice the block, move over to it, and initiate a suggestion to the user for an interaction with the block.

In some implementations, a mission may include a prioritized list of objectives that dictate what the virtual assistant should "do" in response to particular events, such as when the virtual assistant is within a particular distance of an object or when the user performs certain actions. These objectives (which may also be referred to as "sub-tasks") in the virtual assistant's behavioral rules (e.g., a behavior tree) may be extended to incorporate user responsiveness, such that the virtual assistant's desired execution of tasks are not complete until the user completes an expected action or "suggestion." Thus, in some implementations the virtual assistant may be both a character of agency and an instructional tool that extends the user's understanding of the experience.

In some implementations, a user is associated with a set of missions, such as ten or more missions that are each tasked to be completed by the user. In these implementations, a virtual assistant may be assigned a highest priority mission or the virtual assistant may be assigned a random mission of the remaining missions. If the maximum number of concurrent missions are already in progress, the virtual assistant may just wander until a mission is completed, and then be assigned the next highest priority mission (or a random mission in implementations where mission assignments are randomized). Missions may include tasks that train or educate the user.

Audio

In some implementations, the virtual assistant may be configured to play sounds to the user via the wearable system. For example, certain actions/animations of the virtual assistant may be accompanied by audio output. Additionally, audio output may be provided in some instances even when the virtual assistant is not performing an action/animation. Sounds may be associated with actions such as walking, running, turning, idling, falling, landing, cloudy reactions, astronaut scan reaction, character interactions (e.g., may be different for each character), hit impacts, death, hologram generation, suggestion animations, user action celebrations, ledge help request, request fulfilled, request ignored, object of interested highlight indication, object materialization, object release, user greeting, etc.

In some implementations, multiple sound layers may be used, such as for body movements of a virtual assistant. Isolation of the layers (e.g., using Wave Works Interactive Sound Engine or "wWise", an audio creation sound engine by Audiokinect) allows more variety for mix possibilities. Wwise gives extra variation and flexibility when optimizing with wise recorder.

Sounds associated with the virtual assistant, such as with particular actions or interactions of the virtual assistant may be obtained from various sources. For example, a robot virtual assistant may have sounds including a vintage Mac Plus computer from the 80s and recordings of organic mechanical sounds that may increase the feeling of the robot being a real object with "sci fi" robotic qualities. Organic mechanical sounds may provide a more realistic feel and help portray the virtual assistant (e.g., Robot) as a little guy who has had some miles put on him.

In some implementations, a voice like sound effect may be associated with a virtual assistant. The voice may be used, for example, to help the virtual assistant get the user's attention and tell the story and purpose of the virtual assistant's actions.

In production of a virtual assistant, and it's associated sound effects, a sound library with sounds that may be associated with virtual assistant actions may be used to allow quick association of sounds with the virtual assistant once design of the virtual assistant is prepared. Use of a sound library allows quick addition of sounds from the library and creation of the final mix. In some implementations, design teams (that are designing a virtual assistant) need extra time for their part, and audio is typically added after design is completed. Thus, use of a sound library by the sound team reduces pressure that may be placed on the audio team to quickly complete the audio for the virtual assistant (that may already be behind schedule).

In some implementations, a virtual environment may include multiple virtual assistants and/or instances of other characters that have associated sounds. Thus, the system may implement a mix pass that determines sounds and volume of each sound to provide an appropriate balance of sounds. For example, various scenarios (e.g., characters, animations, interactions, etc.) may be associated with parameters for mixing sounds within a virtual scene. In some implementations, a spotlight may be used to help balance the mix and/or to push the mix up for a specific animation (e.g., hero animations) and/or important vocal calls. In some implementations, specific radiation properties of voices may be considered within the mix as well.

Example Visual Effect Creation

When it comes to visual effects in video games, opacity is a parameter that visual effects artists commonly adjust to provide visual effects that are quick, spontaneous, and that add character to the animated objects. In spatial computing, however, the visual effects goal may shift from making the effects "glowy" to making them opaque and clear to read. Additionally, some spatial computing environments are not able to handle transparency well—creating effects that may go unnoticed because the user can see through them. Additionally, use of black color in spatial computing is difficult. Thus, in some implementations these visual effects may be imitated using brighter textures or "faking" the shadows.

In some implementations, timing of animations and visual effects may be programmed with reference to other animations or visual effects. For example, at times when multiple dependent effects are active, such as when the virtual assistant is materializing an object, the timing and how long each effect plays at a particular keyframe may be adjusted using a visual animation and timeline interface that may be operated by an animator, rather than a programmer.

Sometimes effects will not be visible through one monocle or look drastically different than what you see in engine. This is where enabling instancing comes to play. Instancing allows the shader to create an instance of the parameter internally and use the same, for example, texture on each object. This helps optimizing the computing required to draw the shader in the spatial computing since overdraws are wanted. In some implementations, if shader graphs are used like Amplify Shader Editor, then there is a parameter called Force Enable Instancing which when enabled, fixes the above issue. Also, if there are shaders getting changed at runtime, instancing may be important to achieve smoother transitions (e.g., because the values of the parameters may be decided at runtime via scripts or shader itself).

Keeping every particle effect optimized may also be useful for the performance. For example, if there are multiple virtual assistants in a scene, the frames-per-second ("fps") may be lowered to a level that is not acceptable. In such a situation, fps may be increased by better management of effects on the character. For example, making use of meshes for most of the effects limits impact of these heavy effects. A mesh renderer (in particle system) or a game object (in project) may make it easier for an effects engine and reduces draw calls. Additionally, checking that the pivot is at the center of mesh instead of origin in 3D packages like Maya may be beneficial when working with world position or object position related shaders. While using mesh renderer in Unity for particle effects, changing the Renderer Mode to local in particle renderer may optimize rendering. Adding meshes to particle effect, if shaders are used, may also optimize the effects. For example, controlling UV's for faking motion effects or Disintegration effect.

In some implementations, when scaling the whole effect via scripts, a parent prefab may be normalized (e.g., parameter is 1 and other Transform parameters are zeroed out). This may reduce the chance of effects being scaled weirdly, which may create defects in other dependent effects also. For example, in a particle system, the Scaling mode parameter may be changed to Hierarchy so that all the dependent game objects get scaled. For effects played once, setting Stop Action to Destroy will clear it from the scene, avoiding the memory to populate with unused effects. In some implementations, most of the effects that are generated using shaders are more performance efficient than using particles. Using flip-books inside of shaders for sprite-sheets may also help support performance.

Example Implementations

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a 1st example, a system comprises a mixed reality device, a hardware computer processor, and a non-transitory computer readable medium having software instructions stored thereon, wherein the software instructions executable by the hardware computer processor to cause the computing system to perform operations comprising: accessing virtual environment data including information regarding a virtual environment that is at least partially visible to a user through a field of view of the mixed reality device. The virtual environment data may indicate a location within the virtual environment of a virtual assistant executing logic configured to determine movements and interactions of the virtual assistant, location within the virtual environment of a virtual object, and a headpose of the mixed reality device that indicates an orientation and position of a user of the mixed reality device. In some implementations, the logic associated with the virtual assistant includes at least: one or more locomotion rules that control movement of the virtual assistant towards the user, one or more interest rules indicating that, in response to the user picking up the virtual object, the virtual assistant moves to at least within a predetermined minimum distance of the user in the virtual environment and a gaze of the virtual assistant turns towards the virtual object, one or more suggestion rules that, in response to an idle time of the user exceeding an idle threshold, causes the virtual assistant to suggest an action to the user, and a help rule that, in response to the virtual assistant determining that a move to a target area of the virtual environment would inflict damage on the virtual assistant, causes the virtual assistant to request help from the user. In some embodiments, the operations further include accessing sensor data from the wearable device, the sensor data including at least one of speech tracking, eye tracking, totem tracking, or gesture/pose tracking, executing the logic based at least on the sensor data and the virtual environment data, and outputting to the mixed reality device updates to the virtual environment for display to the user, wherein representation of the virtual assistant in the virtual environment is updated in real-time responsive to execution of the logic.

In a 2nd example, the system of example 1, wherein the virtual assistant is depicted in the virtual environment as a robot.

In a 3rd example, the system of any of examples 1-2, further comprising an intent determination component configured to determine intent of the user.

In a 4th example, the system of example 3, wherein intent of the user comprises a first intent value associated with a first virtual object, the first intent value based at least on a gaze direction of the user with reference to position of the first virtual object in the virtual environment.

In a 5th example, the system of example 4, wherein intent of the user comprises a second intent value associated with a second virtual object, the second intent value based at least on the gaze direction of the user with reference to position of the second virtual object in the virtual environment.

In a 6th example, the system of example 5, wherein the first intent value is lower than the second intent value, indicating that the user is more focused on the first virtual object.

In a 7th example, the system of any of examples 1-6, wherein the rules include one or more criteria, algorithm, model, script, pseudocode, or process.

In a 8th example, the system of any of examples 1-7, wherein the virtual assistant is configured to determine a mission of the user based on examination of the virtual object picked up by the user.

In a 9th example, the system of any of examples 1-8, wherein at least some of the rules are associated with sounds that are played on the mixed reality device responsive to satisfaction of the corresponding rule.

In a 10th example, the system of example any of examples 1-9, wherein the logic further includes a wave rule that, in response to the user not looking at the virtual assistant for a predetermined time, causes the virtual assistant to wave to the user.

In a 11th example, the system of example any of examples 1-10, wherein the move to the target area of the virtual environment includes a drop off of a ledge of a real world object onto which the virtual assistant is positioned.

In a 12th example, the system of example any of examples 1-11, wherein the request for help from the user comprises displaying a hologram with an animated overview of the requested movement.

In a 13th example, the system of example any of examples 1-12, wherein the help rule indicates that, if the user has not helped the virtual assistant within a predetermined time from when help was requested, the virtual assistant initiates a locomotion action intended to move the virtual assistant to the target area.

In a 14th example, the system of example 13, wherein the locomotion action comprises jumping from the ledge of a surface.

In a 15th example, the system of example any of examples 1-14, wherein the logic further includes a damage rule configured to track damage to the virtual assistant and, when the damage reaches a threshold amount, initiate an elimination action associated with death of the virtual assistant.

In a 16th example, The system any of examples 1-15, wherein the interest rules further indicate that the gaze continues at least a first predetermined time after the virtual object is no longer held by the user.

In a 17th example, the system of example any of examples 1-16, wherein the user is associated with a plurality of missions that the virtual assistant is configured to assist with.

In a 18th example, the system of example 17, wherein the plurality of missions are assigned to one or more virtual assistants based on priorities of the missions.

In a 19th example, the system of example 17, wherein the plurality of missions are assigned to one or more virtual assistants randomly.

In a 20th example, the system of example 17, wherein a quantity of the missions that are assignable to the one or more virtual assistants is limited to a first quantity.

In a 21st example, the system of any of examples 1-20, wherein the virtual environment includes a second virtual assistant executing second logic configured to manage movements and interactions of the second virtual assistant.

In a 22nd example, the system of any of examples 1-21, wherein the action suggested to the user comprises a suggestion to select a menu item.

In a 23rd example, the system of any of examples 1-22, wherein the action suggested to the user comprises a suggestion to interact with a virtual object.

In a 24th example, a system comprises a mixed reality device, a hardware computer processor, and a non-transitory computer readable medium having software instructions stored thereon, wherein the software instructions executable by the hardware computer processor to cause the computing system to perform operations comprising: accessing virtual environment data including information regarding a virtual environment that is at least partially displayed by the mixed reality device. The virtual environment data may indicate a location within the virtual environment of a virtual assistant executing logic configured to determine movements and interactions of the virtual assistant, location within the virtual environment of a virtual object, and a location within the virtual environment of a user of the mixed reality device. In some implementations, the logic associated with the virtual assistant includes at least: one or more locomotion rules that control movement of the virtual assistant towards the user, one or more interest rules indicating that, in response to the user picking up the virtual object, the virtual assistant moves to at least within a predetermined minimum distance of the user in the virtual environment and a gaze of the virtual assistant turns towards the virtual object, one or more suggestion rules that, in response to an idle time of the user exceeding an idle threshold, causes the virtual assistant to suggest an action to the user, and a help rule that, in response to the virtual assistant determining that a move to a target area of the virtual environment would inflict damage on the virtual assistant, causes the virtual assistant to request help from the user. In some embodiments, the operations further include accessing sensor data from the wearable device, the sensor data including at least one of speech tracking, eye tracking, totem tracking, or gesture/pose tracking, executing the logic based at least on the sensor data and the virtual environment data, and outputting to the mixed reality device updates to the virtual environment for display to the user, wherein representation of the virtual assistant in the virtual environment is updated in real-time responsive to execution of the logic.

As noted above, implementations of the described examples provided above may include hardware, a method or process, and/or computer software on a computer-accessible medium.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some implementations, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example implementations. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every implementation.

Conditional language used herein, such as, among others, "can," "could," "might," "may," "e.g.," and the like, unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without author input or prompting, whether these features, elements and/or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain implementations require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system comprising:
   a mixed reality device;
   a hardware computer processor;
   a non-transitory computer readable medium having software instructions stored thereon, the software instructions executable by the hardware computer processor to cause the system to perform operations comprising:
   accessing virtual environment data including information regarding a virtual environment that is at least partially visible to a user through a field of view of the mixed reality device, wherein the virtual environment data indicates:
      a location within the virtual environment of a virtual assistant executing logic configured to determine movements and interactions of the virtual assistant;
      a location within the virtual environment of a virtual object; and
      a headpose of the mixed reality device that indicates an orientation and position of a user of the mixed reality device;
   wherein the logic associated with the virtual assistant includes at least:
      one or more locomotion rules that control movement of the virtual assistant towards the user;
      one or more interest rules indicating that, in response to the user picking up the virtual object, the virtual assistant moves to at least within a predetermined minimum distance of the user in the virtual environment and a gaze of the virtual assistant turns towards the virtual object;
      one or more suggestion rules that, in response to an idle time of the user exceeding an idle threshold, causes the virtual assistant to suggest an action to the user; and
      a help rule that, in response to the virtual assistant determining that a move to a target area of the virtual environment would inflict damage on the virtual assistant, causes the virtual assistant to request help from the user;
   access sensor data from the mixed reality device, the sensor data including at least one of speech tracking, eye tracking, totem tracking, or gesture/pose tracking;
   execute the logic based at least on the sensor data and the virtual environment data; and
   output to the mixed reality device updates to the virtual environment for display by the mixed reality device, wherein representation of the virtual assistant in the virtual environment is updated in real-time responsive to execution of the logic.

2. The system of claim 1, wherein the virtual assistant is depicted in the virtual environment as a robot.

3. The system of claim 1, further comprising an intent determination component configured to determine intent of the user.

4. The system of claim 3, wherein intent of the user comprises a first intent value associated with a first virtual object, the first intent value based at least on a gaze direction of the user with reference to position of the first virtual object in the virtual environment.

5. The system of claim 4, wherein intent of the user comprises a second intent value associated with a second virtual object, the second intent value based at least on the gaze direction of the user with reference to position of the second virtual object in the virtual environment.

6. The system of claim 5, wherein the first intent value is lower than the second intent value, indicating that the user is more focused on the first virtual object.

7. The system of claim 1, wherein the rules include one or more criteria, algorithm, model, script, pseudocode, or process.

8. The system of claim 1, wherein the virtual assistant is configured to determine a mission of the user based on examination of the virtual object picked up by the user.

9. The system of claim 1, wherein at least some of the rules are associated with sounds that are played on the mixed reality device responsive to satisfaction of the corresponding rule.

10. The system of claim 1, wherein the logic further includes a wave rule that, in response to the user not looking at the virtual assistant for a predetermined time, causes the virtual assistant to wave to the user.

11. The system of claim 1, wherein the move to the target area of the virtual environment includes a drop off of a ledge of a real world object onto which the virtual assistant is positioned.

12. The system of claim 1, wherein the request for help from the user comprises displaying a hologram with an animated overview of the requested movement.

13. The system of claim 1, wherein the help rule indicates that, if the user has not helped the virtual assistant within a predetermined time from when help was requested, the virtual assistant initiates a locomotion action intended to move the virtual assistant to the target area.

14. The system of claim 13, wherein the locomotion action comprises jumping from a ledge of a surface.

15. The system of claim 1, wherein the logic further includes a damage rule configured to track damage to the virtual assistant and, when the damage reaches a threshold amount, initiate an elimination action associated with death of the virtual assistant.

16. The system of claim 1, wherein the user is associated with a plurality of missions that the virtual assistant is configured to assist with.

17. The system of claim 16, wherein the plurality of missions are assigned to one or more virtual assistants based on priorities of the missions.

18. The system of claim 1, wherein the virtual environment includes a second virtual assistant executing second logic configured to manage movements and interactions of the second virtual assistant.

19. The system of claim 1, wherein the action suggested to the user comprises a suggestion to select a menu item.

20. A computerized method, performed by a computing system having one or more hardware computer processors and one or more non-transitory computer readable storage device storing software instructions executable by the computing system to perform the computerized method comprising:

accessing virtual environment data including information regarding a virtual environment that is at least partially visible to a user through a field of view of a mixed reality device, wherein the virtual environment data indicates:
 a location within the virtual environment of a virtual assistant executing logic configured to determine movements and interactions of the virtual assistant;
 a location within the virtual environment of a virtual object; and
 a headpose of the mixed reality device that indicates an orientation and position of a user of the mixed reality device;
wherein the logic associated with the virtual assistant includes at least:
 one or more locomotion rules that control movement of the virtual assistant towards the user;
 one or more interest rules indicating that, in response to the user picking up the virtual object, the virtual assistant moves to at least within a predetermined minimum distance of the user in the virtual environment and a gaze of the virtual assistant turns towards the virtual object;
 one or more suggestion rules that, in response to an idle time of the user exceeding an idle threshold, causes the virtual assistant to suggest an action to the user; and
 a help rule that, in response to the virtual assistant determining that a move to a target area of the virtual environment would inflict damage on the virtual assistant, causes the virtual assistant to request help from the user;
access sensor data from the mixed reality device, the sensor data including at least one of speech tracking, eye tracking, totem tracking, or gesture/pose tracking;
execute the logic based at least on the sensor data and the virtual environment data; and
output to the mixed reality device updates to the virtual environment for display by the mixed reality device, wherein representation of the virtual assistant in the virtual environment is updated in real-time responsive to execution of the logic.

* * * * *